US012745124B2

(12) United States Patent
Gothe

(10) Patent No.: US 12,745,124 B2
(45) Date of Patent: Sep. 22, 2026

(54) ASSET MANAGEMENT AND IOT DEVICE FOR REFRIGERATED APPLIANCES

(71) Applicant: True Manufacturing Co., Inc., O'Fallon, MO (US)

(72) Inventor: Dominik Gothe, O'Fallon, MO (US)

(73) Assignee: TRUE MANUFACTURING CO., INC., O'Fallon, MO (US)

( * ) Notice: Subject to any disclaimer, the term of this patent is extended or adjusted under 35 U.S.C. 154(b) by 248 days.

(21) Appl. No.: 18/362,237

(22) Filed: Jul. 31, 2023

(65) Prior Publication Data

US 2024/0040423 A1 Feb. 1, 2024

Related U.S. Application Data

(63) Continuation of application No. PCT/US2023/029025, filed on Jul. 28, 2023.

(Continued)

(51) Int. Cl.
*H04W 28/02* (2009.01)
*G05B 19/042* (2006.01)
(Continued)

(52) U.S. Cl.
CPC ...... *H04W 28/0215* (2013.01); *G05B 19/042* (2013.01); *G06F 13/12* (2013.01);
(Continued)

(58) Field of Classification Search
CPC ... H04W 28/0215; G16Y 20/10; G16Y 40/10; G16Y 20/20; G16Y 40/20; G05B 19/042;
(Continued)

(56) References Cited

U.S. PATENT DOCUMENTS 5,262,758 A 11/1993 Nam et al.
6,060,987 A 5/2000 Marlia
(Continued)

FOREIGN PATENT DOCUMENTS

KR 1020190093010 A 8/2019
WO 0201920 A1 1/2002
(Continued)

OTHER PUBLICATIONS

Konovalenko, "Real-time temperature prediction in a cold supply chain based on Newton's law of cooling", Nov. 17, 2020, Elsevier B. V., Decision support Systems.

(Continued)

*Primary Examiner* — Nicholas R Taylor
*Assistant Examiner* — Chong G Kim
(74) *Attorney, Agent, or Firm* — Stinson LLP

(57) ABSTRACT

An asset management system includes an asset management network that connects various types of refrigeration appliances to an asset manager. At the device layer, IOT devices are connected to the refrigeration appliances and have edge compute capability, including a backup power management function, and a modem for network communication. IOT device ports directly integrate with sensors, switches, and/or serial data controllers of refrigeration appliances. Push notification alarms are initiated on the edge of the network by IOT devices. The network tags operating data by appliance serial, and the asset manager stores the data using serial numbers as primary keys. The asset manager streams data from numerous appliances and uses event driven processing to promptly respond to edge alarms. The operating data keyed by serial number is enriched with proprietary data organized by appliance type and is used to develop new predictive models by appliance type.

19 Claims, 23 Drawing Sheets

Related U.S. Application Data

(60) Provisional application No. 63/393,092, filed on Jul. 28, 2022.

(51) Int. Cl.
*G06F 13/12* (2006.01)
*G08B 21/18* (2006.01)
*G16Y 20/10* (2020.01)
*G16Y 20/20* (2020.01)
*G16Y 40/10* (2020.01)
*G16Y 40/20* (2020.01)
*H04L 12/28* (2006.01)
*H04L 67/025* (2022.01)
*H04L 67/10* (2022.01)
*H04L 67/125* (2022.01)

(52) U.S. Cl.
CPC ............ *G08B 21/185* (2013.01); *G16Y 20/10* (2020.01); *G16Y 20/20* (2020.01); *G16Y 40/10* (2020.01); *G16Y 40/20* (2020.01); *H04L 12/2823* (2013.01); *H04L 67/025* (2013.01); *H04L 67/10* (2013.01); *H04L 67/125* (2013.01); *G05B 2219/2654* (2013.01)

(58) Field of Classification Search
CPC ............ G05B 2219/2654; G06F 13/12; G08B 21/185; H04L 12/2823; H04L 67/025; H04L 67/10; H04L 67/125
USPC .......................................................... 370/329
See application file for complete search history.

(56) References Cited

U.S. PATENT DOCUMENTS 6,237,051 B1 5/2001 Collins
6,370,890 B2 4/2002 Roh et al.
6,393,848 B2 5/2002 Roh et al.
6,442,952 B2 9/2002 Roh et al.
6,502,411 B2 1/2003 Okamoto
6,553,336 B1 * 4/2003 Johnson ............ G05B 19/0421 702/182
6,722,146 B2 4/2004 Roh et al.
6,842,721 B2 1/2005 Kim et al.
6,889,510 B2 5/2005 Song et al.
6,892,545 B2 5/2005 Ishikawa et al.
7,090,141 B2 8/2006 Roh et al.
7,110,832 B2 9/2006 Ghent
7,204,091 B2 4/2007 Allison et al.
7,296,459 B2 11/2007 Son et al.
7,490,477 B2 2/2009 Singh et al.
7,552,029 B2 6/2009 Elwood et al.
7,752,309 B2 7/2010 Keyghobad et al.
8,539,783 B1 9/2013 Bunch
8,653,949 B2 2/2014 Lee et al.
8,725,455 B2 5/2014 Kriss
9,015,071 B2 4/2015 Breed
9,024,716 B2 5/2015 Yum et al.
9,057,554 B2 6/2015 Quinlan et al.
9,091,475 B2 7/2015 Kang et al.
9,279,611 B2 3/2016 Tan et al.
9,441,991 B2 9/2016 Haga et al.
9,451,031 B2 9/2016 Graziano et al.
9,578,121 B2 2/2017 Arunasalam et al.
9,644,886 B2 5/2017 Shim
9,846,086 B1 12/2017 Robinson et al.
9,863,694 B2 1/2018 Broadbent
9,979,606 B2 5/2018 Gupta et al.
10,142,820 B2 11/2018 Root
10,153,915 B2 12/2018 Doberstein et al.
10,238,259 B2 3/2019 Langhammer et al.
10,256,982 B2 4/2019 Rahman et al.
10,321,182 B2 6/2019 Herz
10,341,133 B2 7/2019 Wouhaybi et al.
10,361,999 B2 7/2019 Vazquez Carames
10,380,863 B2 8/2019 Wedig et al.
10,420,151 B2 9/2019 Zakaria
10,444,868 B2 10/2019 Lee
10,465,960 B2 11/2019 Prabhakaran
10,492,072 B1 11/2019 Sokolov et al.
10,506,019 B2 12/2019 Brian
10,510,110 B2 12/2019 Takahashi et al.
10,511,950 B2 12/2019 Maier et al.
10,530,864 B2 1/2020 Hammons et al.
10,531,247 B2 1/2020 Kashef
10,536,527 B2 1/2020 Ocejo et al.
10,540,871 B2 1/2020 Wedig et al.
10,547,498 B1 1/2020 Garner, IV et al.
10,563,899 B2 2/2020 Wilson
10,567,567 B2 2/2020 Seo et al.
10,578,353 B2 3/2020 Seidl et al.
10,579,971 B1 3/2020 Davis et al.
10,641,532 B2 5/2020 Dalmolin
10,673,707 B2 6/2020 Dhanabalan et al.
10,692,323 B2 6/2020 Torresani et al.
10,722,096 B2 7/2020 Gary, Jr. et al.
10,764,374 B1 9/2020 Marquardt et al.
10,769,903 B2 9/2020 Wedig et al.
10,769,904 B2 9/2020 Wedig et al.
10,769,916 B2 9/2020 Kim et al.
10,769,929 B2 9/2020 Qiu et al.
10,777,052 B2 9/2020 Wedig et al.
10,823,499 B2 11/2020 Manning et al.
10,836,578 B2 11/2020 Bokelman et al.
10,846,705 B2 11/2020 Salajegheh et al.
10,848,567 B1 11/2020 Von Muenster et al.
10,942,251 B2 3/2021 Kulkarni et al.
10,957,182 B2 3/2021 Judice et al.
11,030,871 B2 6/2021 Wedig et al.
11,238,710 B2 2/2022 Wedig et al.
11,405,230 B2 8/2022 Britt et al.
11,593,296 B2 2/2023 Chen et al.
11,828,678 B2 11/2023 Kriss et al.
11,989,042 B1 5/2024 Wedig et al.
12,574,786 B2 3/2026 Joseph et al.
2002/0161545 A1 10/2002 Starling et al.
2003/0000233 A1 1/2003 Mazereeuw
2003/0033165 A1 2/2003 Inoue et al.
2003/0074912 A1 4/2003 Maeda
2004/0016242 A1 1/2004 Song et al.
2005/0008539 A1 1/2005 Matsuura et al.
2005/0120727 A1 6/2005 Flinner et al.
2005/0132725 A1 6/2005 Menten et al.
2006/0063141 A1 3/2006 Mcgann et al.
2006/0123806 A1 6/2006 Vassilev et al.
2006/0143520 A1 6/2006 Matsushima et al.
2006/0146773 A1 7/2006 An et al.
2006/0150662 A1 7/2006 Lee et al.
2006/0272341 A1 12/2006 Shin et al.
2007/0220907 A1 9/2007 Ehlers
2008/0098761 A1 5/2008 Zangari et al.
2008/0250324 A1 10/2008 Ito
2009/0024726 A1 1/2009 Jeon et al.
2009/0071175 A1 3/2009 Pham
2009/0277199 A1 11/2009 Manas et al.
2010/0152904 A1 6/2010 Kawaguchi et al.
2011/0106759 A1 5/2011 Brown, III
2011/0132009 A1 6/2011 Lee
2012/0016608 A1 1/2012 Ko et al.
2012/0278454 A1 11/2012 Stewart et al.
2013/0339104 A1 12/2013 Bose
2014/0074730 A1 3/2014 Arensmeier et al.
2014/0165614 A1 6/2014 Manning et al.
2014/0216071 A1 8/2014 Broadbent
2014/0244825 A1 8/2014 Cao et al.
2014/0250925 A1 9/2014 Prabowo et al.
2014/0330685 A1 11/2014 Nazzari
2015/0134761 A1 5/2015 Sharma et al.
2015/0285552 A1 10/2015 Swaidan et al.
2016/0018158 A1 1/2016 Yokoo et al.
2016/0134432 A1 5/2016 Hund et al.
2016/0204953 A1 7/2016 Kim et al.
2016/0238406 A1 8/2016 Burtner et al.

(56) References Cited

U.S. PATENT DOCUMENTS

2016/0290713 A1 10/2016 Twiggar, III et al.
2016/0299038 A1 10/2016 Liu et al.
2016/0334127 A1 11/2016 Rupp et al.
2016/0334157 A1 11/2016 Broadbent et al.
2017/0152132 A1 6/2017 Laible
2017/0169189 A1 6/2017 Belz et al.
2017/0186079 A1 6/2017 Kim et al.
2017/0220985 A1 8/2017 White et al.
2017/0250834 A1 8/2017 Hsiao
2017/0292780 A1 10/2017 Li
2017/0351241 A1 12/2017 Bowers et al.
2018/0003572 A1 1/2018 Garsd et al.
2018/0005307 A1 1/2018 Abedin
2018/0013579 A1 1/2018 Fairweather et al.
2018/0017301 A1 1/2018 Shockley et al.
2018/0102918 A1 4/2018 Amini et al.
2018/0128713 A1 5/2018 Kriss et al.
2018/0137457 A1 5/2018 Sachs et al.
2018/0176774 A1 6/2018 Miller
2018/0187969 A1 7/2018 Kim et al.
2018/0197175 A1 7/2018 Groarke
2018/0211208 A1 7/2018 Winkle et al.
2018/0234266 A1 8/2018 Rudolph et al.
2018/0253684 A1* 9/2018 Nazzari .................. G06Q 10/08
2018/0306476 A1 10/2018 Brady et al.
2018/0306609 A1 10/2018 Agarwal et al.
2018/0321356 A1 11/2018 Kulkarni et al.
2018/0338280 A1 11/2018 Zakaria et al.
2018/0376417 A1 12/2018 Wang et al.
2019/0003757 A1 1/2019 Miros et al.
2019/0044786 A1 2/2019 Wouhaybi et al.
2019/0066239 A1 2/2019 Touchette et al.
2019/0073800 A1 3/2019 Lochny
2019/0078833 A1 3/2019 Graziano
2019/0086145 A1* 3/2019 Tran ................... G05B 23/0283
2019/0094827 A1 3/2019 Park et al.
2019/0107830 A1 4/2019 Duraisingh et al.
2019/0109713 A1 4/2019 Clark et al.
2019/0133165 A1 5/2019 Schmitz
2019/0155270 A1 5/2019 Reddipalli et al.
2019/0174207 A1 6/2019 Cella et al.
2019/0182259 A1 6/2019 Qian et al.
2019/0182345 A1 6/2019 Ji et al.
2019/0190739 A1 6/2019 Guinard et al.
2019/0191284 A1 6/2019 Tran et al.
2019/0196430 A1 6/2019 Seo et al.
2019/0245713 A1 8/2019 Lo et al.
2019/0295542 A1* 9/2019 Huang .................... G06F 3/167
2019/0323767 A1 10/2019 Meyers
2019/0331409 A1 10/2019 Jung et al.
2019/0333027 A1 10/2019 Jones et al.
2019/0342178 A1 11/2019 Balasubramanian et al.
2019/0368805 A1 12/2019 Jung et al.
2019/0390897 A1 12/2019 Lee et al.
2020/0003482 A1 1/2020 Kim et al.
2020/0018541 A1 1/2020 Villanueva et al.
2020/0076640 A1 3/2020 Han et al.
2020/0080769 A1 3/2020 Han et al.
2020/0090192 A1 3/2020 Sim et al.
2020/0092127 A1 3/2020 Park et al.
2020/0096253 A1 3/2020 Han et al.
2020/0097776 A1 3/2020 Kim et al.
2020/0106633 A1 4/2020 Park et al.
2020/0119946 A1 4/2020 Ramirez et al.
2020/0124329 A1 4/2020 Han et al.
2020/0132364 A1 4/2020 Tran et al.
2020/0141621 A1 5/2020 Brady
2020/0143294 A1 5/2020 Brady et al.
2020/0169429 A1 5/2020 Suzuki et al.
2020/0173719 A1 6/2020 Jaakkola
2020/0195716 A1 6/2020 Allsbrook et al.
2020/0219377 A1 7/2020 Shoari
2020/0220932 A1 7/2020 Gardner et al.
2020/0225626 A1 7/2020 Huo et al.
2020/0225655 A1 7/2020 Cella et al.
2020/0248953 A1 8/2020 Fujii
2020/0252231 A1 8/2020 Nakashima
2020/0257321 A1* 8/2020 Ranjan .................... F25D 29/00
2020/0260653 A1 8/2020 Douglas et al.
2020/0261612 A1 8/2020 Wei et al.
2020/0278915 A1 9/2020 Degaonkar et al.
2020/0285258 A1 9/2020 Kates
2020/0286187 A1 9/2020 Munir et al.
2020/0295963 A2 9/2020 Dulski et al.
2020/0317445 A1 10/2020 Schultz et al.
2020/0322177 A1 10/2020 Kim et al.
2020/0402059 A1 12/2020 Kapur et al.
2021/0019429 A1 1/2021 Cooner
2021/0076319 A1 3/2021 Yoshikawa et al.
2021/0088247 A1 3/2021 Kriss
2021/0088390 A1 3/2021 Kriss
2021/0125143 A1 4/2021 Bartlett
2021/0243081 A1 8/2021 Pal et al.
2021/0247134 A1 8/2021 Gray et al.
2021/0264385 A1 8/2021 Mckelvy et al.
2021/0280034 A1 9/2021 Wedig et al.
2021/0307189 A1 9/2021 Purushothaman et al.
2021/0325447 A1 10/2021 Liu et al.
2021/0348834 A1 11/2021 Kaemingk
2021/0365956 A1* 11/2021 No ....................... G06Q 30/016
2021/0387350 A1 12/2021 Oleynik
2022/0011045 A1 1/2022 Hirsch et al.
2022/0014878 A1 1/2022 Lee
2022/0034847 A1 2/2022 Spencer et al.
2022/0049895 A1 2/2022 Oh et al.
2022/0058069 A1 2/2022 Bhatia et al.
2022/0155005 A1* 5/2022 Lee ................... H04M 1/72403
2022/0163930 A1* 5/2022 Sridharan .............. G05B 15/02
2022/0238004 A1 7/2022 Shoari et al.
2022/0309513 A1 9/2022 Shinar et al.
2022/0329429 A1 10/2022 Hallberg
2022/0390285 A1 12/2022 Parrott et al.
2022/0391916 A1 12/2022 Varia
2023/0091394 A1 3/2023 Yi et al.
2023/0141593 A1 5/2023 Ramer
2023/0160629 A1 5/2023 Rode et al.
2023/0175769 A1* 6/2023 Zentner ................... F25D 29/00
62/126
2023/0186249 A1 6/2023 Deivasigamani et al.
2023/0224612 A1 7/2023 Cates
2023/0246923 A1 8/2023 Cokely et al.
2023/0332825 A1 10/2023 Park et al.
2023/0332830 A1 10/2023 Horii et al.
2023/0349608 A1 11/2023 Tiernan et al.
2023/0401310 A1 12/2023 Davis et al.
2024/0039998 A1 2/2024 Gothe
2024/0040423 A1 2/2024 Gothe
2024/0280303 A1 8/2024 Vidal Clos et al.
2024/0344763 A1 10/2024 Kim et al.
2025/0168232 A1 5/2025 Vidal et al.
2026/0195498 A1 7/2026 Valecha et al.

FOREIGN PATENT DOCUMENTS

WO 2005057093 A3 3/2006
WO 2010089193 A2 8/2010
WO 2011030288 A1 3/2011
WO 2012004747 A1 1/2012
WO 2013040854 A1 3/2013
WO 2013118142 A2 8/2013
WO 2013139189 A1 9/2013
WO 2014141538 A1 9/2014
WO 2016131609 A1 8/2016
WO 2017020658 A1 2/2017
WO 2017033240 A1 3/2017
WO 2017100897 A1 6/2017
WO 2017107398 A1 6/2017
WO 2017141265 A1 8/2017
WO 2017179188 A1 10/2017
WO 2017193234 A1 11/2017
WO 2017193235 A1 11/2017
WO 2017193236 A1 11/2017
WO 2017193237 A1 11/2017
WO 2017193238 A1 11/2017

(56) References Cited

FOREIGN PATENT DOCUMENTS

| | | | |
|---|---|---|---|
| WO | 2018000986 | A1 | 1/2018 |
| WO | 2018023434 | A1 | 2/2018 |
| WO | 2018023435 | A1 | 2/2018 |
| WO | 2018023436 | A1 | 2/2018 |
| WO | 2018044091 | A1 | 3/2018 |
| WO | 2018163402 | A1 | 9/2018 |
| WO | 2018227714 | A1 | 12/2018 |
| WO | 2019035109 | A1 | 2/2019 |
| WO | 2019041962 | A1 | 3/2019 |
| WO | 2019042408 | A1 | 3/2019 |
| WO | 2019158754 | A9 | 12/2019 |
| WO | 2020031433 | A1 | 2/2020 |
| WO | 2020111961 | A1 | 6/2020 |
| WO | 2020135315 | A1 | 7/2020 |
| WO | 2020205820 | A1 | 10/2020 |
| WO | 2021063475 | A1 | 4/2021 |
| WO | 2022156973 | A1 | 7/2022 |

OTHER PUBLICATIONS

International Search Report and Written Opinion from PCT Application No. PCT/US23/29025, dated Jan. 24, 2024, 38 pages.

Commercial Freezer Temperature Monitoring Starter Kit, Lonestar Tracking, 8 pages.

EpiSensor IIoT Platform Features retrieved from https://metromatics.com.au/episensor-iiot-platform-features/ on Oct. 27, 2021, 8 pages.

User Guide LoRa SPY www.jri-corp.com, 16 pages.

LoRa Spy T2, www.jri-corp.com, 2 pages.

Refrigeration Temerature Monitoring Solution, T-Mobile, 3 pages.

RS485-LN—RS485 / Modbus to LoRaWAN Converter, Dragino, last modified on Jan. 7, 2021, 2 pages.

RS485-LN—RS485 to LoRaWAN Converter User Manual, last modified on Jan. 7, 2021, Dragino, 30 pages.

Industrial IoT for Fridge Monitoring, retrieved from https://metromatics.com.au/product/industrial-iot-for-fridge-monitoring/ on Oct. 27, 2021, 2 pages.

* cited by examiner

FIG. 4

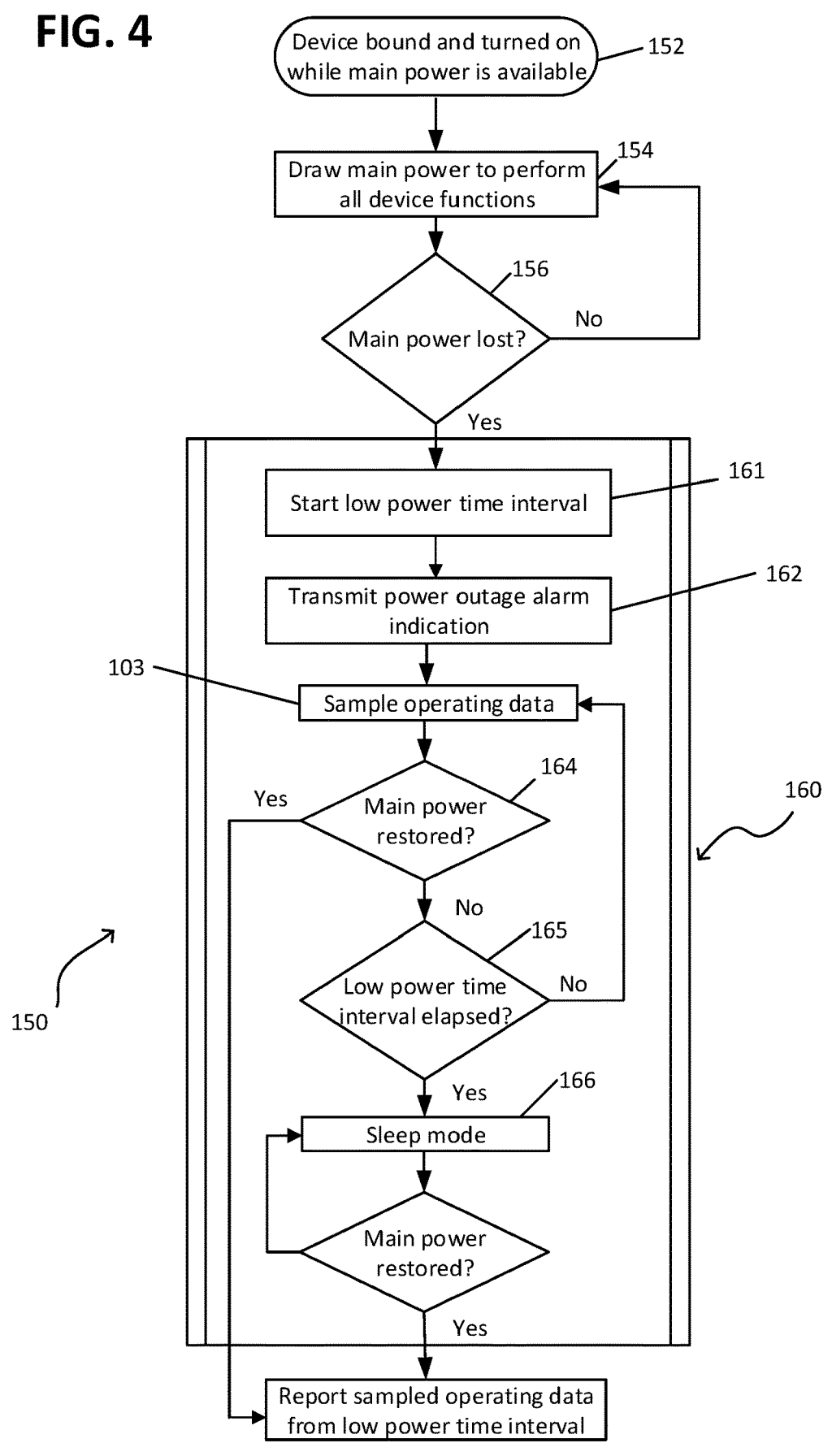

Device bound and turned on while main power is available 152
Draw main power to perform all device functions 154
Main power lost? 156
No
Yes
Start low power time interval 161
Transmit power outage alarm indication 162
Sample operating data 103
Main power restored? 164
Yes
No
Low power time interval elapsed? 165
No
Yes
Sleep mode 166
Main power restored?
Yes
Report sampled operating data from low power time interval
160
150

350 true

Figure 6G:
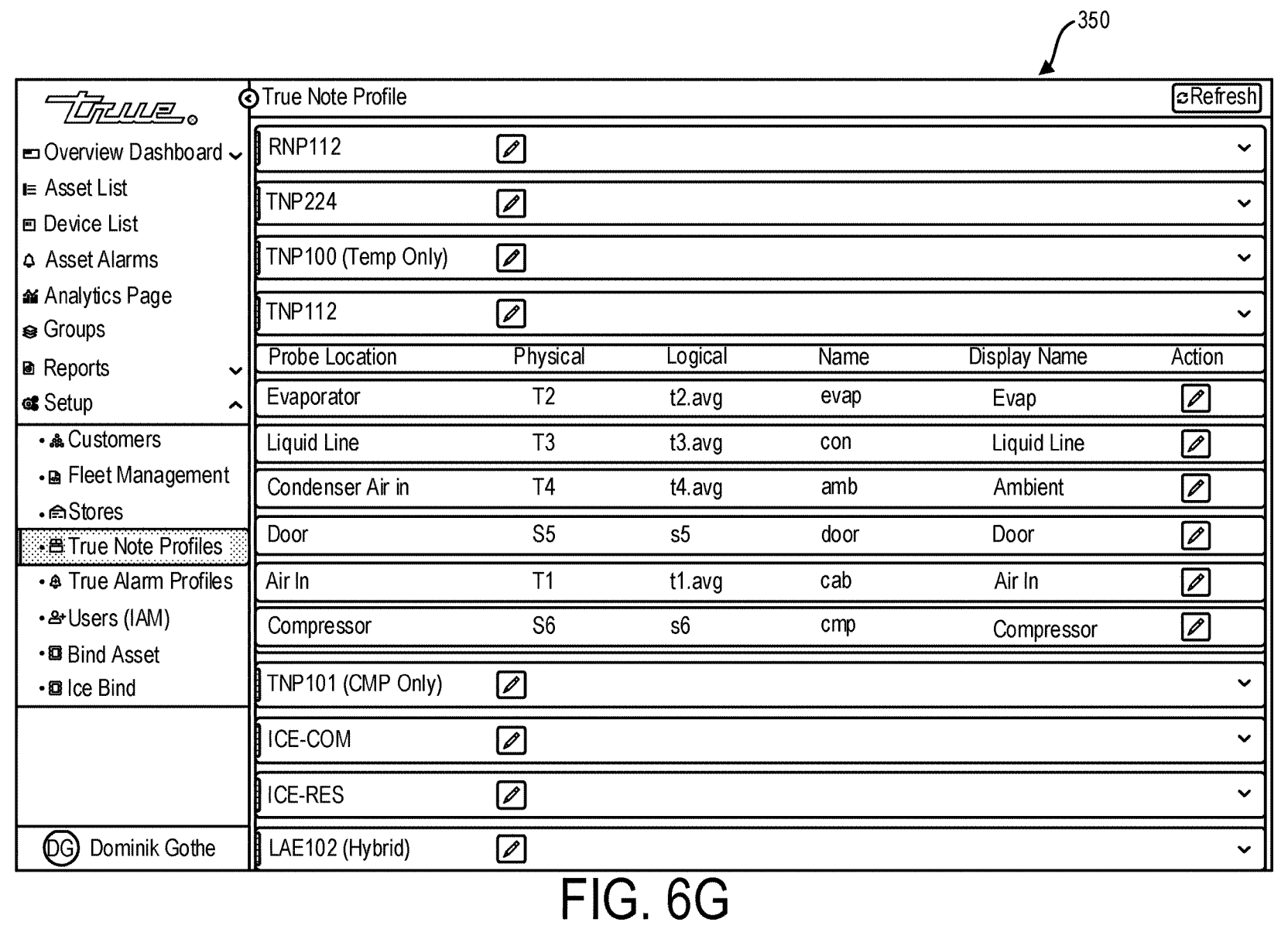

- Overview Dashboard
- Asset List
- Device List
- Asset Alarms
- Analytics Page
- Groups
- Reports
- Setup
  - Customers
  - Fleet Management
  - Stores
  - True Note Profiles
  - True Alarm Profiles
  - Users (IAM)
  - Bind Asset
  - Ice Bind DG Dominik Gothe True Note Profile Refresh

- RNP112
- TNP224
- TNP100 (Temp Only)
- TNP112

| Probe Location | Physical | Logical | Name | Display Name | Action |
|---|---|---|---|---|---|
| Evaporator | T2 | t2.avg | evap | Evap | |
| Liquid Line | T3 | t3.avg | con | Liquid Line | |
| Condenser Air in | T4 | t4.avg | amb | Ambient | |
| Door | S5 | s5 | door | Door | |
| Air In | T1 | t1.avg | cab | Air In | |
| Compressor | S6 | s6 | cmp | Compressor | |

- TNP101 (CMP Only)
- ICE-COM
- ICE-RES
- LAE102 (Hybrid)

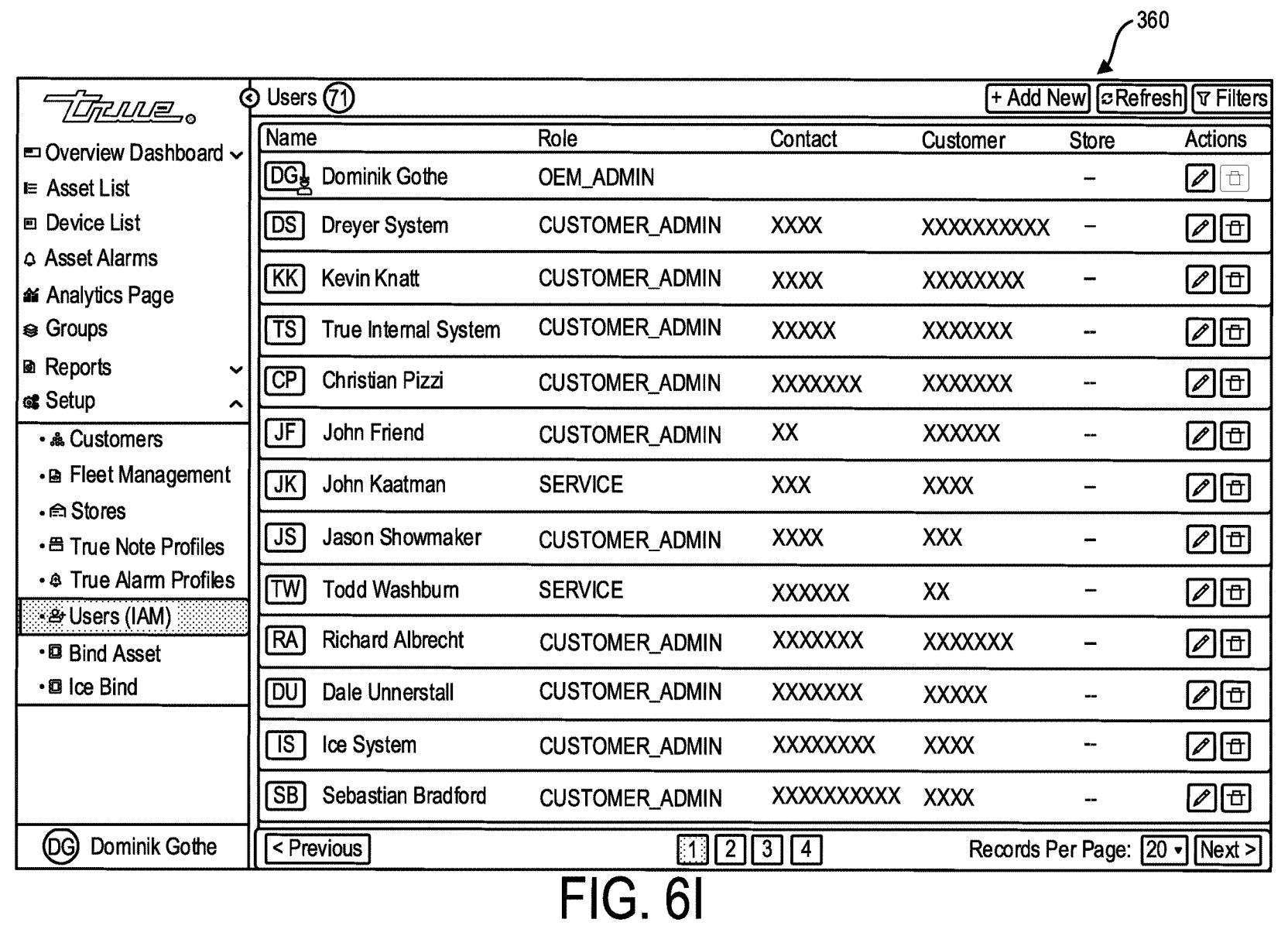

True

- Overview Dashboard
- Asset List
- Device List
- Asset Alarms
- Analytics Page
- Groups
- Reports
- Setup
  - Customers
  - Fleet Management
  - Stores
  - True Note Profiles
  - True Alarm Profiles
  - Users (IAM)
  - Bind Asset
  - Ice Bind DG Dominik Gothe Users 71 + Add New Refresh Filters

| Name | Role | Contact | Customer | Store | Actions |
|---|---|---|---|---|---|
| DG Dominik Gothe | OEM_ADMIN | | | – | |
| DS Dreyer System | CUSTOMER_ADMIN | XXXX | XXXXXXXXXX | – | |
| KK Kevin Knatt | CUSTOMER_ADMIN | XXXX | XXXXXXXX | – | |
| TS True Internal System | CUSTOMER_ADMIN | XXXXX | XXXXXXX | – | |
| CP Christian Pizzi | CUSTOMER_ADMIN | XXXXXXX | XXXXXXX | – | |
| JF John Friend | CUSTOMER_ADMIN | XX | XXXXXX | – | |
| JK John Kaatman | SERVICE | XXX | XXXX | – | |
| JS Jason Showmaker | CUSTOMER_ADMIN | XXXX | XXX | – | |
| TW Todd Washburn | SERVICE | XXXXXX | XX | – | |
| RA Richard Albrecht | CUSTOMER_ADMIN | XXXXXXX | XXXXXXX | – | |
| DU Dale Unnerstall | CUSTOMER_ADMIN | XXXXXXX | XXXXX | – | |
| IS Ice System | CUSTOMER_ADMIN | XXXXXXXX | XXXX | – | |
| SB Sebastian Bradford | CUSTOMER_ADMIN | XXXXXXXXXX | XXXX | – | |

< Previous 1 2 3 4 Records Per Page: 20 Next >

FIG. 6I

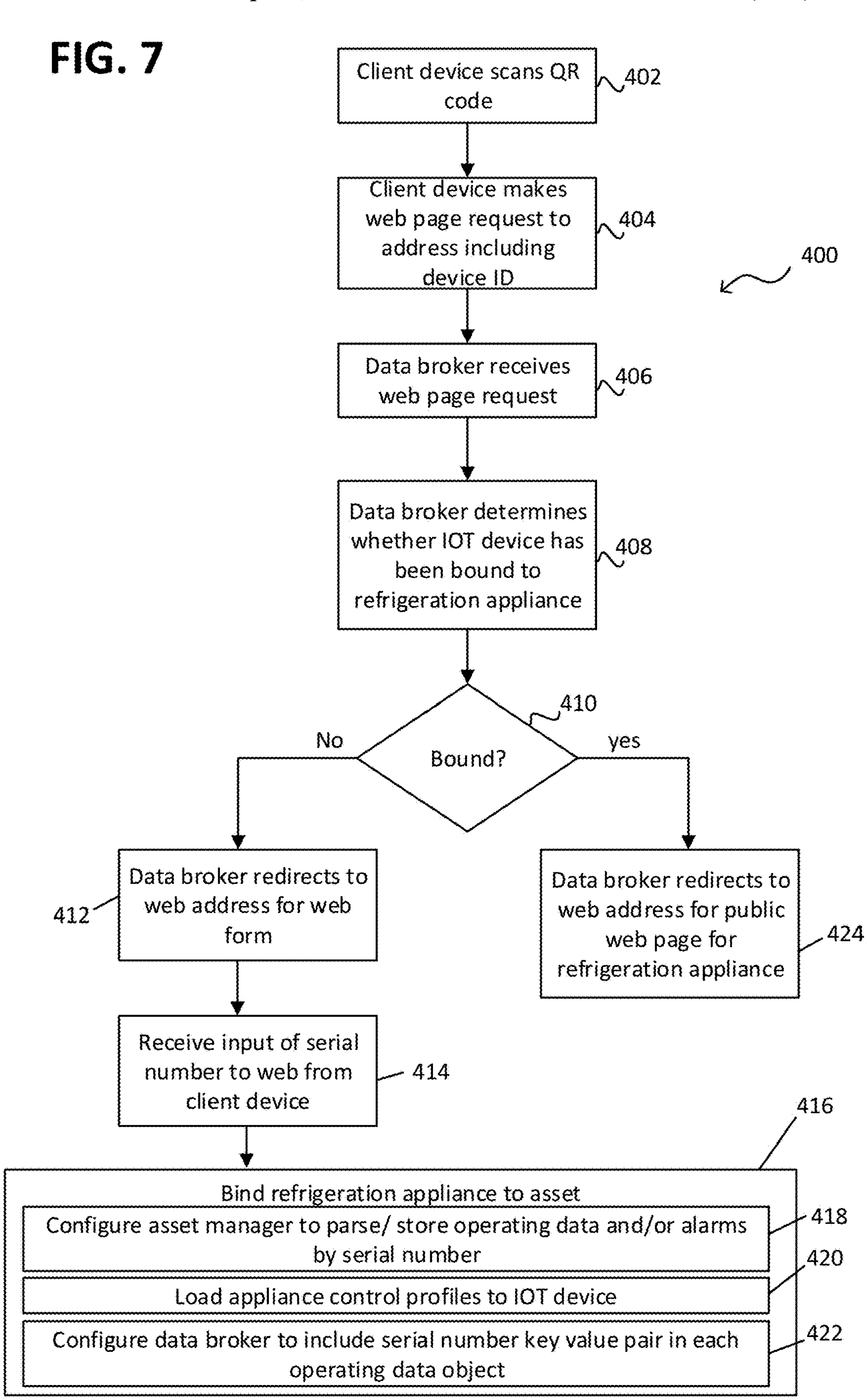
FIG. 7
Client device scans QR code
402
Client device makes web page request to address including device ID
404
400
Data broker receives web page request
406
Data broker determines whether IOT device has been bound to refrigeration appliance
408
410
No
Bound?
yes
Data broker redirects to web address for web form
412
Data broker redirects to web address for public web page for refrigeration appliance
424
Receive input of serial number to web from client device
414
416
Bind refrigeration appliance to asset
Configure asset manager to parse/ store operating data and/or alarms by serial number
418
420
Load appliance control profiles to IOT device
Configure data broker to include serial number key value pair in each operating data object
422

| Average | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 2021-T1 | -- | -- | -- | -- | -- | -- | -- | -- | -- | -- | 5.5 | -- | -- | -- | -- | -- | -- | -- | -- | -- | -- | -- | -- | -- |
| 2021-T1 | 0.38 | 1.47 | 2.71 | 3.71 | 3.37 | 3.34 | 3.71 | 2.34 | 3.41 | 5.5 | 0.4 | -- | -- | -- | -- | -- | -- | -- | -- | -- | -- | -- | -- | -- |
| 2021-T1 | 0.37 | 1.46 | 2.70 | 3.72 | 5.4 | 3.64 | 3.71 | 2.71 | 2.41 | 2.71 | 0.37 | 3.46 | 2.70 | 3.72 | 3.64 | 2.41 | 3.64 | 2.46 | 2.71 | 2.46 | 3.4 | 2.7 | 3.4 | 5.5 |
| 2021-T1 | 0.36 | 1.45 | 2.4 | 3.73 | 3.41 | 3.63 | 6.7 | 3.34 | 3.77 | 3.70 | 0.36 | 3.45 | 2.4 | 3.73 | 3.63 | 3.77 | 3.63 | 2.45 | 3.70 | 3.64 | 3.63 | 3.63 | 3.63 | 2.71 |
| 2021-T1 | 03.5 | 1.44 | 2.69 | 3.74 | 3.71 | 3.71 | 2.41 | 3.34 | 3.41 | 3.78 | 03.5 | 3.44 | 2.69 | 3.74 | 3.71 | 3.41 | 3.71 | 2.44 | 3.78 | 3.63 | 3.71 | 3.71 | 3.71 | 3.70 |
| 2021-T1 | 0.34 | 1.43 | 2.68 | 3.75 | 3.78 | 3.34 | 2.22 | 2.22 | 2.52 | 2.61 | 0.34 | 3.43 | 2.68 | 3.75 | 3.34 | 2.52 | 3.34 | 2.43 | 2.61 | 3.71 | 3.34 | 3.34 | 3.34 | 3.78 |
| 2021-T1 | 0.32 | 1.42 | 2.67 | 3.76 | 3.76 | 3.36 | 3.64 | 3.64 | 3.41 | 3.62 | 0.32 | 3.42 | 2.67 | 3.76 | 3.36 | 3.41 | 3.36 | 2.42 | 3.62 | 3.34 | 3.36 | 3.36 | 3.36 | 2.61 |
| 2021-T1 | -- | -- | -- | -- | -- | -- | -- | -- | -- | -- | -- | -- | -- | -- | -- | -- | -- | -- | -- | 3.36 | 6.72 | 4.11 | 4.72 | 3.62 |

FIG. 11

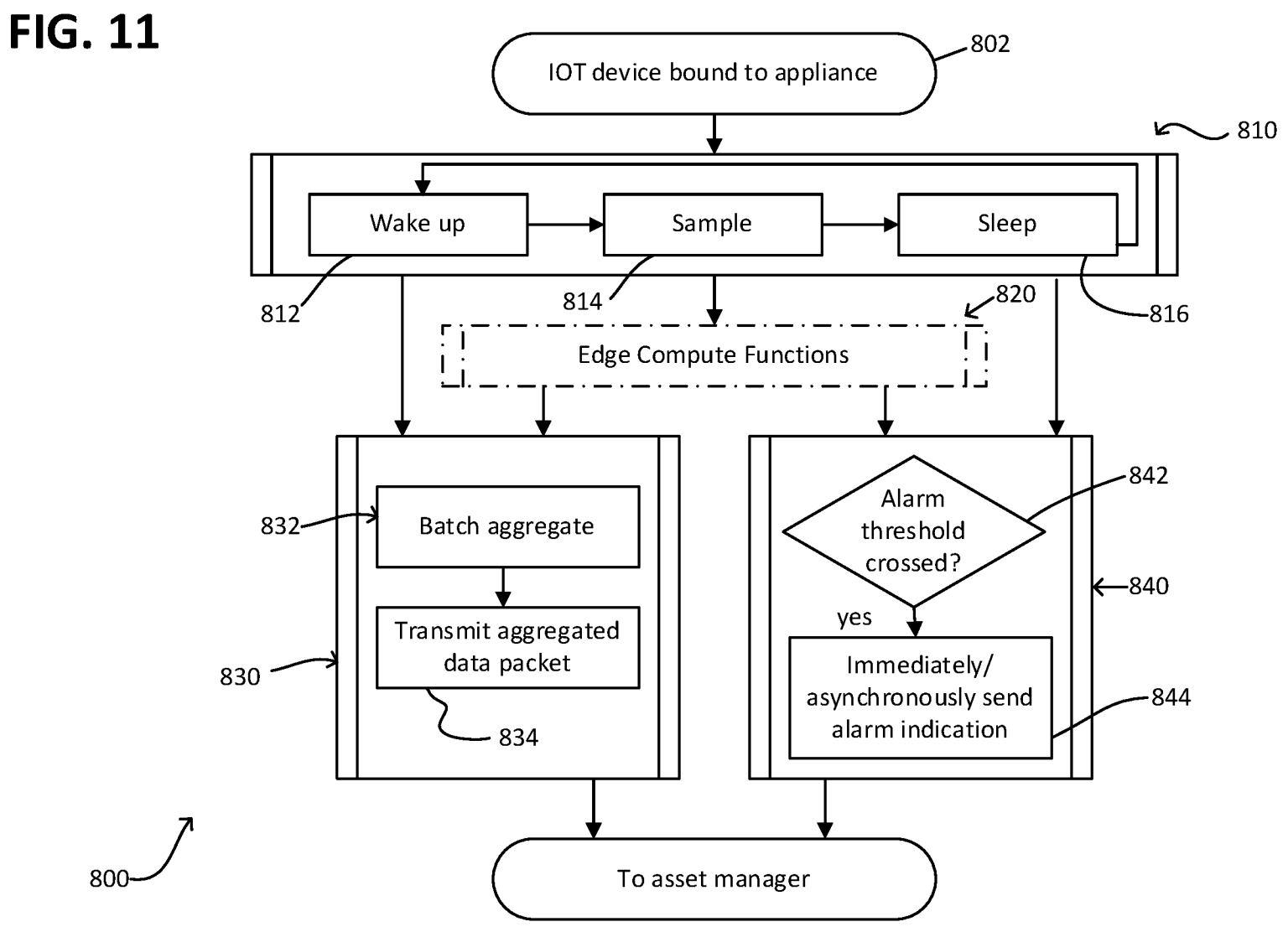

IOT device bound to appliance

802

810

Wake up

812

Sample

814

Sleep

816

Edge Compute Functions

820

Batch aggregate

832

Transmit aggregated data packet

834

830

Alarm threshold crossed?

842 yes

Immediately/ asynchronously send alarm indication

844

840

To asset manager

800

IOT device bound to appliance
802'
810'
Wake up
Sample return air temperature
Sleep
812'
814'
816'
Edge Compute Product Simulation
820'
840'
832'
Batch aggregate
Transmit aggregated data packet
830'
834'
Product temp threshold crossed?
842'
yes
Immediately/ asynchronously send alarm indication
844'
To asset manager
800'

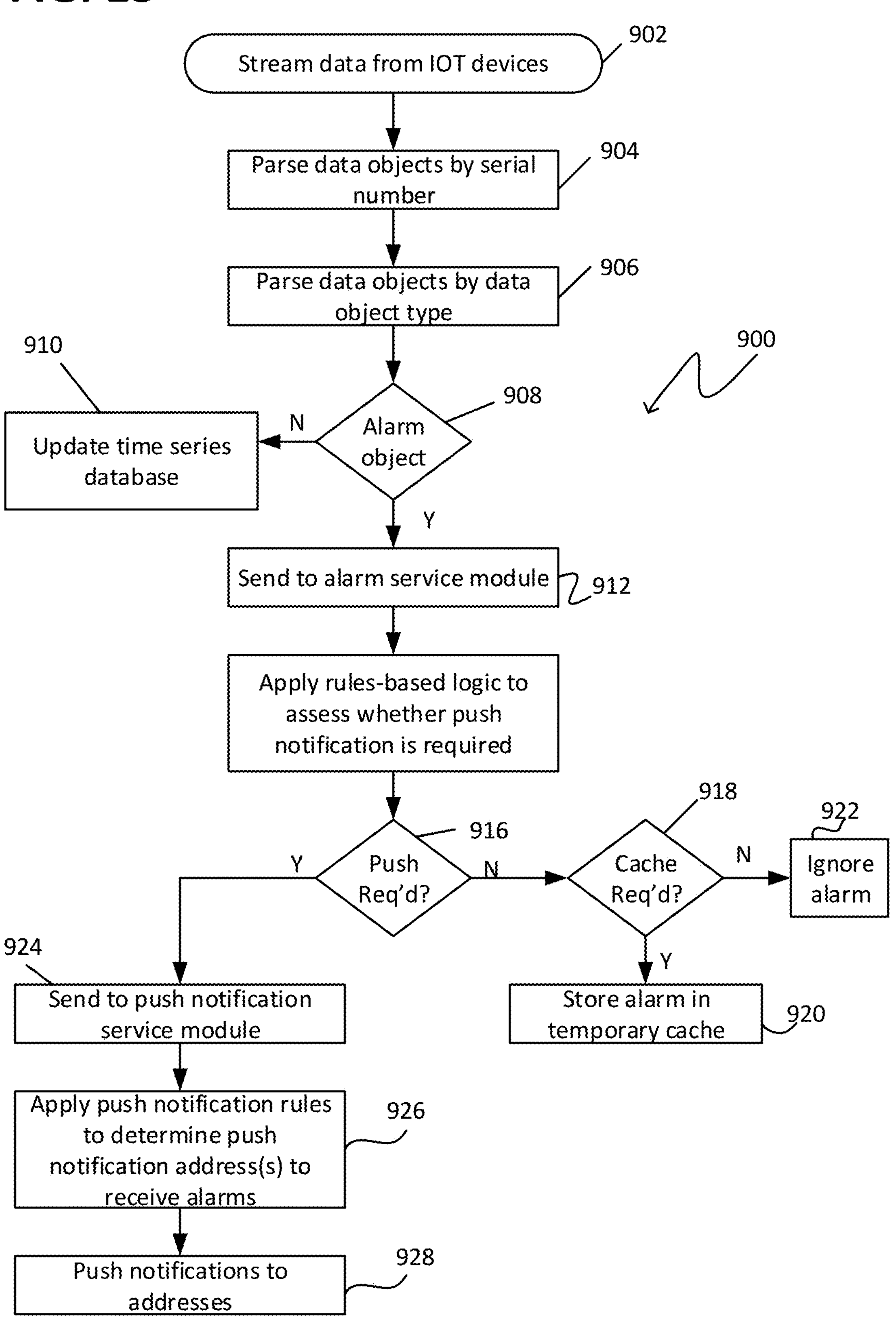
FIG. 13
Stream data from IOT devices
902
Parse data objects by serial number
904
Parse data objects by data object type
906
900
910
Update time series database
N
Alarm object
908
Y
Send to alarm service module
912
Apply rules-based logic to assess whether push notification is required
918
922
916
Y
Push Req'd?
N
Cache Req'd?
N
Ignore alarm
924
Y
Send to push notification service module
Store alarm in temporary cache
920
Apply push notification rules to determine push notification address(s) to receive alarms
926
Push notifications to addresses
928

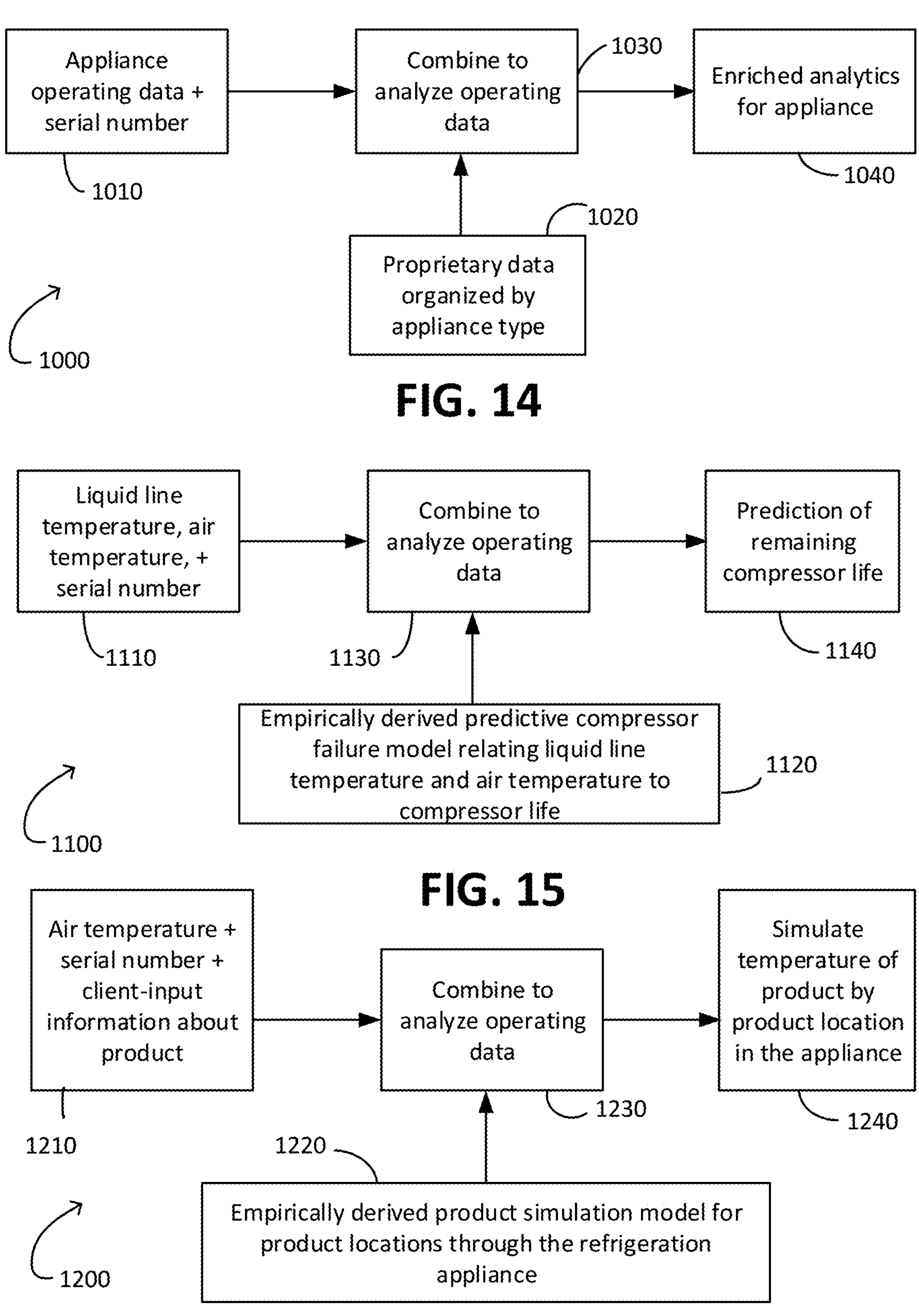
Appliance operating data + serial number
1010
Combine to analyze operating data
1030
Enriched analytics for appliance
1040
Proprietary data organized by appliance type
1020
1000
FIG. 14
Liquid line temperature, air temperature, + serial number
1110
Combine to analyze operating data
1130
Prediction of remaining compressor life
1140
Empirically derived predictive compressor failure model relating liquid line temperature and air temperature to compressor life
1120
1100
FIG. 15
Air temperature + serial number + client-input information about product
1210
Combine to analyze operating data
1230
Simulate temperature of product by product location in the appliance
1240
1220
Empirically derived product simulation model for product locations through the refrigeration appliance
1200
FIG. 16

ASSET MANAGEMENT AND IOT DEVICE FOR REFRIGERATED APPLIANCES

CROSS-REFERENCE TO RELATED APPLICATION

This Application is a continuation of International PCT Application No. PCT/US23/29015, Jul. 28, 2023, which claims priority to U.S. Provisional Patent Application No. 63/393,092, filed Jul. 28, 2022, each of which is hereby incorporated by reference in its entirety.

FIELD

This disclosure generally pertains to remote asset management systems for refrigeration appliances and internet of things (IOT) devices that facilitate connecting refrigeration appliances to such remote asset management systems.

BACKGROUND

Refrigeration appliances are in wide residential and commercial use. Such refrigeration appliances include coolers, freezers, and ice makers. Refrigeration appliances are one element of the cold chain. There is significant interest in developing network-based remote asset management technologies for remotely monitoring and controlling assets throughout the cold chain, including refrigeration appliances. The industry believes that cold chain asset management solutions could be used to improve product safety and reduce product loss due to equipment misuse and malfunction. Further, it has been proposed to combine cold chain monitoring with big data techniques to identify patterns, anomalies, and usage trends, in order to predict maintenance needs, optimize energy consumption, and take proactive action to avoid equipment failure.

Most state of the art asset management systems for refrigeration appliance monitoring utilize internet of things (IOT) accessories. These IOT devices are typically developed by the tech industry and therefore are designed around tech industry standards and assumptions. The typical IOT device setup includes one or more accessory sensors that are connected (wired or wirelessly) to a gateway device near the appliance. The gateway device acts as a bridge between the sensors and a remote asset manager. The industry has considered various types of communication protocols for gateway devices, including wired Ethernet, Wi-Fi, long-range radio (e.g., LoRaWAN), and cellular (e.g., GSM, CDMA, UMTS, LTE, URLLC, 2G, 3G, 5G). Because IOT solutions for refrigeration appliance monitoring have largely been developed using tech industry protocols and assumptions, communication between gateway devices and asset monitoring networks employ tech industry standards.

SUMMARY

In one aspect, an asset management system for a plurality of refrigeration appliances comprises a remote asset manager. Each refrigeration appliance has a serial number. An asset management network is connected to the asset manager. A plurality of IOT devices are connected to the refrigeration appliances and receive operating data from the refrigeration appliances. Each of the IOT devices has a modem connecting the IOT device to the asset management network. Each modem has a modem device ID. Each of the IOT devices is configured to transmit the operating data to the asset manager via the asset management network. The asset manager is configured to receive from the asset management network data objects containing operating data for respective refrigeration appliances. Each data object is tagged with the serial number of the respective refrigeration appliance. The cloud-based asset manager is configured to store the operating data in a database using the serial number of the refrigeration appliance as a primary key for the database.

In another aspect, a processor-executable method of connecting a refrigeration appliance to an asset manager in an asset management system for a plurality of refrigeration appliances comprises receiving a web page request. The web page request includes a device ID for an IOT device. It is determined, based on the device ID, that the IOT device has not been bound to a refrigeration appliance. In response to receiving the web page request for the IOT device and determining that the IOT device has not been bound to a refrigeration appliance, a web form that includes a field for input of a serial number of a refrigeration appliance is returned. After returning the web form, input of the serial number of the refrigeration appliance is received by the web form. In response to receiving input of the serial number of the refrigeration appliance to the web form, the IOT device is bound to the refrigeration appliance in the asset management system.

In another aspect, a method for operating an asset management system for a plurality of refrigeration appliances comprises transmitting first operating data for a refrigeration appliance from a first IOT device to an asset management network. The first IOT device has a first device ID. The first operating data is tagged with a serial number for the refrigeration appliance. The tagged first operating data is received from the asset management network at an asset manager. The tagged first operating data is stored by the asset manager in a time series database with the serial number for the refrigeration appliance as a primary key. Subsequently, a second IOT device having a second device ID is bound to the refrigeration appliance. Second operating data for the refrigeration appliance is transmitted from the second IOT device to the asset management network. The second operating data from the refrigeration appliance is tagged with the serial number for the refrigeration appliance. The tagged second operating data is received from the asset management network at the asset manager. The tagged second operating data is stored by the asset manager in said time series database. The time series database has the serial number for the refrigeration appliance as a primary key. The time series database is seamlessly maintained by the asset manager for the refrigeration appliance for both the first operating data transmitted by the first IOT device and the second operating data transmitted by the second IOT device.

In another aspect, an asset management system for a plurality of refrigeration appliances comprises a plurality of IOT devices. Each refrigeration appliance has a serial number. Each IOT device comprises a modem that has a device ID and is emblazoned with a machine readable code encoding a web address with the respective device ID. Each IOT device is configured to be bound to a respective one of the refrigeration appliances and is configured to use the modem to transmit operating data from the respective refrigeration appliance. A data broker is configured to receive the operating data from the plurality of IOT devices and transmit structured data objects containing the operating data. Each structured data object is tagged by the serial number of a source refrigeration appliance. The data broker is further configured to receive web page requests from one or more client devices entering said web addresses including the respective device IDs into web browsers. In response to each web page request, the data broker is configured to determine based on the included device ID whether the IOT device has been bound to a refrigeration appliance. In response to receiving a web page request and determining based on the included device ID that the IOT device has not been bound to a refrigeration appliance, the data broker is further configured to redirect the web page request to another web address for a web form including a field for inputting a serial number of a refrigeration appliance to bind the IOT device to the refrigeration appliance with the serial number input into the field. In response to receiving a web page request and determining based on the included device ID that the IOT device has been bound to a refrigeration appliance, the data broker is further configured to redirect the web page request to another web address for a public web page for displaying operating data for the respective refrigeration appliance. An asset manager is configured to stream the structured data objects from the data broker, parse the streamed structured data objects by serial number of the source refrigeration appliance, and store the operating data contained in the structured data objects in a time series database using the serial numbers of the source refrigeration appliances as primary keys.

In another aspect, an asset management system for a plurality of refrigeration appliances comprises a plurality of IOT devices. Each refrigeration appliance is one of a plurality of different refrigeration appliance types. Each IOT device is bound to a respective refrigeration appliance. The refrigeration appliance comprises a modem configured for network communication and one or more I/O ports configured for wired connection to the respective refrigeration appliance. An asset manager is configured to receive operating data from source refrigeration appliances transmitted via the modems of the plurality of IOT devices. The asset manager is configured to parse the operating data by source refrigeration appliance and store the operating data in a time series database for each source refrigeration appliance. An OEM database contains proprietary OEM data organized by refrigeration appliance type. The asset manager is configured to read the proprietary OEM data from the OEM database. The asset manager is configured to act on the operating data for at least one refrigeration appliance of a specified refrigeration appliance type by combining the operating data for said at least one refrigeration appliance of the specified refrigeration appliance type with the proprietary OEM data for said specified refrigeration appliance type.

In another aspect, an asset management system for a plurality of refrigeration appliances comprises a plurality of IOT devices. Each refrigeration appliance has a unique serial number and is one of a plurality of different refrigeration appliance types. Each IOT device is bound to a respective refrigeration appliance and comprises a modem configured for network communication and one or more I/O ports configured for wired connection to the respective refrigeration appliance. An asset manager is configured to receive operating data from source refrigeration appliances transmitted via the modems of the plurality of IOT devices. The asset manager is configured to parse the operating data by the source refrigeration appliance and store the operating data for each source refrigeration appliance in a time series database. The asset manager is further configured to aggregate operating data in the time series database by appliance type. The asset manager is further configured to obtain one or more models of an appliance type based on the operating data aggregated by appliance type.

In another aspect, an IOT device for connecting a refrigeration appliance of any of a plurality of different refrigeration appliance types to a remote asset management system comprises a plurality of low voltage I/O ports. Each low voltage I/O port is configured to be selectively mated to a cable connector of the refrigeration appliance to terminate a low voltage cable connected to one of a prefabricated sensor of the refrigeration appliance and a low-voltage switch of the refrigeration appliance. A serial data port is configured to be selectively mated to a cable connector of the refrigeration appliance to terminate a serial data cable connected to a prefabricated serial data controller of the refrigeration appliance. An edge computing device is operatively connected to each of the plurality of low voltage I/O ports and the serial data port. The edge computing device has a processor and a memory configured for storing a refrigeration appliance type-specific appliance control profile to configure the processor for reading operating data from respective ones of the low voltage I/O ports and/or serial data port to which one or more low voltage cables and/or a serial data cable of a refrigeration appliance are connected. A modem is configured for network communication. The edge computing device is configured to control transmission of operating data read from the respective ones of the low voltage I/O ports and/or serial data port to the asset management system via the modem.

In another aspect, a method of connecting an IOT device to a refrigeration appliance and an asset management system comprises plugging one or more cable connectors of the refrigeration appliance into one or more of (i) a plurality of low voltage I/O ports of the IOT device and (ii) a serial data port of the I/O device. The IOT device is connected to a main power source. A modem of the IOT device is connected to an asset management network of the asset management system. A processor-executable control profile is loaded from the asset management system onto memory of an edge computing device of the IOT device to configure a processor of the edge computing device for reading operating data from said one or more of (i) the plurality of low voltage I/O ports of the IOT device and (ii) the serial data port of the I/O device. The processor transmits said operating data to the asset management system via the modem.

In another aspect, an IOT device for connecting a refrigeration appliance to a remote asset management system comprises an edge computing device. The edge computing device is configured to be operatively connected to the refrigeration appliance for reading operating data from the refrigeration appliance. A modem is configured for network communication. The edge computing device is configured to control transmission of operating data read from the refrigeration appliance to the asset management system via the modem. A main power port is configured to connect the IOT device to main power. A backup power supply is configured to power the IOT device in a main power outage. The edge computing device is configured to recognize loss of main power at the main power port, and in response, conduct a power failure routine in which the edge computing device draws power from the backup power supply. A power outage alarm notification is transmitted to the asset management system. Operating data is subsequently sampled from the refrigeration appliance during a low power time interval without transmitting the sampled operating data to the remote asset management system. After the lower power time interval elapses, the IOT device is automatically put in a sleep mode in which the edge computing device ceases sampling the operating data from the refrigeration appliance. The sampled operating data from the low power time interval is automatically reported via the modem to the asset management system when restored main power is detected at the main power port.

In another aspect, a processor-executable method for using an IOT device of a refrigeration appliance comprises drawing power from a main power supply. Operating data from the refrigeration appliance is periodically sampled and reported to an asset management system via a modem. A loss of power from the main power supply is recognized. In response to recognizing the loss of power from the main power supply, power is drawn from a backup power supply. While drawing power from the backup power supply, a power outage alarm notification is transmitted to the asset management system via the modem. The operating data from the refrigeration appliance is periodically sampled during a low power time interval. The operating data is refrained from being transmitted to the remote asset management system. After the lower power time interval elapses, sampling the operating data from the refrigeration appliances ceases. The sampled operating data is automatically reported from the low power time interval to the asset management system after power from the main power supply is restored.

In another aspect, an asset management system for refrigeration appliances comprises a plurality of IOT devices. Each IOT device has an edge computing device and a modem for connecting the IOT device to an asset management network. Each IOT device is connected to a respective refrigeration appliance. The edge computing device is configured for sampling operating data from the respective refrigeration appliance at a sampling frequency. The edge computing device is further configured for transmitting the operating data to the asset management network via the modem at a transmission frequency less than the sampling frequency. The edge computing device is further configured to analyze the sampled operating data on an edge of the asset management network for detecting an alarm condition in the operating data. The edge computing device is further configured to immediately transmit an alarm indication to the asset management network via the modem when the alarm condition is detected in the operating data. The edge computing device is configured to transmit the alarm indication asynchronously from the transmission frequency. An asset manager is in communication with the plurality of IOT devices via the asset management network. The asset manager is configured to receive a data stream from the IOT devices including the operating data and the alarm indications. The asset manager is configured to recognize each alarm indication as an event and immediately conduct event driven processing to assess whether push notification is required and push one or more notifications to one or more users when push notification is required.

In another aspect, a method of using an asset management system for a plurality of refrigeration appliances comprises sampling at a sampling frequency operating data from each refrigeration appliance at an edge computing device of a respective IOT device. Each refrigeration appliance is bound to the respective IOT device having the edge computing device and a modem. The asset management system includes an asset management network connecting the IOT devices to a remote asset manager. The operating data from each refrigeration appliance is transmitted at a transmission frequency from the modem of the respective IOT device to the asset manager via the asset management network. The transmission frequency is less than the sampling frequency. A stream of the transmitted operating data from the IOT devices is received at the asset manager. The asset manager loads the operating data into a time series database. While performing said sampling and said transmitting, an alarm condition in the operating data is detected at the edge computing device of one of the IOT devices. An alarm indication is immediately sent from the modem of said one of the IOT devices to the asset manager via the asset management network. Immediately sending the alarm indication is independent of transmitting operating data from the modem of said one of the IOT devices and is asynchronous with respect to the transmission frequency for one of the IOT devices. The alarm indication is received at the asset manager. Event driven processing is used at the asset manager to determine that the alarm indication requires push notification. One or more notifications are immediately pushed to one or more users of the refrigeration appliance bound to said one of the IOT devices.

In another aspect, an IOT device for connecting a refrigeration appliance to a remote asset management system comprises an I/O port. The I/O port is configured to connect to a cable connector terminating a wire carrying a signal including an indication of a return air temperature of the refrigeration appliance. An edge computing device is operatively connected to the I/O port. The edge computing device comprises a processor and a memory storing processor executable instructions configuring the processor for reading return air temperature data from the I/O port at a sampling frequency. A modem is configured for network communication. The edge computing device is configured to control transmission of the return air temperature data read from the I/O port to the asset management system via the modem. The edge computing device is configured to periodically run a simulation of a product temperature based on the return air temperature data read from the I/O port.

In another aspect, an asset management system for a plurality of refrigeration appliances comprises a remote asset manager configured to receive a stream of operating data from the refrigeration appliances. The asset management system comprises a plurality of edge computing devices. Each edge computing device is bound to a respective refrigeration appliance and configured to read an air temperature from the refrigeration appliance at a sampling frequency. Each edge computing device is further configured to simulate a product temperature representative of a product stored in the refrigeration appliance based on the air temperature at a simulation frequency. Each edge computing device is further configured to transmit operating data to the asset manager via an asset management network in transmissions transmitted at a transmission frequency. Each transmission includes the air temperature read from the refrigeration appliance at the sampling frequency and the product temperature simulated at the simulation frequency.

In another aspect, a processor-executable method of monitoring temperature-sensitive product stored in a refrigeration appliance comprises sampling an air temperature of the refrigeration appliance. A product temperature is simulated based on the air temperature. It is determined if the simulated product temperature exceeds a predefined temperature threshold for the temperature-sensitive product. A notification is automatically pushed to a user associated with the refrigeration appliance within 60 seconds of determining the simulated product temperature exceeds the predefined temperature threshold for the temperature sensitive product.

Other aspects and features will become apparent hereinafter.

DESCRIPTION OF THE DRAWINGS

FIG. 4 is a flow chart of a power management routine executed by the IOT device;

FIG. 6G is a screenshot of an operating data profile part view of the front end web application of the asset management system;

FIG. 6I is a screenshot of a user view of the front end web application of the asset management system;

FIG. 7 is a flow chart illustrating steps and decision points of an appliance binding process of the present disclosure;

FIG. 11 is a schematic illustration of an edge processing routine that can be conducted by an IOT device in accordance with the present disclosure;

FIG. 13 is a flow chart illustrating the steps and decision points of a backend process conducted by the backend of the asset management system;

FIG. 14 is a schematic illustration of a data enrichment process that can be conducted using the asset management system;

FIG. 15 is a schematic illustration similar to FIG. 14 but showing a particular implementation in which the data enrichment process is used for compressor life prediction;

FIG. 16 is a schematic illustration similar to FIG. 14 but showing a particular implementation in which the data enrichment process is used for temperature simulation;

Corresponding parts are given corresponding reference numbers throughout the drawings.

DETAILED DESCRIPTION

Figure 1:
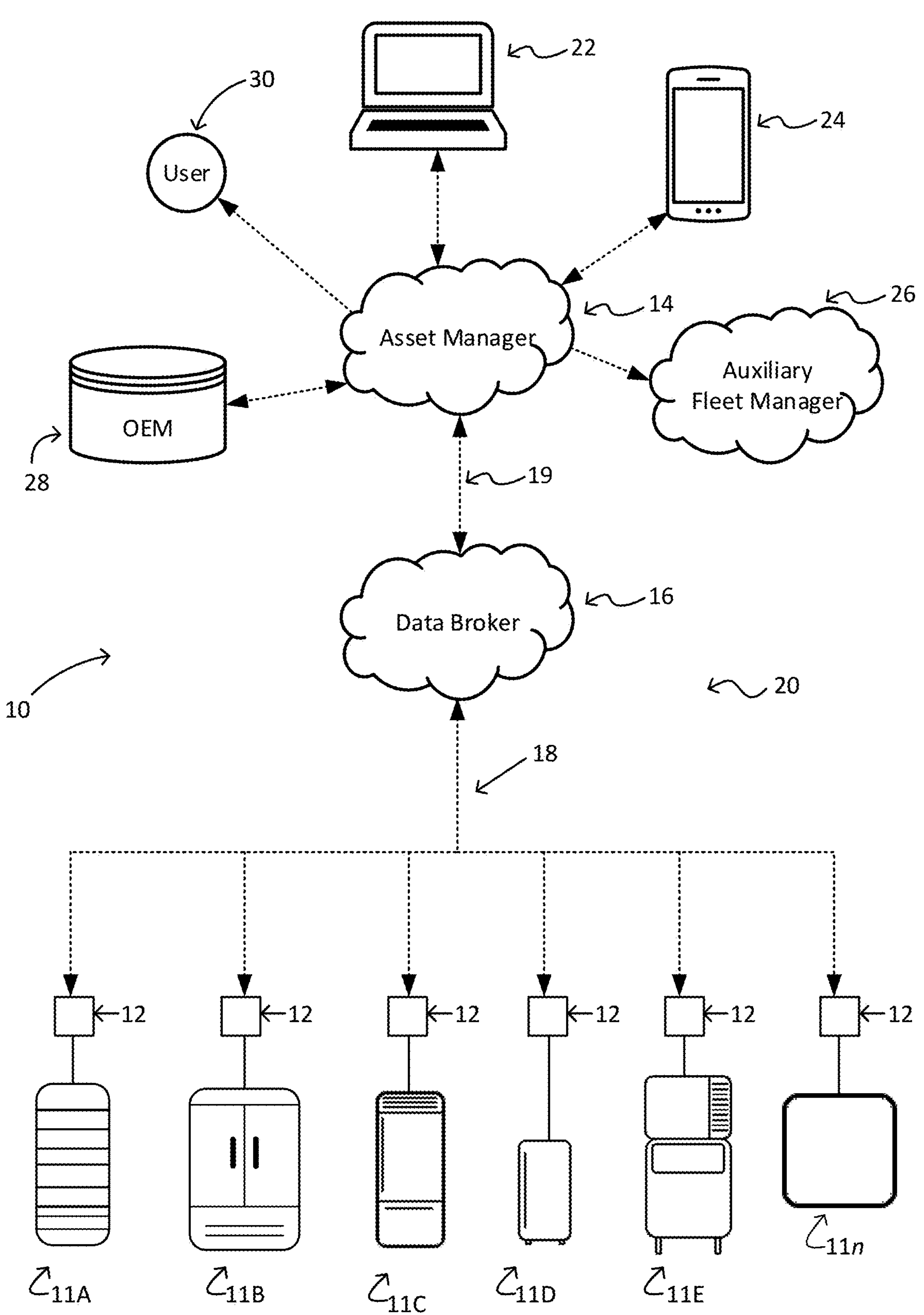
FIG. 1 is a schematic block diagram of an asset management system in accordance with the present disclosure.

This disclosure generally pertains to devices, systems, and methods providing IOT and asset management solutions for refrigeration appliances. In particular, this disclosure pertains to IOT and asset management solutions that are intended elevate the importance of the refrigeration appliance (the asset), as opposed to the accessory gateway device, in network communications. The inventor believes that the primacy of tech industry protocols and assumptions in existing IOT solutions for refrigeration appliances has inherent drawbacks, many of which can be overcome by employing one or more aspects of the present disclosure.

Fundamentally, any remote asset management system for refrigeration appliances employs some type of network gateway device in the vicinity of the appliance. The gateway device comprises a modem configured with a unique device identifier ("device ID," e.g., an IMEI for a cellular modem, a DevEUI and DevAddr for a LoRaWAN modem, an MAC address for Wi-Fi devices, etc.) which distinguishes that particular modem from all other modems. The modem is standardly configured to tag its transmissions with the device ID as a source identifier and to receive data from the network by address to its device ID. Because this is how modems are configured as standard, IOT solutions developers have conventionally used the modem device ID for the gateway device as the fundamental address for IOT communications. So for a refrigeration appliance IOT application, the gateway device will use the modem device ID as a source signifier when transmitting appliance data to a remote asset manager. Conversely, the remote asset manager will address any commands issued to the appliance using the device ID for the modem of the IOT gateway device.

In a conventional asset management system with many refrigeration appliances under management, the remote asset management system will use the modem device ID, which is the source signifier in every packet of data it receives, as the primary key in the data structures it maintains. In other words, because modem device ID is the source signifier for incoming data, the asset management system organizes data by modem device ID.

The inventor believes that addressing IOT communications for refrigeration appliances by modem device ID and organizing data by modem device ID has fundamental drawbacks. At base, this approach places the focus on the wrong entity. In an IOT asset management system for refrigeration appliances, the inventor's view is that the focus ought to be on the refrigeration appliances themselves—not the gateway devices that are essentially accessories to the refrigeration appliances. Moreover, the inventor believes that the misplacing the focus on the gateway devices instead of the refrigeration appliance has several concrete drawbacks to IOT implementation for refrigeration appliances.

As one example, associating information with the gateway device's modem ID creates data segmentation problems when multiple gateway devices are required for the same refrigeration appliance. For example, if a first gateway device for a given refrigeration appliance expires and must be replaced by a second gateway device, an asset management system that misplaces the focus onto the modem device ID will produce two separate database records, one referencing the modem ID of the first gateway device and the other referencing the modem ID of the second gateway device. This creates difficulties when there is a need to evaluate operating data that spans the use of the first and second gateway devices.

Another problem with keying IOT communications and time series data to the modem device ID is that it adds complexity to using the asset management system for fleet management and appliance improvement. The inventor believes that remote monitoring has useful applications for refrigeration appliances when the aggregate operating data from numerous appliances on the network can be parsed by known characteristics of the appliance (e.g., by appliance model number, by appliance manufacturing year, by a particular type of component that is included in the appliance, etc.). For example, as will be described in further detail below, the inventor envisions that big data techniques can be applied to identify trends and anomalies for subsets of the appliances with similar characteristics. Additionally, the inventor expects that there will be opportunities to issue commands (e.g., firmware updates, control parameter updates, etc.) to subsets of the appliance on the network with common characteristics. But by keying network communications and data organization to the modem ID instead of the refrigeration appliance, it is much more difficult to leverage these opportunities.

Again, because existing IOT solutions for refrigeration appliances have been developed using tech industry protocols and assumptions, communication between gateway devices and asset monitoring systems employ the tech industry standard of addressing and keying based on modem ID. The inventor has a fundamentally different perspective on IOT system development, namely, that of a refrigeration appliance manufacturer. Accordingly, as will be explained in further detail below, instead of addressing communications and organizing operating data according to modem device IDs, the present disclosure provides IOT systems that address communications and key operating data to refrigeration appliance serial number.

Because IOT solutions for refrigeration appliance monitoring have largely been developed by the tech industry, tech industry standards have been employed. The tech industry is inherently skeptical of addressing network communications by any identifier that is not recognized by an industry-wide communication standard (e.g., GSM, CDMA, LoRaWAN, etc.) to be uniquely indicative one particular device. But the inventor recognizes that refrigeration appliance manufacturers are well-positioned to ensure that each individual appliance is given a unique serial number distinct to that device. Moreover, the refrigeration appliance manufacturer is in position to control the nomenclature of its serial numbers so that the serial numbers provide information about the type or characteristics of the appliance that can be parsed for aggregated data analysis. Hence, the inventor believes that the serial number of the refrigeration appliance can be a suitable identifier to use for addressing IOT communications and organizing operating data.

Another downside of tech industry development of IOT solutions for refrigeration appliances is apparent at the device level. Conventional IOT solutions for refrigeration appliances comprise a gateway device that is connected to one or a small number of accessory temperature probes. These temperature probes are installed in the refrigeration appliance as relatively haphazard retrofits. Their locations and readouts do not correlate to the temperature readings and other sensor inputs that control the refrigeration appliance as standard. The inventor believes that it is preferable to configure the IOT device to interface directly with the sensors, switches, and controls (broadly, prefabricated or designed-in hardware) that are native to the refrigeration appliance. Original equipment manufacturers (OEMs) use the native sensors, switches, and controls during product design testing, regulatory testing, energy testing, or the like. Accordingly, the inventor believes that interfacing with the very same sensors, switches, and controls that were used during testing enables the application of rich proprietary datasets that original equipment manufacturers (OEMs) develop during testing. The tech industry developing IOT solutions lacks access to the rich data sets available to refrigeration appliance OEMs and thus has not placed an emphasis on taking readings from native appliance equipment. Moreover, there are substantial challenges with doing so because the equipment from one refrigeration appliance to the next varies greatly. It is much easier for the tech industry to provide a one-size-fits-all approach in which a universal gateway device connects to one or more accessory temperature probes that are placed into the refrigeration appliance as retrofits.

Referring to FIG. 1, an exemplary embodiment of an asset management system for refrigeration appliances is generally indicated at reference number 10. The asset management system 10 includes a plurality of refrigeration appliances 11A-11*n*, an IOT device 12 for each refrigeration appliance, a cloud-based asset manager 14 in communication with the IOT devices 12, an optional cloud-based data broker 16 for brokering communications between the IOT devices and the asset manager, and one or more networks 18, 19 for facilitating communication across the asset management system. In the illustrated embodiment, the networks 18, 19 and data broker 16 collectively form an asset management network 20 for connecting the refrigeration appliances 11A-11*n* to the asset manager 14. In the network architecture, the IOT devices 12 are located on the edge of the asset management network 20 for connecting the appliances 11A-11*n* to the network. The asset management system 10 is broadly configured to facilitate remote monitoring and/or control of the refrigeration appliances 11A-11*n* by the cloud-based asset manager 14. That is, the asset manager 14 comprises processor-executable software stored in memory and executed by one or more computer processors (e.g., server processors, cloud service processors, etc.) that are physically remote from the appliances 11A-11*n*. By contrast, the IOT devices 12 are located in the immediate vicinity of their respective refrigeration appliances 11A-11*n* and connected to the appliances by wires.

In the illustrated example, the refrigeration appliances include a commercial cooler 11A, a commercial freezer 11B, a residential refrigerator 11C, a residential ice maker 11D, and a commercial ice maker 11E. The appliances 11A-11E are intended to provide a schematic illustration of how the asset management system 10 is configured to connect numerous different refrigeration appliance types (e.g., model numbers) to the asset manager 14. For example, as will be explained in further detail below, the asset management system 10 is configured to connect to legacy refrigeration appliances lacking digital microcontrollers or computers, as well as to more modern refrigeration appliances that are controlled by local digital controllers (e.g., RS-485 ModBus control boards). In FIG. 1, an additional refrigeration appliance 11*n* is shown schematically to represent how the asset management system 10 is configured to connect any number of refrigeration appliances to the asset manager 12. In an exemplary embodiment, the asset management system 10 includes numerous refrigeration appliances 11*n* of different refrigeration appliance types, with many instances of each appliance type connected to the network 20. This allows for rich assessment of appliance operating data by appliance type.

In certain implementations, it is contemplated that asset management systems 10 in the scope of this disclosure are configured for massive scale and distribution. For example, in one or more embodiments there are at least 1,000 IOT devices 12 connecting at least 1,000 refrigeration appliances 11*n* to the asset management network (e.g., there are at least 10,000 IOT devices 12 connecting at least 10,000 refrigeration appliances 11*n* to the asset management network, at least at least 100,000 IOT devices 12 connecting at least 100,000 refrigeration appliances 11*n* to the asset management network, at least 500,000 IOT devices 12 connecting at least 500,000 refrigeration appliances 11*n* to the asset management network, or at least at least 1,000,000 IOT devices 12 connecting at least 1,000,000 refrigeration appliances 11*n* to the asset management network). As will be explained in further detail below, the asset manager 14 is configured to effectively parse incoming data from the massively distributed refrigeration appliances 11*n* and both (1) maintain a rich time series database organizing the incoming operating data by refrigeration appliance serial number and (2) immediately act on alarm indications contained in the incoming data.

Suitably, each refrigeration appliance 11A-11*n* on the asset management system has a unique serial number. As will be described in further detail below, the asset management system 10 is configured so that the cloud-based asset manager 14 interacts with the refrigeration appliances 11A-11*n* by reference to the appliance serial number. The asset management system 10 is essentially agnostic to the modem device IDs of the IOT devices 12. In this way, the asset management system has an asset-centric architecture and communication profile. The inventor believes that the asset-centric architecture provides for better asset management than conventional IOT asset management systems, which use modem device ID as the fundamental identifier for communication and data organization.

In one or more embodiments, many of the refrigeration appliances 11A-11*n* comprise one or more compression-driven refrigeration circuits, each including an evaporator assembly, a compressor, a condenser assembly, a drier, an expansion device, and interconnecting tubing. Those skilled in the art will be familiar with the basic components, functions, and operations of these components in a compression-driven refrigeration circuit. It is contemplated that refrigeration appliances could use secondary refrigerant circuits and/or that other types of refrigeration systems (e.g., thermoelectric refrigeration) could be used in combination with or independently of the compression-drive refrigeration circuit.

Some refrigeration appliances 11*n* in the scope of this disclosure comprise digital controllers (e.g., a serial data controller such as a Mod-Bus controller), while other refrigeration appliances in the scope of this disclosure comprise basic (e.g., analog) thermostatic control systems. As explained more fully below, the asset management system 10 is capable of interfacing with both types of refrigeration appliances. Refrigeration appliances in the scope of this disclosure will often comprise integrated sensors, such as integrated air temperature sensors (return air temperature sensor and/or supply air temperature sensor), integrated refrigerant sensors (e.g., liquid line temperature and/or pressure sensor, suction line temperature and/or pressure sensor), low voltage switches or sensors (e.g., door sensors), and/or ambient sensors (e.g., ambient temperature sensor and/or ambient humidity sensor). In addition, refrigeration appliances in the scope of this disclosure may comprise a low voltage compressor relay to indicate with the compressor is running. Ice makers (e.g., ice maker 11D, 11E) will typically comprise a host of additional sensors and indicators. For additional information about the kinds of sensors and indicators used in an ice maker, see co-assigned U.S. patent application Ser. No. 17/686,986, filed Mar. 4, 2022, which is hereby incorporated by reference in its entirety.

As will be explained in further detail below, the asset manager 10 is to monitors the refrigeration appliances 11A-11*n* via the network 20, stores operating data from the refrigeration appliances in a time series database, and analyzes the operating data. FIG. 1 schematically illustrates how the asset manager is configured to interface (via a remote network connection such as an interne connection) with a front end web application 22 and a front end mobile application 24. The front end applications 22, 24 enable users of the asset management system 10, such as owners or operators of some of the refrigeration appliances 11A-11*n*, to view operating data about their appliances in real time. In addition, the front end applications 22, 24 enable certain users to remotely control their refrigeration appliance assets 11A-11*n*, such as by making changes to control parameters, activating low voltage switches, and the like.

FIG. 1 also schematically illustrates how the asset manager is configured to issue notifications directly to one or more users 30 of the refrigeration appliances 11A-11*n* independent of access to the front end applications 22, 24. This represents the asset manager's ability to push alarm notifications to one or more designated users directly via SMS message and email. As will be explained in further detail below, the asset management system 10 is able to guarantee that all alarms are pushed to the users 30 within 60 seconds of a sensor of the refrigeration appliance 11A-11*n* detecting an operating parameter crossing an alarm threshold. The inventor believes this makes the push notifications sent to users 30 via asset manager 14 much more actionable than prior push notification alarming systems for remote monitoring of refrigeration appliances.

In the illustrated embodiment, the asset manager 14 is further connected to one or more auxiliary remote fleet managers 26. Each auxiliary fleet manager 26 represents a proprietary cloud-based application or other server-hosted application employed by a proprietor of a large fleet of refrigeration appliances 11A-11*n*, which make up a subset of the total number n of refrigeration appliances in the asset management system 10. The auxiliary fleet manager 26 is designed and maintained by the proprietor of the fleet (e.g., the owner of the fleet, the operator of the fleet, the maintainer of the fleet, and/or the lessor of the fleet) to access the operating data stored in the asset manager 14 and apply the proprietor's own methods of analyzing and acting on the data.

In an exemplary embodiment, the asset manager 14 is further connected (via a remote network connection such as an internet connection) to one or more original equipment manufacturer (OEM) databases 28. Each OEM database 28 stores proprietary data about refrigeration assets organized by asset type. For example, the OEM database 28 can store simulation data, empirical testing data, and/or modeled data about the types of assets produced by the OEM. The OEM database 28 therefore stores proprietary information about the appliances 11A-11*n*. Such proprietary information is typically only available to the OEM of the refrigeration appliances. As will be explained in further detail below, the asset manager 14 is configured to access the proprietary OEM data stored in OEM database 28 and use the OEM data to enrich analysis of the operating data received from the appliances 11A-11*n* in the field.

Figure 2:
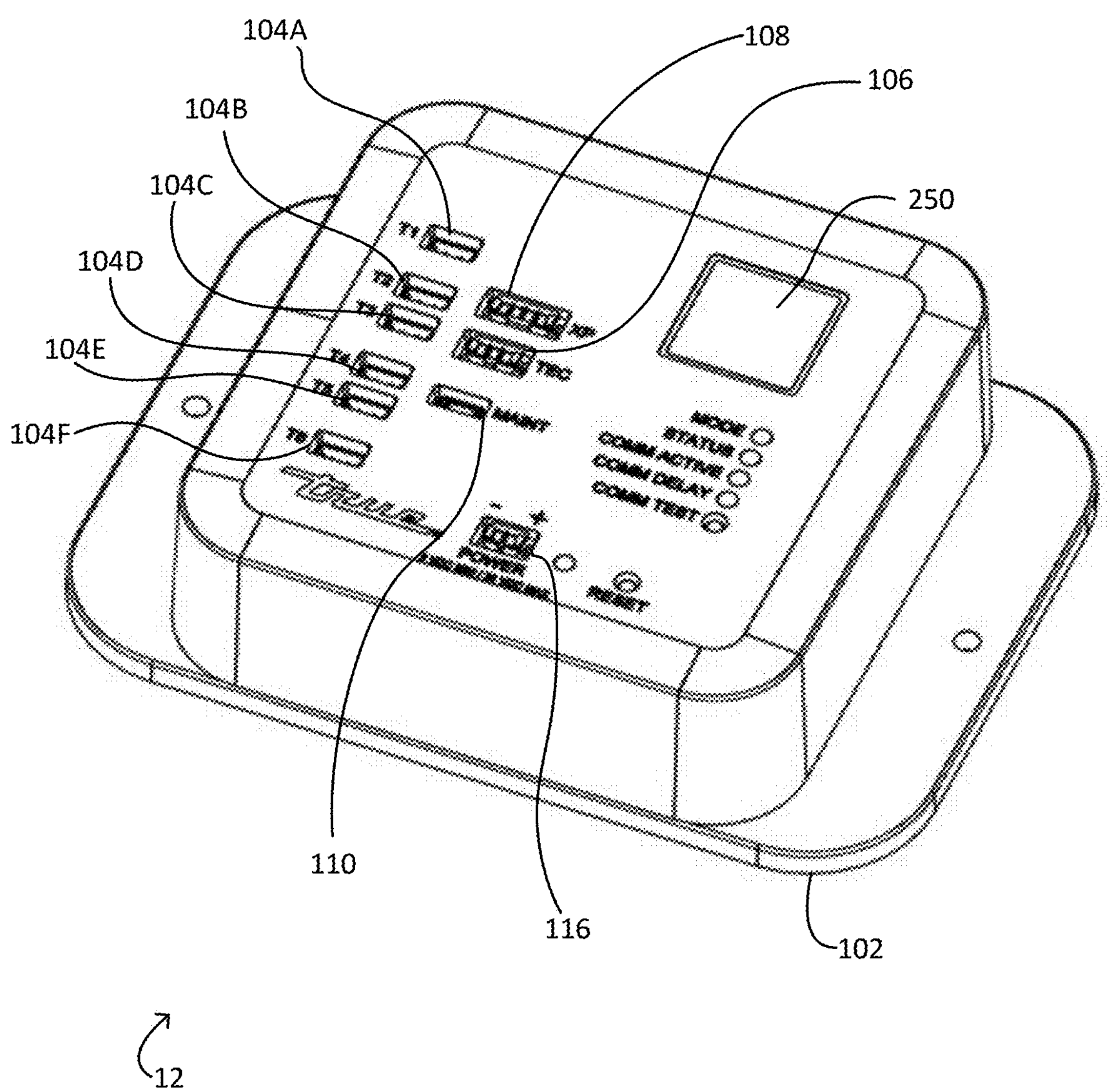
FIG. 2 is a perspective of an IOT device in accordance with the present disclosure.
Figure 3:
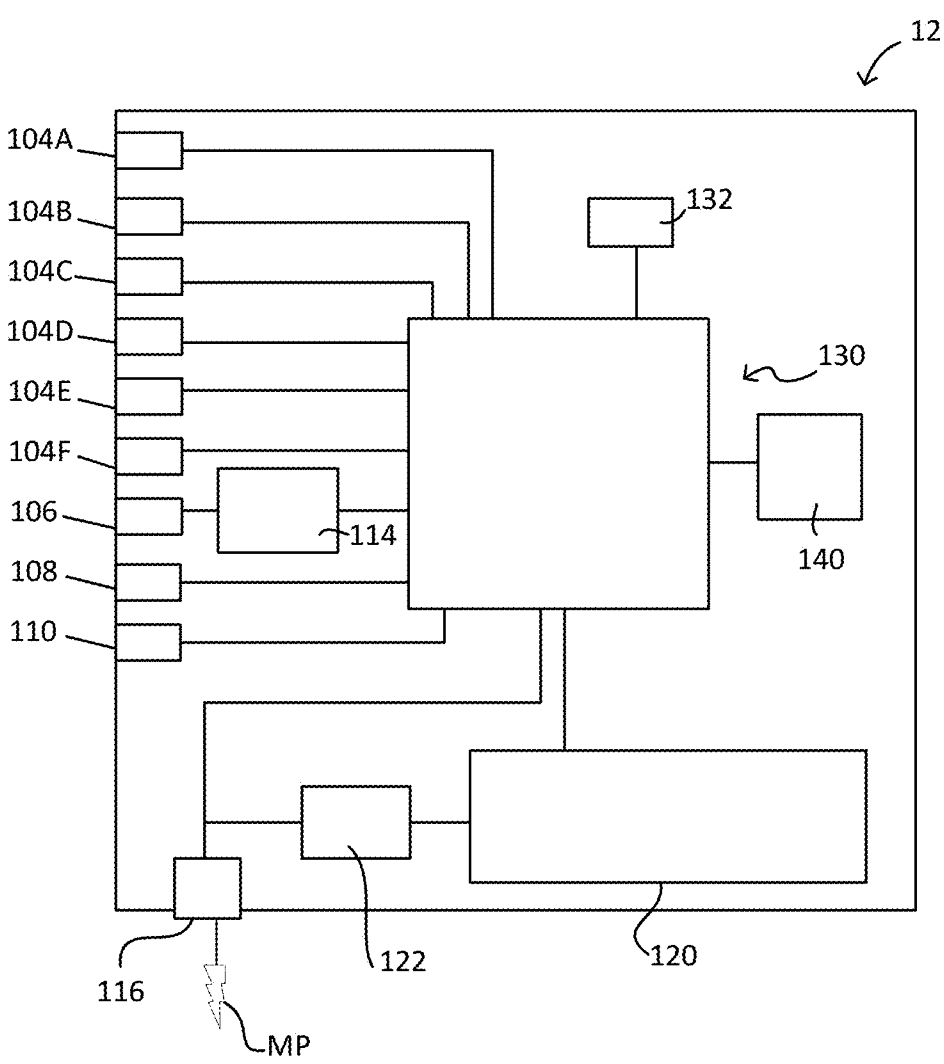
FIG. 3 is a schematic block diagram of the IOT device.

Referring to FIGS. 2-3, each IOT device 12 comprises a device body 102 configured to be supported on or nearby a refrigeration appliance. The IOT device 12 comprises a plurality input/output ("I/O") ports 104A-104F, 106, 108, 110 configured to operatively connect the IOT device to essentially any type of refrigeration appliance 11A-11*n*. The ports 104A-104F, 106, 108, 110 are suitably exposed on the exterior of the device body 102 so that a user can simply plug in one or more cable connectors (not shown) of the refrigeration appliance, or cable connectors of an accessory device used with the refrigeration appliance (e.g., accessory temperature monitoring devices), to operatively connect the IOT device 12 to the refrigeration appliance. In the illustrated embodiment, the IOT device comprises six low voltage I/O ports 104A-104F, a serial data port 106, an expansion port 108, and a service connection port 110. As will be explained in further detail below, the ports 104A-104F, 106, 108, 110 equip the IOT device 12 for several different connection modes, which enable connection of essentially any type of refrigeration appliance 11A-11*n* to the asset management system 10. The multimodal connection ports 104A-104F, 106, 108, 110 and the asset-centric design of the asset management system 10 as a whole combine to make the process of connecting any refrigeration appliance to the asset manager 14 more user-friendly than with conventional IOT systems.

The low voltage I/O ports 104A-104F are configured to read analog or digital sensor or switch inputs or output low voltage switch controls. Any of the I/O ports is configured to connect to a resistive sensor, digital sensor, or low voltage switch associated with the refrigeration appliance. This facilitates remote monitoring of the sensor signals and remote control of low-voltage switches of a given appliance 11A-11*n*.

The serial port 106 is operatively connected to a serial data transceiver 114 (FIG. 3) contained inside the device body 102. In an exemplary embodiment, the IOT device 12 utilizes an onboard RS-485 Mod-Bus transceiver 114 to communicate with an RS-485 Mod-Bus control board of a refrigeration appliance. Other serial data communication protocols could also be used without departing from the scope of the disclosure. Because the IOT device 12 includes both low voltage I/O ports 104A-104F and a serial data I/O port 106, the IOT device is selectively configurable in various gateway modes, including (i) a standalone mode in which the refrigeration appliance is connected to low voltage I/O ports 104A-104F that expose sensor inputs and low voltage control switches to the asset management network 20; (ii) a companion mode in which the refrigeration appliance is connected to a serial data port 106 that, in combination with the serial data transceiver 114, exposes a digital control board of the refrigeration appliance to the asset management network; and (iii) a hybrid mode in which the refrigeration appliance is connected to a combination of one or more low voltage I/O ports 104A-104F and the serial data port 106 to expose both (a) direct sensor inputs and/or low voltage control switches and (b) the digital control board of the refrigeration appliance to the asset management network. In the standalone mode, the IOT device 12 connects the refrigeration appliance to the remote asset management system using only the low voltage I/O ports. In the companion mode, the IOT device 12 connects the refrigeration appliance to the remote asset management system using only the serial data port. And in the hybrid mode, the IOT device 12 connects the refrigeration appliance to the remote asset management system using a combination of low voltage I/O ports and the serial data port.

In most cases, the I/O ports 104A-F, 106 are connected directly to OEM components of the appliances 11A-11*n*. This is in contrast to conventional refrigeration appliance monitoring solutions that are commercially available today, which provide an IOT gateway device connected to an accessory temperature sensor. For example, low voltage I/O ports 104A-104F of IOT the device 12 are configured to connect directly to resistive temperature sensors and low voltage switches that are prefabricated components of the refrigeration appliance or are integral to the refrigeration appliance's native control system. Certain refrigeration appliances in the scope of the present disclosure (e.g., the commercial cooler 11A, commercial freezer 11B, and/or residential refrigerator 11C) comprise one or more of a return air temperature sensor located in the return air duct of the refrigeration appliance and configured to output a signal indicative of an air temperature in a return air duct of the refrigeration appliance, an evaporator temperature sensor in direct thermal communication with the evaporator of the refrigeration appliance (e.g., at the outlet of the evaporator) and configured to output a signal indicative of refrigerant temperature at the evaporator, a liquid line temperature sensor in direct thermal communication with the liquid line of the refrigeration appliance and configured to output a signal indicative of refrigerant temperature in the liquid line, a condenser air temperature sensor located adjacent to the condenser of the refrigeration and configured to output a signal indicative of an air temperature in the condenser, a door switch sensor configured to output a signal indicative of when the door of the refrigeration appliance is open, and/or a compressor run sensor (e.g., a low voltage relay in communication with the compressor) configured to output a signal indicating when the compressor is running. Any of these sensors or switches (or other types of OEM sensors or switches) can be connected directly to one of the I/O ports 104A-104F. The IOT device 12 is configured to sample the parameter values and transmit information about the sampled values to the asset manager 14 via asset management network 20.

Modern ice makers 11D, 11E are typically controlled by digital controllers. Ice makers 11D, 11E typically have OEM sensors and onboard control logic for monitoring an even greater number of operating parameters than other types of refrigeration appliances. In one or more embodiments, the ice makers 11D, 11E on the asset management network are configured to monitor one or more of the ice level (e.g., via an ice level sensor); one or more sensed temperatures (e.g., an air temperature, one or more evaporator temperatures (e.g., the maximum temperature of the refrigerant at the outlet of the evaporator during a freeze step of a previous ice batch production cycle, a temperature of the refrigerant at the outlet of the evaporator at a predefined point in time during a freeze step of a previous ice batch production cycle, a minimum temperature of the refrigerant at the outlet of the evaporator during a freeze step of a previous ice batch production cycle, a maximum temperature of the refrigerant at the outlet of the evaporator during a harvest step of a previous ice batch production cycle), a temperature of the water in the sump, and/or a temperature of the supply water at the water inlet)), one or more sensed refrigerant pressures (e.g., a sensed refrigerant pressure on the high pressure side of the compressor (e.g., the maximum high side pressure during a freeze step of a previous ice batch production cycle, a high side pressure at a predefined point in time during a freeze step of a previous ice batch production cycle, a minimum high side pressure during a freeze step of a previous ice batch production cycle, a maximum high side pressure during a harvest step of a previous ice batch production cycle) or a sensed pressure of the refrigerant pressure on the low pressure side of the compressor (e.g., the maximum low side pressure during a freeze step of a previous ice batch production cycle, a low side pressure at a predefined point in time during a freeze step of a previous ice batch production cycle, a minimum low side pressure during a freeze step of a previous ice batch production cycle, a maximum low side pressure during a harvest step of a previous ice batch production cycle), a measured run time (e.g., amount of run time in the last day, week, and/or month), a measured water usage (e.g., amount of water consumed in the last day, week, and/or month), a measured energy usage (e.g., amount of energy consumed in the last day, week, and/or month), a measured ice production (e.g., amount of ice produced in the last day, week, and/or month), a measured freeze step duration (e.g., the amount of time taken to conduct the freeze step of the previous completed ice batch production cycle, the amount of time taken to conduct each of the previous predefined number of (e.g., five) freeze cycles, an average of the amount of time taken to conduct each of the previous predefined number of (e.g., five) freeze cycles), a measured harvest step duration (e.g., the amount of time taken to conduct the harvest step of the previous completed ice batch production cycle, the amount of time taken to conduct each of the previous predefined number of (e.g., five) harvest cycles, an average of the amount of time taken to conduct each of the previous predefined number of (e.g., five) harvest cycles). The IOT device is configured to retrieve any or all of these operating parameters from the ice maker controller via the serial data port 108.

Other types of refrigeration appliances have varying levels of digital control capability. For the most basic refrigeration appliances, digital controls are either essentially nonexistent or would not provide useful information beyond what is available from direct access to sensors and switches in the standalone gateway mode. So for these types of refrigeration appliances, the standalone gateway mode is appropriate. But for other refrigeration appliances with some level of digital control capability, where additional information beyond what can be observed through the low voltage sensors and switches accessed in a standalone mode is available by connection to the digital control board, the hybrid gateway mode is preferred.

The expansion port 108 is configured to facilitate additional connections of appliance-related sensors, controllers, and/or actuators to the asset management system 10. For example, refrigeration appliances used in scientific applications may be used in combination with precision-calibrated auxiliary sensors that monitor the appliance and/or product contained therein. Also, for refrigeration appliances with multiple independent refrigeration circuits, the expansion port can be used to multiply the port connectivity of the IOT device 12. The expansion port 108 makes the IOT device 12 highly configurable to accept connections to virtually any I/O device related to the refrigeration appliance, accessory devices used in combination with the refrigeration appliance, and/or product related sensors or actuators. Further, the expansion port 108 could also be used to enable connections to other types of kitchen appliances besides refrigeration appliances, further augmenting the capabilities of the asset management system 10.

In the illustrated embodiment, the service port 110 comprises a USB-C port configured to facilitate connection of the IOT device 12 to a service computing device (e.g., a laptop computer or mobile device; not shown). The service port 110 allows a service technician to connect to the refrigeration appliance through the IOT device 12, gaining wired access to the appliance. In some embodiments, the IOT device 12 is configured so that a service technician can connect a service computing device to the service port 110 and run a service routine from the service computing device that causes the appliance to perform a diagnostic or maintenance operation.

In the illustrated embodiment, the IOT device body also includes a power port 116 for connecting the IOT device 12 to main electrical power MP (e.g., AC power). The IOT device 12 further comprises an onboard backup power source 120 (FIG. A2) configured to power certain IOT device functions when there is a main power outage. In the illustrated embodiment, the onboard backup power source 120 is a rechargeable backup power source. Accordingly, as shown in FIG. 3, the IOT device 120 comprises a charging circuit 122 for charging the backup power source 120. In one or more embodiments, the backup power source 120 comprises a lithium capacitor. In certain embodiments, the backup power source 120 is a battery, such as a lithium ion battery, a solid state battery, or any other suitable type of battery. Although a rechargeable backup power source is shown, it is contemplated that the backup power source could be non-rechargeable, e.g., a non-rechargeable battery rated for a long lifespan, such as a ten-year lifespan.

The IOT device 12 further comprises an edge computing device 130 (broadly, an IOT device controller or host device). The edge computing device 130 is configured to control the IOT device 12 and perform certain edge computing operations in the remote asset management network 20. The edge computing device 130 generally comprises a processor and a memory storing processor-executable instructions that, when executed by the processor, configure the processor to control the IOT device to perform IOT device control functions and/or edge computing functions.

As explained more fully below, when the IOT device 12 is operatively connected to the asset management system 10, the asset manager 14 uploads a refrigeration appliance profile (broadly, an appliance profile) to memory of the edge computing device 130. The appliance profile configures the IOT device 12 for connection to its specific appliance based on known characteristics of the appliance type. For example, the appliance profile can configure the processor of the edge computing device 130 for reading operating data from respective ones of the low voltage I/O ports 104A-104F and/or serial data port 106 to which one or more low voltage cables and/or a serial data cable of a refrigeration appliance are connected. Thus, in one aspect, the appliance profile can provide instructions for how the IOT device 12 reads and/or writes information to/from the I/O ports 104A-104F, 106. In other words, the appliance profile provides a definition, based on the appliance type, of which types of sensors, low voltage switches, and/or serial control boards are connected to the IOT device 12. In another aspect, the appliance profile can define one or more alarm thresholds and configure the processor of the edge computing device 130 to output an alarm indication when the operating data read from the respective ones of the low voltage I/O ports 104A-104F and/or serial data port 106 crosses the one or more alarm threshold. The appliance profile can thus define alarm set points for the appliance based on the appliance type. As explained more fully below, the asset management system's asset-centric architecture allows for seamlessly applying the correct appliance profile when the IOT device 12 is bound to the appliance.

In an exemplary embodiment, the appliance profile has two parts: an operating data profile part and an alarm profile part. If the expansion port 108 of the IOT device 12 is used, the appliance profile can include still more parts to account for the expansion port connections. The operating data profile part defines the operating data that the edge computing device 130 should read from or write to each port 104A-104F, 106. An example operating data profile part for a standalone-type refrigeration appliance is shown in Table 1 below:

TABLE 1

| Input | Connection |
|---|---|
| 104A | Return Air Temp |
| 104B | Evap Temp |
| 104C | Liquid Line Temp |
| 104D | Ambient Temp |
| 104E | Door Switch |
| 104F | Compressor Run |

The operating data profile part shown in Table 1 is for certain types of refrigeration appliances to which the IOT device 12 connects via only the low voltage I/O ports (e.g., in standalone mode). When the serial data port 106 is used, the operating data profile part configures the edge computing device 130 to read/write from/to the serial data controller of the appliance in a Mod-Bus format. For example, the operating data profile part can define an environmental variable configuration profile in the following format:

```
{
  SWITCH__DUTY__CYCLE__SECONDS:        0,   0,   0,   0,   3600, 86400;
  TEMP__ALERT__REPEAT__SECONDS:       216000, 216000, 216000, 216000, 216000, 216000;
  TEMP__ALERT__SECONDS:              7200,   0,   3600,   0,   600, 43200;
  TEMP__EXCEPTION__HIGH:            8, 120, 50, 120, 120, 120;
  TEMP__EXCEPTION__LOW:             2, -60, -60, -60, -60, -60;
}
```

And a Mod-Bus configuration variable profile in the following format:

```
{
  CONTROL__MODBUS__FAST: R0,0,0.1;R1,1,0.1;R2,2,0.1;R203,203,0.1;R707,707,1;
  CONTROL__MODBUS__PARAM: R198,198,1;R199,199,1;
  CONTROL__MODBUS__CHANGE: alm128,128,1;alm129,129,1;alm130,130,1;alm131,131,1;
    alm132,132,1;alm135,135,1;
  CONTROL__MODBUS__FILES: FAST,3600;PARAM,86400;CHANGE,60;
}
```

The alarm profile part configures the edge computing device 130 for detecting certain alarms on the edge of the IOT network 20. An exemplary alarm profile part is shown below in Table 2:

TABLE 2

| Type | Level | Category | Description | Criteria | Delay | Probe |
|---|---|---|---|---|---|---|
| Power Failure | Critical Alarm | Power | A main power failure has been detected. | — | — | — |
| Door Open | Critical Alarm | Product | Door has been left ajar. | — | 15 min | S5 |
| High Temp | Critical Alarm | Product | Cabinet temperature is too high. | 44 F. | 1 hour | T1 |
| Low Temp | Critical Alarm | Product | Cabinet temperature is too low. | 32 F. | 1 hour | T1 |
| High Run Time | Warn | Asset | The compressor run time limit has been exceeded. | — | 6 hours | S6 |
| High Cond. Temp | Warn | Asset | High condenser temperature detected. | 120 F. | 1 hour | T3 |

The IOT device 12 is configured for transmitting refrigeration appliance operating data to the network 18 for remote monitoring by the asset manager 14. More particularly, the edge computing device 130 is configured to (i) control the sampling or reading of parameters from the I/O ports 104A-104B, 106 at a defined sampling frequency; (ii) aggregate or form the sampled data into data packets; and (iii) transmit the data packets onto the asset management network 20 at a transmission frequency. In one or more embodiments, the IOT device 12 has a default sampling frequency of one sample-per-second (e.g., the sampling frequency can be in an inclusive range of 0.1 to 10 samples-per-second) and a default transmission frequency of one data packet every 30 minutes (e.g., the default transmission frequency is in an inclusive range of from 1 data packets-per-day to 120 data packets per hour). Accordingly, by default, the sampling frequency is much greater than the transmission frequency. Suitably, the default sampling and transmission frequencies are adjustable to suit application-specific needs.

Independent and asynchronously of the default transmission frequency, the edge computing device 130 is configured to perform an edge compute alarm operation whereby the edge computing device immediately transmits an alarm notification to the asset management network 20 when a sampled operating parameter of the refrigeration appliance crosses an alarm threshold (e.g., an alarm threshold set by the appliance profile). That is, the memory of the edge computing device 130 stores processor-executable edge alarm instructions that configure the processor to determine when the sampled operating data crosses an alarm threshold and immediately transmit an alarm indication to the remote asset management system. The IOT device 12 processes the alarm conditions on the edge of the asset management network 20 so that it can transmit alarm indications asynchronously with respect to the transmission frequency for normal transmission of aggregated operating data (data packets). This enables the IOT device 12 to notify the asset manager 12 of an alarm event in real time, instead of waiting to report on the alarm event until the subsequent operating data transmission (data packet). As a result, the asset management system 10 is capable of generating truly actionable push notification alarms in real time to alert appliance users of any critical issue that risks damage to the appliance or loss of product.

In addition to controlling the transmission of appliance operating data onto the asset management network 20, the edge computing device 130 is further configured to receive control instructions from the asset manager 14 via the asset management network 20. Based on the appliance profile, the edge computing device 130 is configured to facilitate control of the appliance in accordance with the instructions. For example, when the appliance has a digital control board connected to the serial data port 106, the edge computing device 130 writes the control instructions to the appliance control board via the serial data port 106. When the appliance lacks a digital control board but has one or more low voltage switches connected to a low voltage I/O port 104A-104F, the edge computing device 130 outputs low voltage control signals to the switches in response to control instructions from the asset manager 14.

In the illustrated embodiment, the IOT device comprises a hardware security chip 132 that stores encryption keys. The hardware security chip 132 is broadly configured to encrypt data packets transmitted to the asset management network 20 and decrypt data transmissions from the asset management network. The hardware security chip 132 functions to facilitate encryption/decryption with the data broker 16 without an exchange of keys. In an exemplary embodiment, the hardware security chip is an STSAFE-A100 device, available from STMicroelectronics.

In an exemplary embodiment, the edge computing device 130 is configured for performing additional asset management system functions "on the edge" of the asset management network 20. One example of an edge compute function is the edge compute alarm operation described above. The inventor believes that this edge computing capability makes the push notification alarms generated by the asset management system 10 much more responsive than push notification alarms generated by conventional remote refrigeration appliance monitoring systems. Additional edge compute functions besides the edge compute alarm operation are also contemplated.

For example, the edge computing device 130 can be configured to analyze the appliance operating data on the edge of the asset management network. This is useful because it provides a mechanism for conducting time-sensitive analyses on a sample-by-sample basis rather than on a data-transmission-by-data-transmission basis in the asset manager 14. One example of such a time-sensitive analysis is a product simulation analysis described in further detail below. That is, the edge computing device 130 is configured to periodically run a simulation of a product temperature (e.g., on a sample-by-sample bases) based on return air temperature read from one of the I/O ports 104A-104F, 106. In certain embodiments, the edge computing functions are programmed to the edge computing device 130 by the asset manager 14. For example, default edge computing functions according to appliance type can be programmed when the asset manager 14 uploads the appliance profile to memory of the edge computing device 130 at the time the IOT device 12 is connected to the network 20. Furthermore, the asset manager 14 can be configured to allow a user to adjust the edge computing functions performed by one or more IOT devices 12.

Another example of an edge computing operation performed by the edge computing device 130 on the edge of the asset management network 20 is batch aggregation operations. As mentioned above the edge computing device 130 is configured to sample the operating parameters at sampling frequency that is much greater than the transmission frequency. In other words, the transmission frequency is less than the sampling frequency. Hence, each data packet transmission will aggregate data from a plurality of samples or readings of the operating data. The edge computing device 130 is configured to perform batching operations on the sampled data before each data packet is transmitted to the asset management network. For example, in one or more embodiments, for each operating parameter being monitored, the edge computing device is configured to calculate the average parameter value for the reporting interval, the minimum sampled value during the reporting interval, the maximum value for the reporting interval, and/or a filtered parameter value that is a function of an exponential decay value. The edge computing device 130 includes these batch parameter values in the data packets transmitted to the asset management network 20.

The memory of the edge computing device 130 also stores power management instructions that configure the processor to conduct a power management routine 150, shown in FIG. 4. The starting point 152 for the power management routine 150 is when the IOT device 12 is bound to an appliance and turned on while main power MP is available. At step 154, the IOT device 12 draws power from the main power supply MP to perform all device functions, e.g., periodically sampling operating data from the refrigeration appliance, transmitting the operating data to the asset management network 20 via the modem 140, edge alarm monitoring and notification, etc. As indicated at decision point 156, whenever main power MP is available, the IOT device 12 continuously draws main power MP and performs device functions normally. For example, during normal operation when main power is sustained at the main power port, the edge computing device 130 samples the operating data at a normal sampling frequency and transmits the operating data to the asset management network 20 via the modem 140 at a transmission frequency less than the normal sampling frequency.

When a main power outage occurs, at decision point 156, the edge computing device 130 determines that main power is lost, e.g., by unavailability at the power port 116. In response to recognizing loss of power from the main power supply MP, the IOT device 12 draws power from the backup power supply 120 to run a power failure routine 160. Onset of the power failure routine 160 begins tolling a timer for a low power time interval (step 161). Also, at step 162, the edge computing device immediately transmits a power outage alarm notification to the asset management network 20 via the modem 140. In one or more embodiments, this is the only transmission to occur during the power failure routine 160. Subsequently, at step 163, the edge computing device samples operating data from the refrigeration appliance without transmitting the sampled operating data to the asset management network 20. During the low power time interval, the edge computing device 130 is configured to sample the operating data at a low power sampling frequency. In one or more embodiments, the low power sampling frequency can be less than the normal sampling frequency. Alternatively, the low power sampling frequency can be the same as the normal sampling frequency or greater than the normal sampling frequency.

At decision point 164, the edge computing device determines whether main power MP has been restored (e.g., based on availability of main power at the power port 116). If main power MP has not been restored, at decision point 165, the edge computing device 130 determines whether the low power time interval has elapsed. If not, sampling (step 163) continues. Throughout the low power sampling interval, the edge computing device 130 continues monitoring for main power restoration and sampling the operating data. If main power MP is restored at any time during the low power sampling interval, the edge computing device 130 advances to step 170 and transmits one or more data packets containing the data sampled during the low power sampling interval. If (at decision point 165) the low power time interval elapses before main power MP is restored, the edge computing device 130 switches the IOT device to a sleep mode (step 166). In the sleep mode, the edge computing device 130 ceases sampling the operating data from the refrigeration appliance. Essentially the only function performed by the IOT device during sleep mode is monitoring for main power restoration (decision point 167). When main power MP is restored after sleep mode, the IOT device is taken out of sleep mode to automatically transmit one or more data packets containing the sampled operating data from the low power time interval.

Accordingly, it can be seen that the power management routine 150 responds to a main power outage by immediately transmitting an alarm to the asset manager 14 and then making a further two-stage response. Initially, during the low power time interval, the processor samples operating data but does not transmit the operating data to the asset management network 20. This preserves power from the backup power source 120 while maintaining data integrity throughout the low power time interval. All data collected during the low power interval is automatically reported to the asset manager 14 when main power is restored. The second stage of the power failure routine 160 is the subsequent sleep mode stage. During this stage, the IOT device 12 ceases monitoring the operating data altogether. This provides maximum power savings to preserve the life of the backup power supply 120. This two-stage routine may be particularly useful for backup power supplies that are non-rechargeable.

The duration of the low power time interval is set so that, after a main power outage, operating data such as air temperature inside the refrigeration appliance are continuously monitored for at least as long as product inside the refrigeration appliance may not be spoiled by the power loss. The power failure routine 160 assumes that main power loss at the IOT device 12 occurs when the refrigeration appliance is unpowered and cannot provide refrigeration to any product contained therein. As a practical matter, in room temperature ambient conditions, any cooler or freezer can only maintain product at a sufficiently low temperature to stave off spoilage for a limited time. After that time period elapses, the product will be spoiled and must be discarded. In the inventor's view, further monitoring of the refrigeration appliance is wasted (and wastes backup power) when the appliance cannot draw power and the product inside is already spoiled. Accordingly, the low power time interval is set to a duration corresponding to how long product inside the refrigeration appliance can plausibly maintain temperature without spoiling when powered refrigeration is unavailable. In one or more embodiments, the low power time interval is in an inclusive range of from 4 hours to 24 hours. After the low power time interval elapses, the processor is configured to put the IOT device 12 into a sleep mode in which no sampling is conducted. When the power failure routine is executed by the processor, whenever the main power is restored, the processor is configured to transmit one or more data packets containing the operating data collected during the low power time interval. Hence, even when refrigeration appliances lose power, the asset management system 10 is configured to maintain a continuous record of the operating data for the entire time that product may remain unspoiled.

Referring to FIG. 3, the IOT device 12 further comprises a network modem 140 (broadly, a network port) disposed inside the device body 102. The edge computing device 130 is connected to the network modem 140 and uses the network modem to communicate with the asset management network 20. The modem 140 is configured to transmit operating data to the asset manager 14 and receive control instructions from the asset manager via the network 20. In the illustrated embodiment, the modem 140 is a wireless modem. But in other embodiments, the modem can be configured for wired network connection, e.g., the modem could comprise an Ethernet modem connected to an Ethernet receptacle.

In an exemplary embodiment, the modem 140 is a cellular modem and the network 18 to which the modem wirelessly connects is an off-the-internet cellular subnet. The device ID of the cellular modem 140 is the IMEI. Those skilled in the art will appreciate that utilization of an off-the-internet cellular subnet provides enhanced data security by eliminating attack vectors from the open internet. In a preferred embodiment, the modem 140 is a Blues Wireless Notecard. The Blues Wireless Notecard 140 is a low power cellular device-to-cloud data pump preloaded with 500 MB of data and ten years of service. The IOT device 12 is configured to transmit data packets that are very compact in terms of data utilization. As a result, the 500 MB of preloaded data provided by a Blues Wireless Notecard can be sufficient for all data packets transmitted over a 10-year lifespan of an IOT device 12. Blues Wireless Notecards include an embedded SIM that is configured so that the IOT device 12 will automatically connect to the sub-net 18 when turned on. Accordingly, in one or more embodiments, an IOT device 12 in the scope of the present disclosure comprises a cellular modem 140 such as an LTE-M modem, an NB-IoT modem, etc.

The inventor currently prefers cellular modems for deploying IOT in refrigeration appliances. For the purpose of creating useful asset management systems for refrigeration appliances, cellular networks have advantages over other network communication standards such as wired Ethernet, Wi-Fi, and long-range radio. In particular, because cellular network infrastructure is wireless, is standardized, has wide availability in virtually every populated location, and is robustly maintained by cellular network providers, IOT solutions can be widely deployed on cellular networks with little to no network configuration or maintenance by the owner or operator of the refrigeration appliance. By comparison, deployment of IOT solutions on wired Ethernet, Wi-Fi, and long-range radio networks require more end user effort. In the case of wired Ethernet, an end user must make a wired connection to the device, which may not even be feasible in all cases. In the case of Wi-Fi, an end user must configure the initial connection and ensure it is maintained. Even then, losses of Wi-Fi connectivity are much more frequent than cellular. Long-range radio networks such as LoRaWAN networks are not as ubiquitous as cellular networks, so currently the use of long-range radio requires setting up underlying network infrastructure.

In the future, it is conceivable that long-range radio standards could become more widely adopted. And at that point, long-range radio may become a desirable alternative to cellular for deploying IOT in refrigeration appliances. Accordingly, it is expressly contemplated that the IOT devices, systems, and networks, which the present disclosure describes in relation to cellular network protocols, could alternatively be configured for communication using a standardized long-range radio communication protocol such as LoRa. Those skilled in the art will recognize that aspects of this disclosure pertaining to asset-centric communication can be adapted to IOT devices using LoRa modems.

Referring to FIG. 2, each IOT device 12 is prefabricated emblazoned with a unique QR code 250 (broadly, a machine-readable code) encoding a web address including the device ID of the modem. The QR code may be emblazoned by applying a QR code sticker in the location of reference number 250 in FIG. 2. The QR code 250 stores a URL that accesses a public webpage for linking the IOT device 12 to the respective refrigeration appliance 11A-11*n*. Once the link between the IOT device 12 and the respective refrigeration appliance 11A-11*n* is established, the URL contained in the QR code resolves to a public page containing operating data for the refrigeration appliance.

Referring again to FIG. 1, the illustrated asset management network 20 comprises the cloud-based data broker 16 between the asset manager 14 and the IOT devices 12. In general, the data broker 16 is a software application stored in remote memory and executing on a remote processor (e.g., the processor of a server or cloud service). The data broker 16 is broadly configured to connect the IOT devices 12 to the asset manager 14. More particularly, the data broker 16 connects the IOT devices 12 to the asset manager by receiving data packets from the IOT devices, determining the serial number of the source appliances for the data packets, creating structured data objects for the data packets, tagging the structured data packets by serial number of the source refrigeration appliances, and transmitting the tagged structured data packets to the asset manager 14.

In one or more embodiments, the data broker 16 is also configured to facilitate binding the IOT devices 12 to refrigeration appliances. As explained more fully below, the data broker 16 is configured to receive web page requests from one or more client devices that enter a web address pointing the data broker and including the device ID (specifically, the web address encoded in the QR code 250 emblazoned on the IOT device 12). In response to such a web page request, the data broker 16 is configured to determine based on the included device ID whether the IOT device has been bound to a refrigeration appliance. And in response to determining based on the included device ID that the IOT device 12 has not been bound to a refrigeration appliance, the data broker 16 is further configured redirect the web page request to another web address for a web form that facilitates binding the IOT device to the refrigeration appliance by inputting a serial number for the appliance. Upon input of the serial number, the data broker 16 binds the IOT device 12 to the refrigeration appliance and therefore transmits all data received from the IOT device (tagged with the IMEI for the modem) as structured data objects tagged by the serial number of the appliance. If the web address encoded in the QR code 250 of an IOT device 12 that is already bound to a refrigeration appliance is entered into a browser of a client device (e.g., by scanning the QR code 250), the data broker 16 again receives the web page request. But in this instance, the data broker 16 determines that the IOT device 12 is already bound to an appliance and redirects the client device to another web address for a public web page for displaying operating data for the respective refrigeration appliance.

In an exemplary embodiment, the data broker 16 is the notehub.io cloud service, available from Blues Wireless. Notehub.io is a cloud service application for securely routing data from Blues Wireless notecard devices to third party cloud applications, in this case, the asset manager 14. In the illustrated embodiment, the notehub.io service is used to define data routes to the cloud-based asset manager application 14. In addition, the notehub.io data broker service 16 is configured to structure data object payloads that are sent to the asset manager 14.

Various data object structures could be used without departing from the scope of the disclosure. In general, each structured data object should be tagged by serial number of the source refrigeration appliance. In one or more embodiments, the data broker 16 is configured The notehub.io service has native JSON transformation capabilities (JSONata). So in an exemplary embodiment, the data broker 16 is configured to structure the data packets received from the IOT devices 12 as JSON data objects. An exemplary JSON object structure is shown below:

```
{
  "device": "dev:868050045502792",
  "sn": "10669845",
  "received": 1690319105.739838,
  "when": 1690319103,
  "body": {
```

-continued

```
        "s5": {
          "closed": true,
        },
        "s6": {
          "closed": true,
        },
        "seconds": 300,
        "t1": {
          "avg": −19.796875,
          "cur": −17.6875,
          "filt": −18.015625,
          "max": −17.6875,
          "min": −21.8125
        },
        "t2": {
          "avg": −19.125,
          "cur": −17.8125,
          "filt": −17.96875,
          "max": −17.78125,
          "min": −24.390625
        },
        "t3": {
          "avg": 24.859375,
          "cur": 23.28125,
          "filt": 23.203125,
          "max": 30.34375,
          "min": 23.015625
        },
        "t4": {
          "avg": 25.390625,
          "cur": 25.921875,
          "filt": 25.921875,
          "max": 25.984375,
          "min": 24.171875
        }
      }
    }
```

In this example, "device" is the modem ID for the IOT device 12 that sent the data packet; "sn" is the serial number of the source refrigeration appliance, "received" and "when" define the times the data was transmitted, and "body" contains the operating data for the refrigeration appliance. The above JSON data structure is for a refrigeration appliance and IOT device operating in the standalone mode. Hence, there are six operating parameters, "s5," "s6," "t1," "t2," "t3," and "t4." The parameter "s5" represents the door switch of the refrigeration appliance, in this case showing that the door switch is closed. The parameter "s6" represents the compressor relay, in this case showing that the compressor relay is closed, meaning the compressor is off. In this case, the parameters "t1," "t2," "t3," and "t4" respectively represent the return air temperature, evaporator temperature, liquid line temperature, and condenser air temperature. As shown, the JSON data object includes aggregated values for these temperatures during a 300-second sampling interval. For each temperature parameter, the JSON data object includes the average temperature during the interval ("avg"), most recent sampled temperature ("cur"), value of an exponential decay filter value for the sampling interval ("filt"), the maximum value read during the sampling interval ("max"), and the minimum value read during the sampling interval ("min"). Again, these aggregated or batch values for each data object are calculated by the edge computing device 130 of the IOT device 12 and simply reformatted into the JSON data object structure by the data broker 16.

Based on the JSON object above, it can be seen that the asset management system is configured to communicate refrigeration appliance operating data to the asset manager 14 as structured data objects, where each data object includes a key-value pair defining the serial number (e.g., "sn": "10669845") of the refrigeration appliance that generated the operating data. While the illustrated asset management system 10 utilizes the notehub.io data broker service 16 to structure the data objects remotely, it will be understood that asset management systems in accordance with the present disclosure could have other network architectures, while still utilizing the principles of the data object structure described above. For example, instead of configuring the asset management network 20 to have an intermediate data broker layer, the data broker layer could be omitted. In this type of network architecture, the device layer would be responsible for structuring the data objects. In other words, the edge computer 130 of each IOT device 12 could be configured for structuring the data in each data packet into a JSON data object (or other suitable structured data object) that includes a key-value pair defining the serial number of the refrigeration appliance. An advantage of the illustrated network architecture is that the notehub.io data broker service 14 uses its native HTTPs encryption systems for data security. This reduces the computational requirements for the edge computing devices 130.

Figure 5:
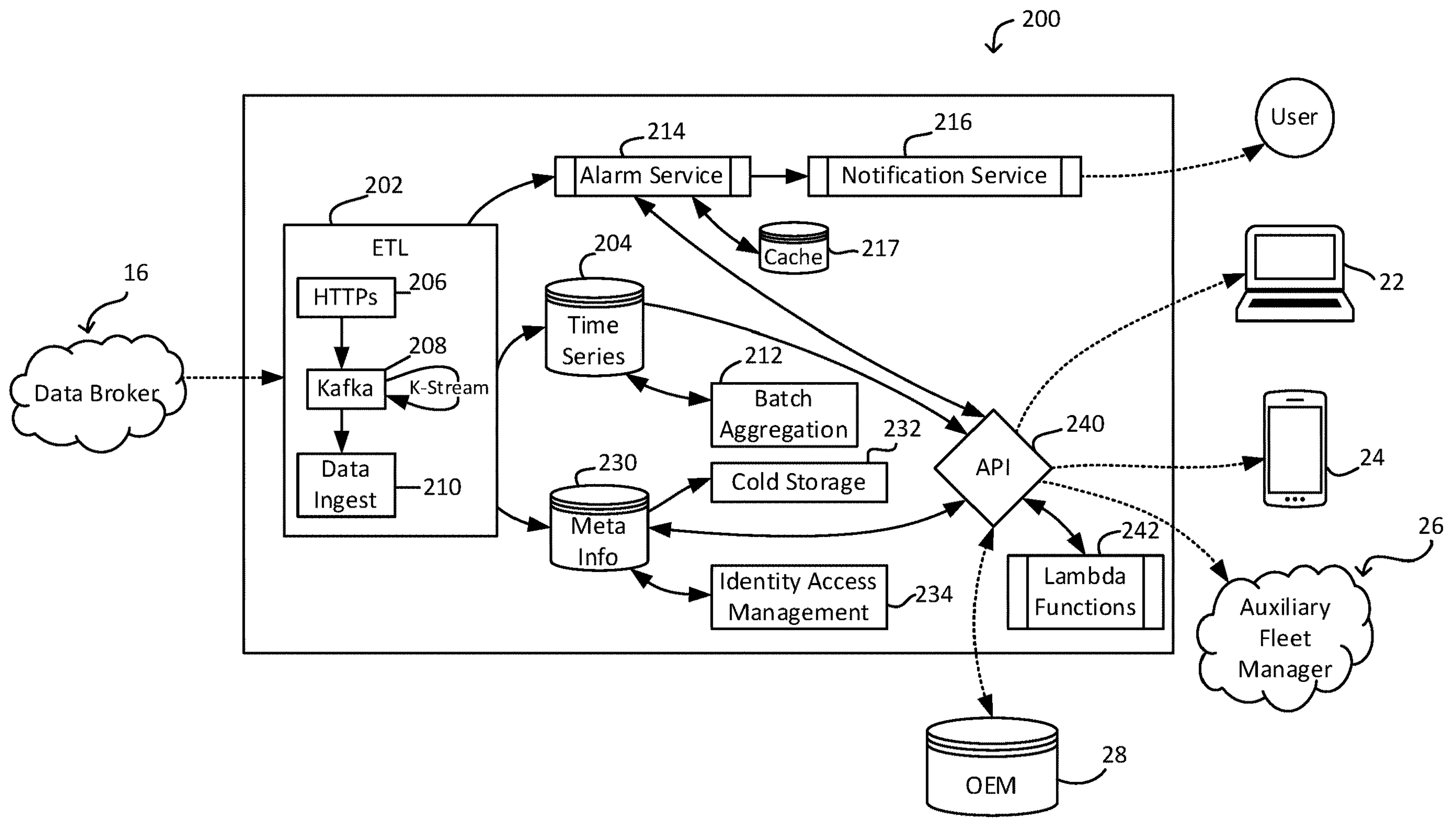
FIG. 5 is a schematic block diagram of an asset manager backend of the asset management system.

Regardless of how the network architecture is constructed, tagging the data objects with the serial number of the refrigeration appliance enables the asset manager 14 to seamlessly store refrigeration appliance operating data in a time series database with the refrigeration appliance serial number as the primary key. Referring to FIG. 5, the backend components of the asset manager 14 are shown schematically at reference number 200. In general, the asset manager backend 200 is configured to stream the structured data objects from the data broker 16, parse the streamed structured data objects by serial number of the source refrigeration appliance, and store the operating data contained in the structured data objects in a time series database using the serial numbers of the source refrigeration appliances as primary keys. The backend 200 is further configured to expose the stored data to the front end applications 22, 24. The components shown schematically in FIG. 5 represent various software modules and databases used by the backend 200.

The backend 200 comprises an extract transfer load (ETL) system 202 configured to stream incoming data from the asset management network 20, transform it into the appropriate format, and load it into a time series database 204. Recall that the asset management system 10 may be massively scaled and distributed. Accordingly, the ETL system 202 should be capable of streaming a massive amount of incoming data from a massive number of refrigeration appliances 11*n*. Hence, on a massive scale, the ETL system 202 is configured to stream structured data objects from the asset management network and parse the structured data objects in real-time to determine, for each structured data object, the key-value pair for the serial number of the refrigeration appliance and the respective operating data.

In the illustrated embodiment the ETL system 202 receives structured data objects from the notehub.io data broker 16. The data objects are continuously being streamed to the asset manager 14 from all of the IOT devices 12 in the asset management network 20. To manage the large data stream and its many sources, the ETL system 202 comprises a data extraction module 206, a data streaming module 208, and a data ingestion module 210. The illustrated data extraction module 206 comprises an HTTPs module that authenticates and decrypts the data transferred from the upstream network 20. The illustrated data streaming module 208 is an Apache Kafka streaming module. The streaming module 208 processes the incoming data from the asset management network 20 in real time. In one aspect, the streaming module 208 transforms the incoming data for storage in the time series database 204. For example, the streaming module 208 parses each individual structured data object in real time to determine the serial number of the refrigeration appliance that generated the operating data based on the key-value pair defined in the JSON object. In an exemplary embodiment, the streaming module 208 parses the structured data objects according to parsing logic agnostic to modem device ID. After the data is processed and transformed by the Kafka module 208, the data ingestion layer 210 loads the data into the time series database 204.

In the illustrated embodiment the time series database 204 is a MongoDB database. The time series database 204 uses the serial numbers of the refrigeration appliances 11A-11*n* as primary keys. In an exemplary embodiment, the time series database 204 is agnostic to the modem device IDs of the IOT devices. In the illustrated embodiment, the asset manager backend 200 further comprises a batch aggregation component 212 configured to perform one or more batch aggregation operations on the time series data loaded into the time series database 212. For example, the batch aggregation component 212 reads the time series data from the database 202 and periodically generates summary data (e.g., moving averages) based on the underlying time series data.

The Kafka streaming module 208 is further configured to enable event-driven processing. In this application, the Kafka streaming module 208 and the edge computing devices 130 cooperate to generate truly actionable push notification alarms for the user. As explained above, the edge computing devices 130 of the IOT devices 12 are configured to transmit unscheduled alarm notifications when predefined alarm thresholds are crossed. The Kafka streaming module 208 is configured to recognize unscheduled alarm notifications as an event and immediately trigger a push notification alarm routine. The illustrated asset manager backend system 200 comprises an alarm service module 214 in communication with a notification service module 216. When the Kafka streaming module 208 detects an unscheduled alarm notification event, the ETL module 202 loads the alarm notification to the alarm service module 214. The alarm service module then executes rules-based logic to determine whether to send the alarm to the notification service. For example, using a front end application 24, 26, a user can configure the alarm service module 214 to delay sending an alarm notification to the notification service module 216 until a particular alarm state has been maintained for a user-defined time interval. Likewise, using a front end application, a user can configure the alarm service module 214 to escalate certain alarm indications. In other words, the asset manager 14 interfaces with a front end application configured to facilitate user adjustment of the rules-based logic. The alarm service module 214 is connected to a cache 217 (e.g., a Redis cache), which provides memory for the alarm service. For example, the cache 217 stores past alarm indications for reference when executing the alarm service logic.

The push notification service module 216 is configured to receive the alarm indications sent by the alarm service module 216 and execute rules-based push notification logic to push notifications of the alarm to appropriate users via SMS message or email. For example, the rules-based logic defines who is to receive push notifications for each type of alarm. Furthermore, a user of multiple refrigeration appliances can assign each appliance to a respective appliance location and set push notification rules by location. For instance, the push notification rules can be configured so that, in response to multiple alarms caused by a power outage at a single location or store where a plurality of refrigeration appliances are located, the push notification service 216 only pushes a single alarm notification for the location/store—not one push notification alarm for each of the plurality of appliances at the location/store. In one or more embodiments, the asset manager 14 interfaces with a front end application 22, 24 to facilitate user adjustment of the rules-based logic for the push notification service module 216.

Accordingly, it can be seen that the illustrated asset management system 10 has a multi-layer push notification architecture that enables the system to push actionable alarm notifications to the relevant users in a timely fashion, enabling the user to take corrective action before product is lost or the refrigeration appliance is damaged. The first layer of the push notification architecture is the device layer, specifically the edge computing devices 130. The device layer is responsible for flagging any alarm condition that occurs at the appliance. The basic alarm conditions that cause an edge computing device 130 to flag an alarm are user configurable via front end applications 22, 24. Every edge computing device 130 in the device layer samples the relevant parameters from the respective refrigeration appliance on a very frequent basis, on the order of once-per-second. Accordingly, when any alarm condition occurs, within seconds, the IOT device 12 reports the alarm condition to the asset management network as an event. The device layer works in conjunction with the ETL system 202 to ensure that each alarm is timely analyzed by the alarm service module 214. That is, the ETL layer is responsible for recognizing the alarm notifications in the incoming stream of appliance data and immediately sending each alarm to the alarm service module 214. The alarm service module 214 is another layer responsible for enacting user-defined logic determinative of when to push a notification for an alarm. In conjunction with the cache 217, the alarm service module 214 follows user-defined rules to delay or escalate the alarms received from the ETL layer 202. The alarm service module 214 is configured to notify the push notification service module 216 when push notification is required for an alarm indication. Any alarms that satisfy the user-defined rules for notification are then processed by the notification service module 216, which acts as a final layer in the alarm network architecture, to apply user-defined rules for who should receive the alarm. The push notification service module 216 is configured to execute rules-based logic to determine one or more notification addresses to receive push notification about the alarm condition and subsequently push the notification to the one or more notification addresses. Hence, the notification layer 216 functions to ensure that the appropriate SMS text messages and emails are pushed to the appropriate users. The multi-layer push notification alarm system described herein is able to push an alarm notification to any user by SMS text message or email in accordance with the user's preferred rules within 60 seconds of the triggering any alarm event occurring at any refrigeration appliance. Those skilled in the art will appreciate that conventional asset management systems for refrigeration appliances cannot ensure all alarms are pushed to the user in such an actionable timeframe.

The asset manager backend 14 further comprises a meta information database 230. The meta information database 230 stores meta information about the refrigeration appliances 11A-11*n*. For example, the database 230 may comprise a relational database (e.g., an SQL database) storing, for each appliance 11A-11*n*, meta information about the appliance such as the appliance location, customer, store where the appliance is located, refrigeration appliance type (e.g., model number), etc. As with the time series database 204, the meta information database 230 can store meta information using the appliance serial number as the primary key. In one or more embodiments, the push notification service module 216 is configured to reference the meta information for the respective refrigeration appliance and execute the rules-based logic based on the meta information to determine push notification addresses. For example, the meta information can include information about types of users for each refrigeration appliance, and the push notification service module 216 can be configured to reference the meta information database 230 to execute rules-based logic defining which types of the users are to receive push notification based on a type of alarm condition. Likewise, the meta information can include information about a store where each refrigeration appliance is deployed, and the push notification service module 216 can be configured to reference the meta information database 230 to execute rules-based logic defining a number of push notifications to send to a push notification address when alarm indications are received from a plurality of refrigeration appliances deployed at a same store.

The meta information database communicates with a cold storage system 232 and an identity access management system 234. The identity access management system 234 provides user authentication and access control for the front end applications 22, 24.

As can be seen, the asset manager backend 200 further comprises an application programming interface API 240 providing an interface between the backend and external systems like the front end web application 22, the front end mobile application 24, the OEM database 28, and the auxiliary fleet manager 26. The API 240 is configured to provide an interface for the front end web application 22 and the front end mobile application 24 to access the data stored in the time series database 204, the meta information database 230, and the alarm service 214. The front end applications 22, 24 use access to this information to provide detailed information about the operating condition of the appliances 11A-11*n* to the appropriate users. The API 240 also provides an interface for the auxiliary fleet manager 26 to access the time series data and meta information about the appliances 11A-11*n* in the respective appliance fleet. This enables the auxiliary fleet manager 26 to load appliance operating data into the fleet manager's proprietary systems for analyzing and acting on the data. Lastly, the illustrated API 240 provides an interface to the OEM database 28. As will be explained in further detail below, the backend is configured to execute lambda functions 242 that combine the proprietary OEM data stored in the OEM database 28 with the appliance information contained in the backend 200 to provide improved analysis of the appliance operating data.

In one or more embodiments, the OEM database 28 contains proprietary OEM data organized by refrigeration appliance type. One example, of proprietary OEM data is regulatory testing data by appliance type. Regulatory testing data is one example of empirically derived data for refrigeration appliances. For example, OEMs of refrigeration appliances conduct regulatory testing of each refrigeration appliance model that they manufacture. The results of the energy testing for each appliance can be stored in the OEM database 28 and used to deriver bespoke alarm profiles for refrigeration appliances by refrigeration appliance type (e.g., by model number). In general, the OEM database 28 can store any type of empirically derived data for refrigeration appliances, preferably organized by appliance type.

Refrigeration appliance OEMs conduct regulatory tests for each appliance type. During certain regulatory tests, the refrigeration appliance is run under specified conditions while operating data is collected from the refrigeration appliance and product simulators (i.e., temperature probes potted in a product simulation vessel) are placed at a plurality of spaced apart locations throughout the refrigeration appliance. Table 3 below shows partial exemplary data for a roughly 20-minute interval during a regulatory test of a refrigeration appliance. In the table, Temp. Ret. represents the difference between the measured return air temperature and the set point. Temp. Int. is the difference between the measured supply temperature and the set point. SIM1-SIM10 each represent the difference between the temperature of a simulation probe and the set point for one of 13 product simulators placed at strategic locations throughout the refrigeration appliance. Suction is the temperature of the suction line of the refrigeration appliance, and Liquid is the temperature of the liquid line of the refrigeration appliance. Ambient and RH % are respectively the ambient temperature and ambient relative humidity in the test environment. % Run is the duty cycle of the compressor during the test interval, and Cycles are the number compressor run cycles that have been conducted during the test.

TABLE 3

| Time | Temp. Ret. | Temp Int. | SIM1 | SIM2 | SIM3 | SIM4 | SIM5 | SIM6 | SIM7 | SIM8 | SIM9 | SIM10 |
|---|---|---|---|---|---|---|---|---|---|---|---|---|
| 5 | 2.8 | 3.4 | −2.8 | −4.1 | 1.2 | −0.1 | −2.8 | −4.1 | 0.4 | −0.1 | −2.4 | −3.3 |
| 6 | −1.2 | −1.2 | −2.8 | −4.1 | 1.2 | −0.1 | −2.8 | −4 | 0.5 | −0.1 | −2.5 | −3.2 |
| 7 | −2.1 | −3.1 | −2.8 | −4.1 | 1.2 | −0.1 | −2.8 | −4.1 | 0.5 | −0.1 | −2.5 | −3.2 |
| 8 | −2.8 | −4 | −2.8 | −4.1 | 1.2 | −0.1 | −2.8 | −4.1 | 0.5 | −0.1 | −2.5 | −3.2 |
| 9 | −3.4 | −4.8 | −2.8 | −4.1 | 1.2 | −0.1 | −2.8 | −4.1 | 0.5 | −0.1 | −2.5 | −3.2 |
| 10 | −4 | −5.5 | −2.8 | −4.1 | 1.2 | −0.1 | −2.7 | −4.1 | 0.5 | −0.1 | −2.4 | −3.2 |
| 11 | 0 | −5.5 | −2.8 | −4.1 | 1.2 | −0.1 | −2.8 | −4.1 | 0.4 | −0.1 | −2.4 | −3.2 |
| 12 | 3.6 | −2.7 | −2.8 | −4.1 | 1.2 | −0.1 | −2.8 | −4.1 | 0.4 | −0.1 | −2.5 | −3.3 |
| 13 | 4.3 | −1.6 | −2.8 | −4.1 | 1.2 | −0.1 | −2.7 | −4.1 | 0.4 | −0.1 | −2.4 | −3.3 |
| 14 | 5.1 | −1 | −2.8 | −4.1 | 1.2 | −0.1 | −2.8 | −4.1 | 0.4 | −0.1 | −2.5 | −3.3 |
| 15 | 12.4 | 8.4 | −2.8 | −4.1 | 1.2 | −0.2 | −2.8 | −4.1 | 0.4 | −0.1 | −2.4 | −3.3 |
| 16 | 2.9 | 3.4 | −2.8 | −4.1 | 1.2 | −0.1 | −2.8 | −4.1 | 0.4 | −0.1 | −2.4 | −3.3 |
| 17 | 4.5 | 3.3 | −2.8 | −4.1 | 1.2 | −0.1 | −2.8 | −4.1 | 0.5 | −0.1 | −2.4 | −3.3 |
| 18 | 6.5 | 4.1 | −2.8 | −4.1 | 1.2 | −0.1 | −2.8 | −4.1 | 0.4 | −0.1 | −2.4 | −3.3 |
| 19 | 7.3 | 4.5 | −2.8 | −4.1 | 1.2 | −0.1 | −2.8 | −4.1 | 0.4 | −0.1 | −2.5 | −3.3 |
| 20 | 4.2 | 3.9 | −2.8 | −4.1 | 1.2 | −0.1 | −2.8 | −4.1 | 0.4 | −0.1 | −2.4 | −3.3 |
| 21 | −0.4 | −0.9 | −2.8 | −4.1 | 1.2 | −0.1 | −2.8 | −4.1 | 0.4 | −0.1 | −2.5 | −3.3 |
| 22 | −1.1 | −2.7 | −2.8 | −4.1 | 1.2 | −0.1 | −2.8 | −4.1 | 0.5 | −0.1 | −2.5 | −3.2 |

TABLE 3-continued

| | | | | | | | | | | | | |
|---|---|---|---|---|---|---|---|---|---|---|---|---|
| 23 | −2.1 | −3.8 | −2.8 | −4.1 | 1.2 | −0.1 | −2.8 | −4.1 | 0.5 | −0.1 | −2.5 | −3.2 |
| 24 | −3.4 | −4.5 | −2.8 | −4.1 | 1.2 | −0.1 | −2.8 | −4.1 | 0.5 | −0.1 | −2.5 | −3.2 |

| SIM11 | SIM12 | SIM13 | Suction | Liquid | Ambient | % RH | % Run | Cycles |
|---|---|---|---|---|---|---|---|---|
| −0.8 | −1.4 | 1.7 | 72 | 84.4 | 75 | 54.5 | 0 | 2 |
| −0.8 | −1.3 | 1.7 | 81.5 | 90 | 75.1 | 55.2 | 0 | 2 |
| −0.8 | −1.3 | 1.7 | 81.5 | 89.7 | 75.2 | 55.3 | 0 | 2 |
| −0.8 | −1.3 | 1.7 | 81.2 | 89.2 | 75.3 | 55 | 0 | 2 |
| −0.8 | −1.3 | 1.7 | 80.6 | 88.3 | 75.3 | 55.1 | 0 | 2 |
| −0.8 | −1.3 | 1.7 | 80 | 87.5 | 75.1 | 54.8 | 0 | 2 |
| −0.8 | −1.3 | 1.7 | 79.5 | 85.3 | 74.8 | 54.8 | 0 | 2 |
| −0.8 | −1.4 | 1.7 | 81.2 | 76.4 | 74.7 | 55 | 0 | 2 |
| −0.8 | −1.4 | 1.7 | 83.2 | 70.8 | 74.6 | 55.3 | 0 | 2 |
| −0.8 | −1.4 | 1.7 | 84.8 | 71.9 | 74.7 | 54.7 | 0 | 2 |
| −0.8 | −1.4 | 1.7 | 85.9 | 73.2 | 74.8 | 54.8 | 0 | 2 |
| −0.8 | −1.4 | 1.7 | 86.9 | 74.6 | 75 | 55.7 | 0 | 2 |
| −0.8 | −1.4 | 1.7 | 87.6 | 75.8 | 75 | 54.1 | 0 | 2 |
| −0.8 | −1.4 | 1.7 | 88.5 | 76.8 | 75.1 | 55.9 | 0 | 2 |
| −0.8 | −1.4 | 1.7 | 89.1 | 77.7 | 75.1 | 55.3 | 0 | 2 |
| −0.9 | −1.4 | 1.7 | 78.5 | 82.5 | 75.1 | 54 | 40.1 | 3 |
| −0.8 | −1.3 | 1.7 | 80.2 | 90.4 | 75.1 | 51.1 | 40.1 | 3 |
| −0.8 | −1.3 | 1.7 | 80.7 | 89.1 | 75.1 | 56.7 | 40.1 | 3 |
| −0.8 | −1.3 | 1.7 | 80.5 | 88.5 | 75 | 54.6 | 40.1 | 3 |
| −0.9 | −1.3 | 1.7 | 80.5 | 88.3 | 74.9 | 56 | 40.1 | 3 |

It can be seen that the regulatory testing data is a rich proprietary data set upon which numerous data models could be created. For example, it is possible derive a product simulation model that simulates product temperature by location in the refrigeration appliance as a function of operating data such as return air temperature, supply air temperature, suction line temperature liquid line temperature, ambient temperature, ambient relative humidity, and compressor run time. The model could also be a three-dimensional model of temperature variation through the inside of the refrigeration appliance. Accordingly, in one or more embodiments, the proprietary OEM data includes a location-specific product simulation model for a refrigeration appliance type correlating operating data to product temperature to at various locations throughout the refrigeration appliance. As explained more fully below, this enables the asset manager 14 to act on operating data by simulating product temperatures at one or more locations in the refrigeration appliance based on the operating data.

Proprietary OEM data can also include one or more models that relate operating data to life expectancy for one or more components of a refrigeration appliance. Again, such models may be derived from long-term experimental testing or other empirical observation techniques. In one specific example, the OEM database includes models organized by refrigeration appliance type, which correlate liquid line temperature and ambient temperature to degradation of compressor operating efficiency. As explained more fully below, access to such proprietary models enables the asset manager 14 to act on operating data received from refrigeration appliances by predicting compressor failure based on the liquid line temperature and air temperature measurements received from the IOT devices.

Referring to FIGS. 6A-6I, exemplary display screens for a front end web application 22 of the asset management system 10 are shown. In FIGS. 6A-6I, the display screens are views from the web application 22, but it will be understood that the mobile application view for mobile application 24 can comprise a reformatting of what is shown in FIGS. 6A-6I.

Figure 6A:
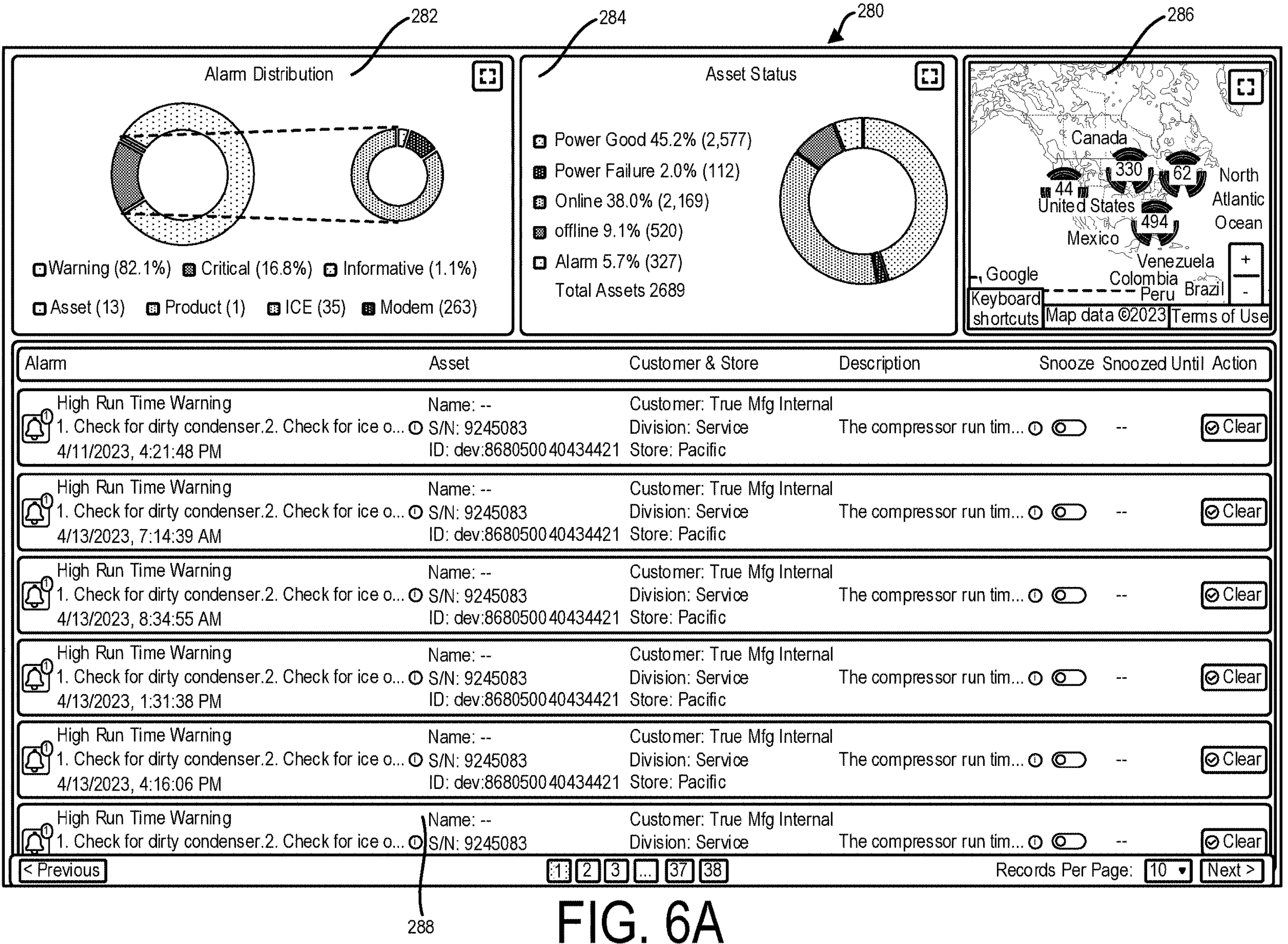
FIG. 6A is a screenshot of a fleet overview screen of a front end web application of the asset management system.

FIG. 6A depicts an exemplary embodiment of a fleet overview screen 280 for the front end application 22. To display the fleet overview screen 280, a user must sign into the front end application. Via the API 240 and identity access management system 234, the front end application 22 determines the refrigeration appliances assigned to the user and generates the fleet overview screen to include information about those appliances only. The fleet overview screen 280 is the landing screen for the front end application 22. It can be seen that the fleet overview screen includes an alarm distribution panel 282 providing a summary chart for the alarm status of all of the refrigeration appliances assigned to this user, an asset status panel 284 providing a summary chart for the asset status of all the refrigeration appliances assigned to this user, a map panel 286 depicting locations of the appliances on a map, and an alarm table panel 288 displaying details about recent alarm indications received from the refrigeration appliances.

Figure 6B:
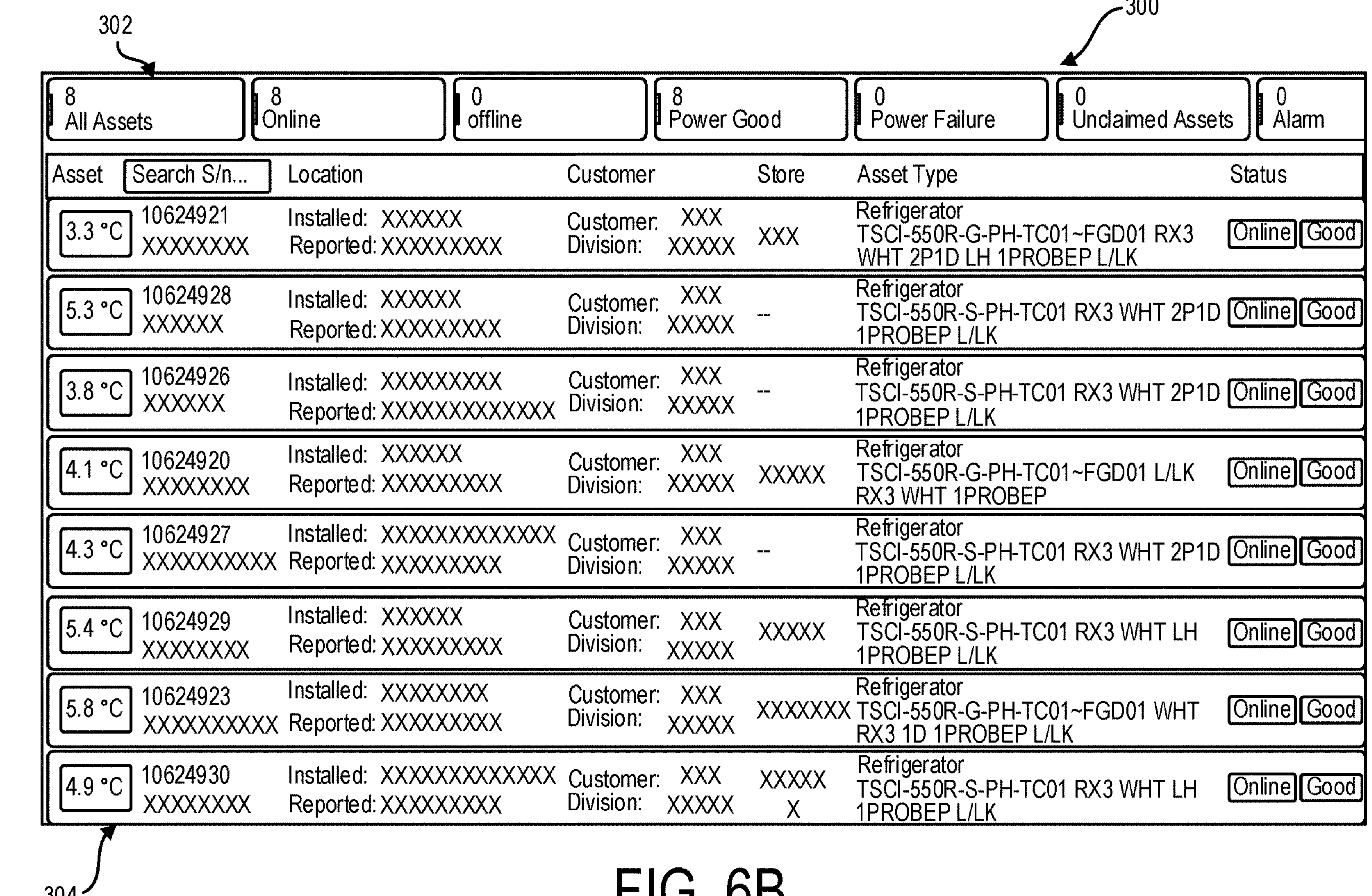
FIG. 6B is a screenshot of an asset list view of the front end web application of the asset management system.

FIG. 6B depicts an exemplary embodiment of an asset list view including a fleet indicator bar 302 and an appliance information table 304. The fleet indicator bar 302 includes indication objects summarizing the status of the fleet. In this case, the left indicator shows the user that eight refrigeration appliances are assigned. The adjacent indicator shows that all eight assigned refrigeration appliances are currently online and transmitting data to the asset manager 14. The next indicator shows that zero appliances are offline. The next indicator shows that all eight assets have main power. The following indicator shows that zero appliances are in power failure mode. The second-from-right indicator shows that zero of the user's refrigeration appliances are unclaimed. And the right-most indicator shows that there are zero active alarm conditions in this fleet of eight appliances. The appliance information table 304 provides a summary of information about each appliance (where each appliance is represented by one row of the table). The information for the table 304 is drawn from the time series database 204 and the meta information database 230. From left to right, columns of the table are labeled 'Asset', 'Location', 'Customer', 'Store', 'Asset Type', and 'Status'. Temperature display items along the left-hand side of the table 304 display the current air temperature inside the refrigeration appliance. As shown, the asset serial number is the primary identifier in the front end application view 300.

Figure 6C:
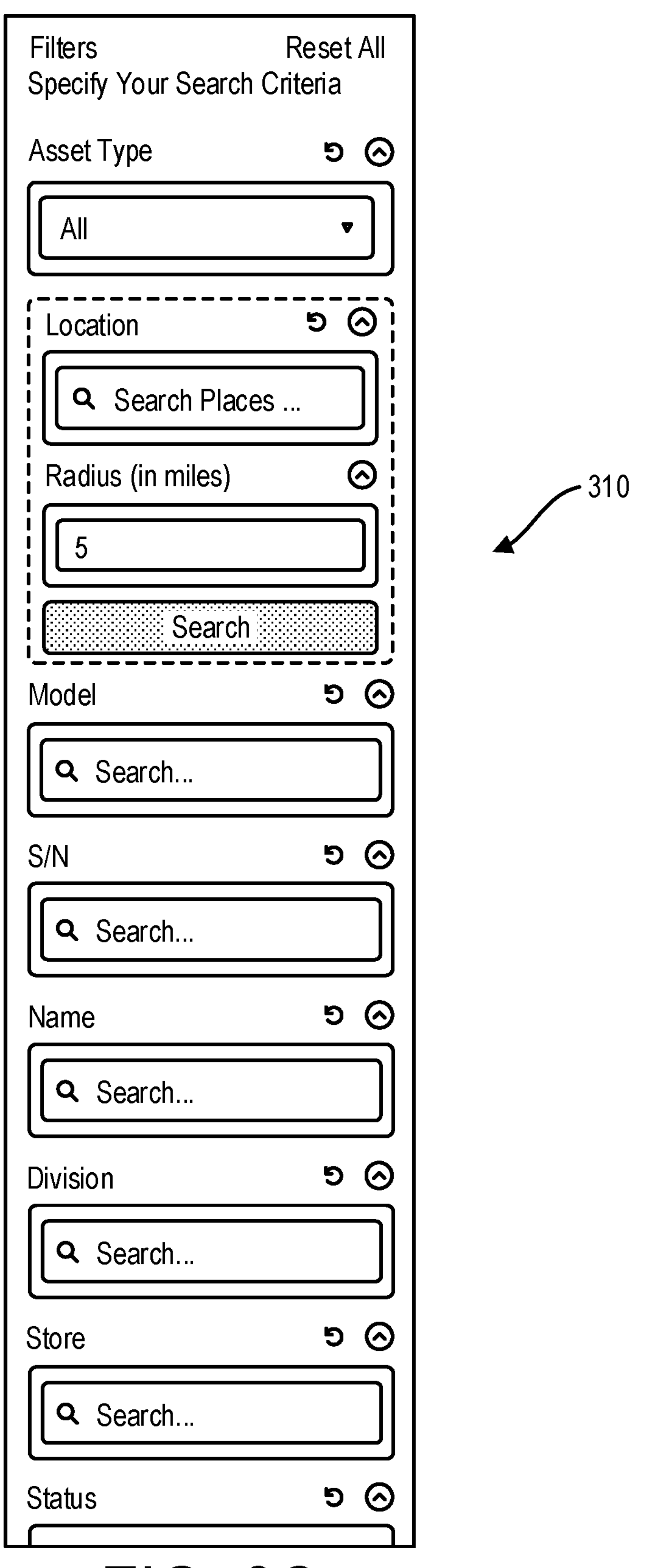
FIG. 6C is a screenshot of an asset filter panel of the front end web application of the asset management system.

FIG. 6C depicts an exemplary embodiment of an asset filter panel 310. The asset filter panel 310 includes numerous fields for filtering among the refrigeration appliances assigned to the user. For example, the user can filter by appliance type, location, model number, serial number, name, division, and store.

Figure 6D:
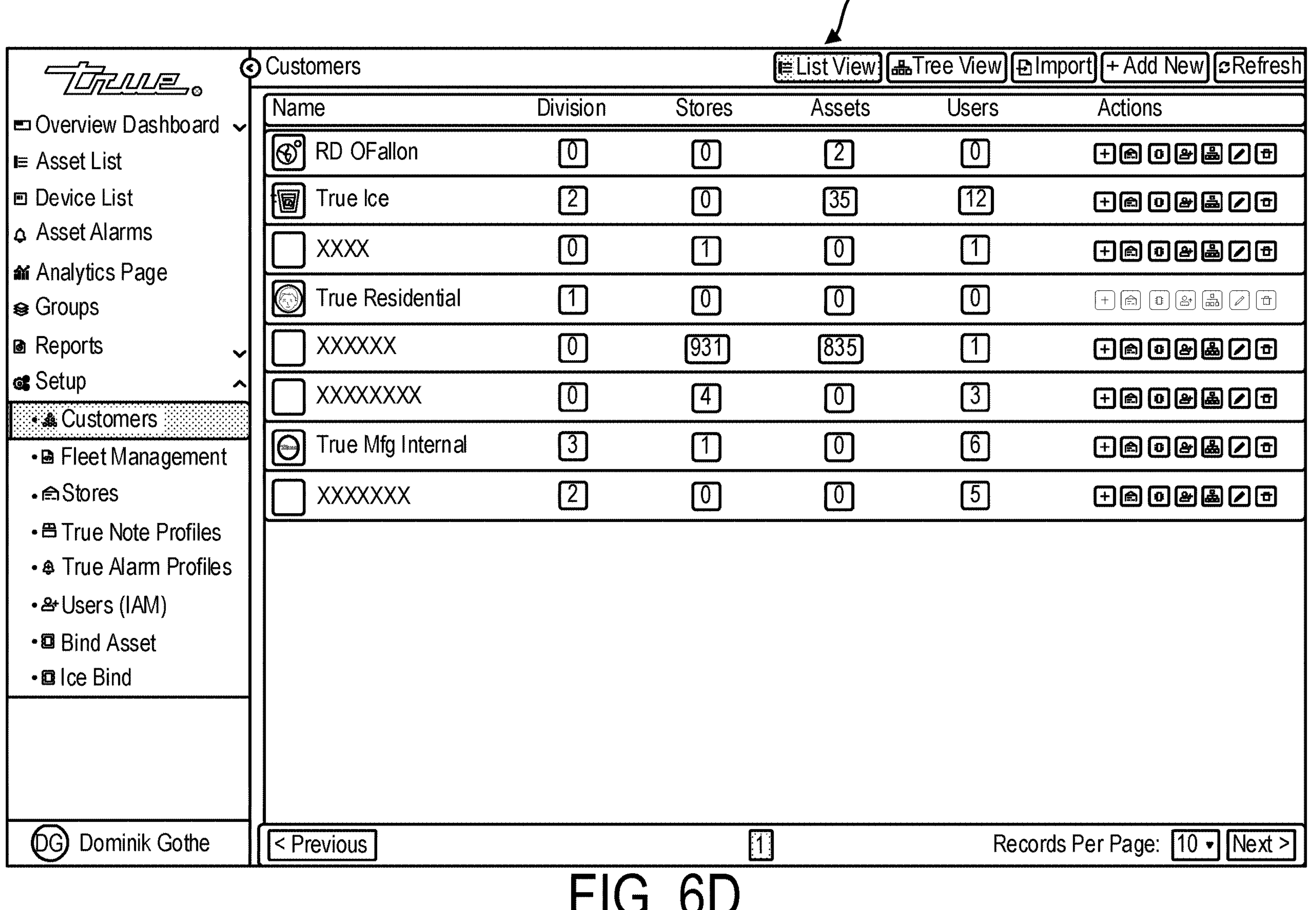
FIG. 6D is a screenshot of a customer view of the front end web application of the asset management system.

FIG. 6D depicts an exemplary embodiment of a customer view 320. The customer view 320 is available to supervisory administrators, allowing the administrator to select refrigeration appliances by customer. The customer view 320 also shows the number of divisions, stores, assets, and users that are assigned to each customer, as well as providing a list of actions that are available to the user for each customer.

Figure 6E:
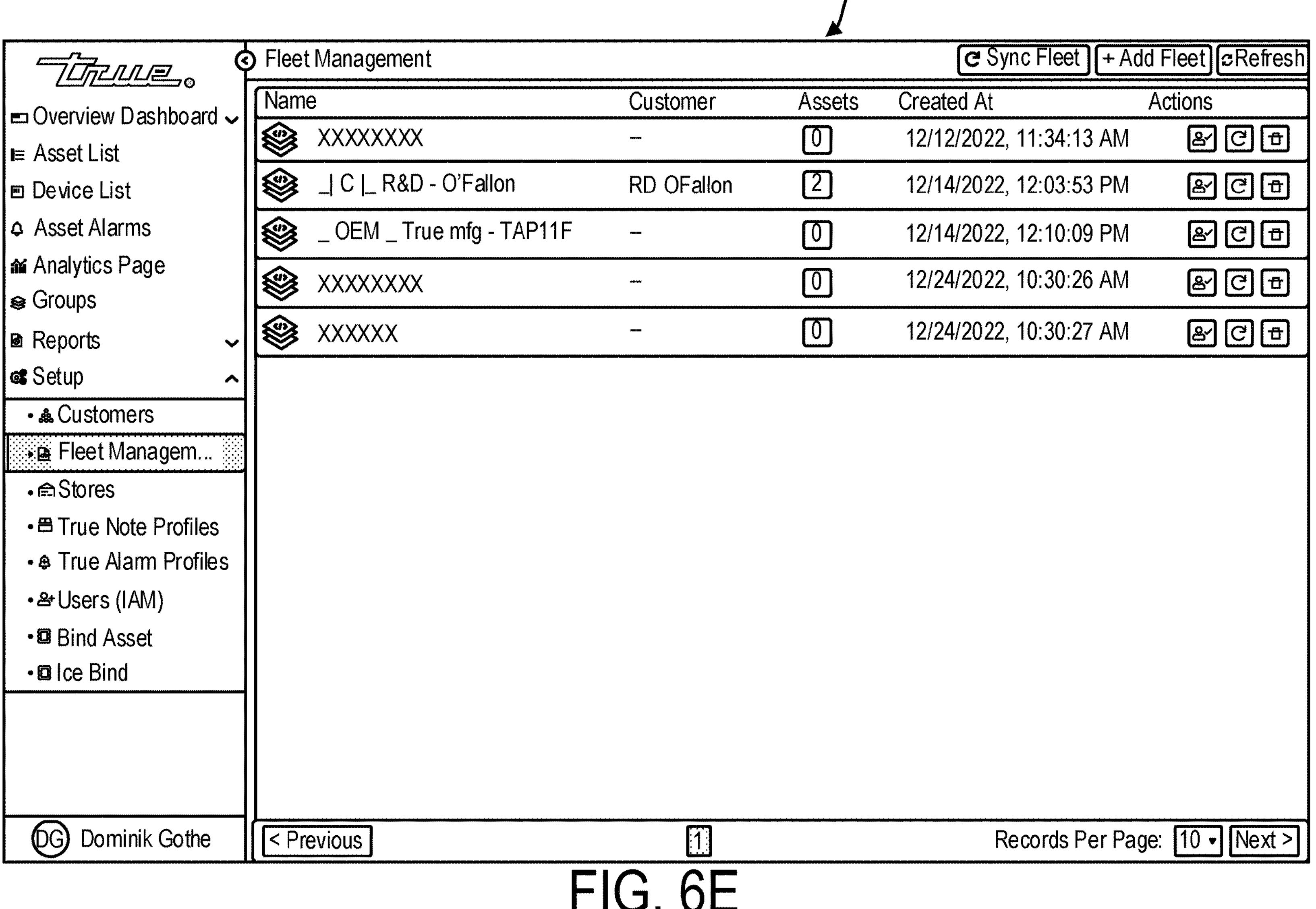
FIG. 6E is a screenshot of a fleet management view of the front end web application of the asset management system.

FIG. 6E depicts an exemplary embodiment of a fleet management view 330. The fleet management view 330 may also be available to administrators of asset management system accounts. The fleet management view 330 provides a different way of grouping and organizing refrigeration appliances.

Figure 6F:
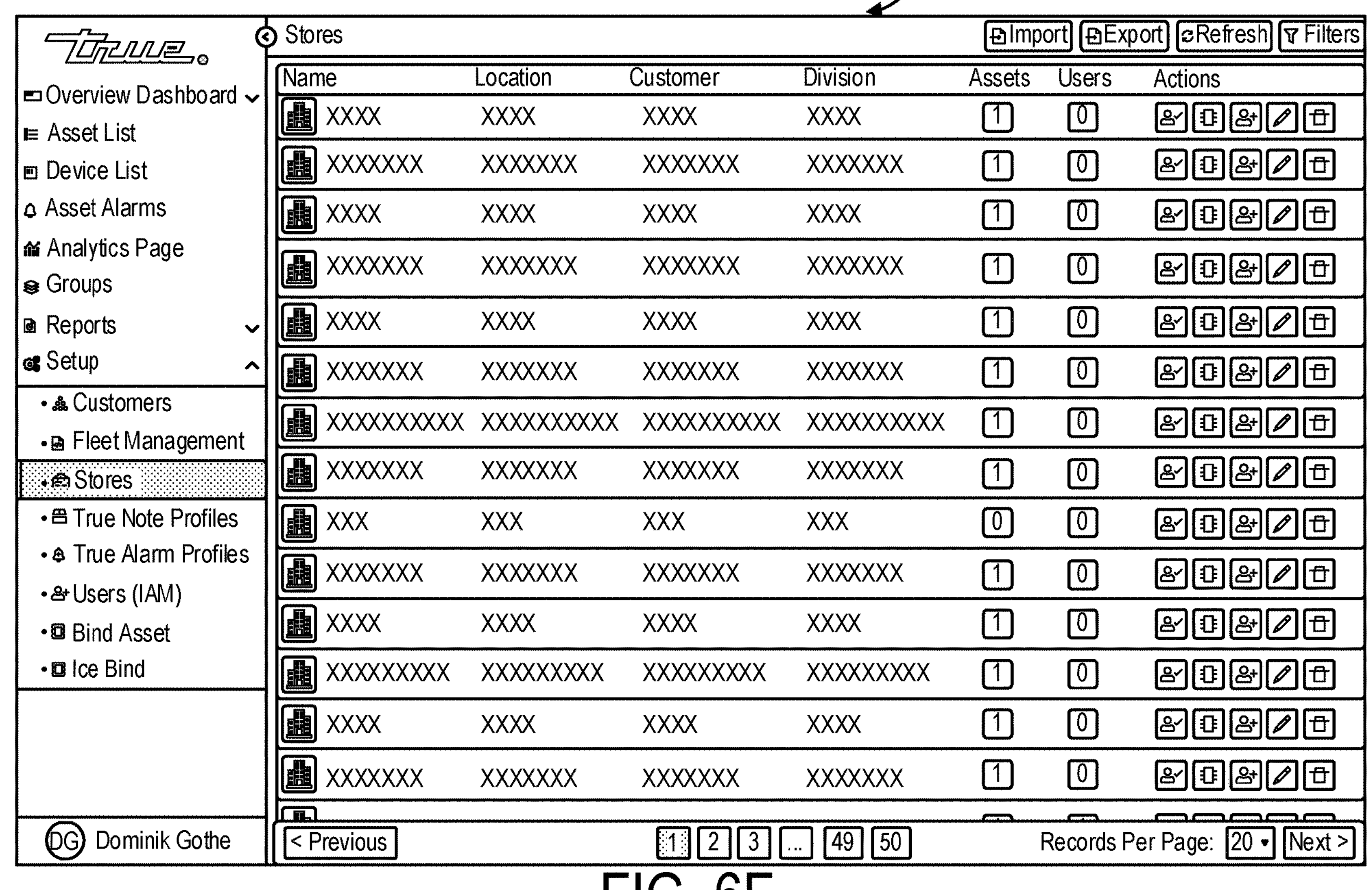
FIG. 6F is a screenshot of a store view of the front end web application of the asset management system.

FIG. 6F depicts an exemplary embodiment of a store view 340. The store view 340 allows the user to select appliances by store and displays a table including information about each store, such as location, customer, division, number of assets, number of users, and available actions.

FIG. 6G depicts an exemplary embodiment of an operating data profile part view 340. As explained elsewhere, the front end applications 22, 24 enable a user to adjust the appliance profile that is loaded into memory of an appliance's IOT device. The operating data profile part view 340 enables a user to view and make changes to the operating data profile part for various types of refrigeration appliances.

Figure 6H:
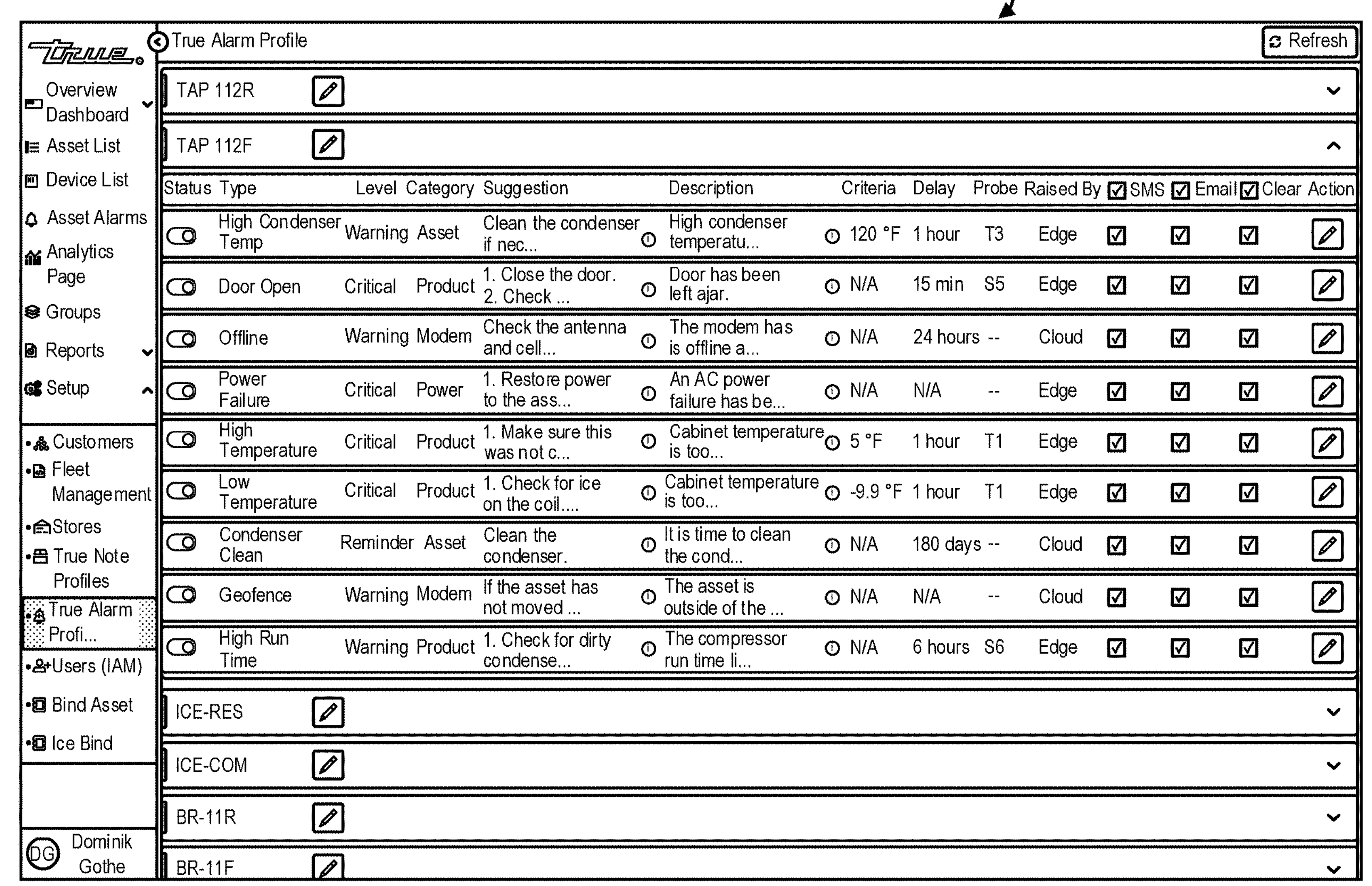
FIG. 6H is a screenshot of an alarm profile part view of the front end web application of the asset management system.

FIG. 6H depicts an exemplary embodiment of an alarm profile part view 350. The alarm profile part view 350 enables a user to view and make changes to the alarm profile part for various types of refrigeration appliances. Note that the alarm profile part view 350 includes information about the delay before push notification and types of push notifications that are sent in response to the alarm.

FIG. 6I depicts an exemplary embodiment of a user view 360. The user view 360 provides information about the various users of the asset management system 10, their roles, their contact information, the customer to which they are assigned, and the store to which they are assigned.

Having described the architecture of the asset management system 10 and its major components in some detail, this disclosure will now turn to the processes that are enabled by the asset management system.

First, referring to FIG. 7, an exemplary method of linking a refrigeration appliance to the asset manager 14 is generally indicated at reference number 400. To connect an IOT device 12 to an appliance, initially wired connections are made to the I/O ports. This process can be performed during manufacturing of the refrigeration appliance 11*n* in a factory-installed application or by a user in the field in a retrofit application. In either case, the user is provided with appliance type-specific instructions for plugging cable connectors of the appliance 11*n* into the I/O ports 104A-104F, 106 of the IOT device 12. In accordance with the instructions, the user plugs one or more cable connectors of the refrigeration appliance 11*n* into one or more of (i) a plurality of low voltage I/O ports of the IOT device and (ii) a serial data port of the I/O device and connects the IOT device to a main power source MP. The Blues Wireless Notecard 140 automatically connects to the asset management network 20 when the device 12 is powered on. When other types of modems are used, it may be necessary for the user to connect the modem to the network.

Connecting the IOT device 12 to the refrigeration appliance 11*n* also requires binding the IOT device to the appliance for purposes of asset management communications and data organization. The binding process 400 comprises a first step 402 of scanning the QR code 250 on the IOT device 12 with a client device, e.g., using the camera on a computer or a mobile device such as a smartphone or tablet. As explained above, the QR code encodes a web address pointing to the data broker and including a device ID (e.g., IMEI) for the modem 140. The web address may have the following shortened form: https://qrgo.org/id/[devID]. Scanning the QR code automatically enters the web address into a web browser of the client device. Thus, as shown in step 404, the client device makes a web page request to the web address encoded in the QR code, which is the URL containing the device ID (e.g., IMEI) of the IOT device 12.

At step 406, the data broker 16 receives the web page request including the device ID for the IOT device 12. At step 408, the data broker 16 determines based on the device ID contained in the request, whether the IOT device has previously been bound to a refrigeration appliance in the asset management system 10. To make this determination, the data broker 16 can query a database it maintains relating device IDs to appliance serial numbers. Alternatively, the data broker 16 could query the meta information database 230 of the asset manager 14. In this instance, because the IOT device 12 is being bound to the refrigeration appliance 12, at decision point 410, the data broker 16 determines that the IOT device has not previously been bound to a refrigeration appliance.

Figure 8:
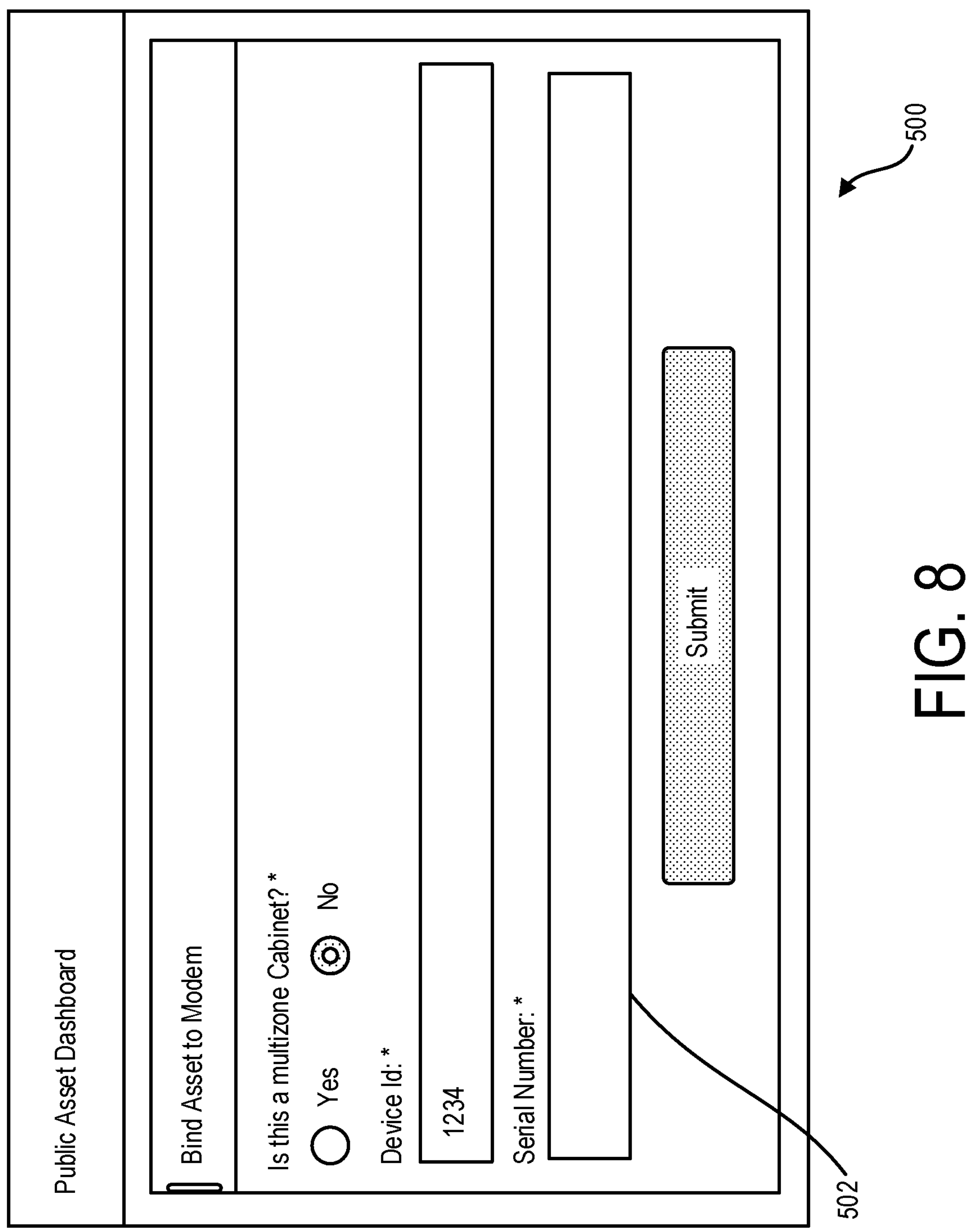
FIG. 8 is a screen shot of a public asset binding page generated on a client device during the appliance binding process of FIG. 7.

As shown in step 412 and FIG. 8, in response to receiving the web page request for the IOT device 12 and determining that the IOT device has not been bound to a refrigeration appliance, the data broker 16 returns a web form 500 (FIG. 8) including a field 502 for input of a serial number of a refrigeration appliance. In one or more embodiments, regardless of the result of step 408 and decision point 410, the data broker 16 redirects the client device to a link having the following example format: https://true-insight.com/publicAsset?deviceId[device]&sn[sn]. When the data broker 16 determines that the IOT device 12 has not been bound to a refrigeration appliance, the data broker uses DOES_NOT_EXIST for the [sn] field; whereas when the data broker determines that the IOT device was previously bound to the refrigeration appliance, the data broker users the serial number for the bound appliance in the [sn] field.

The web form 500 displays on the client device, and the user inputs a serial number as shown in step 414. Upon receipt of the serial number, the IOT device 12 is bound to the refrigeration appliance 11*n* in the asset management system at step 416. Binding the IOT device 12 to the refrigeration appliance 11*n* involves a number of operations.

As shown at 418, binding the IOT device 12 to the refrigeration appliance 11*n* comprises configuring the asset manager 14 to parse and store operating data transmitted by the IOT device based on the serial number of the refrigeration appliance.

Additionally, as shown at 420, binding the IOT device 12 to the refrigeration appliance 11*n* configures the data broker 16 to receive data packets from the IOT device containing operating data for the refrigeration appliance and tagged by a device ID for the IOT device and convert them into structured data objects tagged by the serial number of the refrigeration appliance 11*n*. Thus, in one embodiment, the binding process configures the data broker 16 to transmit operating data from the IOT device 12 as JSON objects, each with a key-value pair for the serial number of the refrigeration appliance 11*n*.

As shown at 422, binding the IOT device 12 to the refrigeration appliance 11*n* also causes the asset manager 14 to automatically upload the appliance profile to the memory of the edge computing device 130. In one embodiment, the asset manager 14 is configured to query an OEM database 28 for the appliance control profile based on the serial number of the refrigeration appliance 11*n*. As explained above, loading the operating data part of the appliance control profile into memory of the edge computing device 130 of the IOT device 12 configures the processor of the edge computing device for reading operating data from the respective I/O ports 104A-104F, 106 and transmitting the operating data to the asset manager 14 via the modem 140. Loading the alarm part of the appliance profile further configures the processor for recognizing alarm conditions on the edge of the asset management network 20 and transmitting alarm indications to the asset manager 14 via the modem 140.

Figure 9:
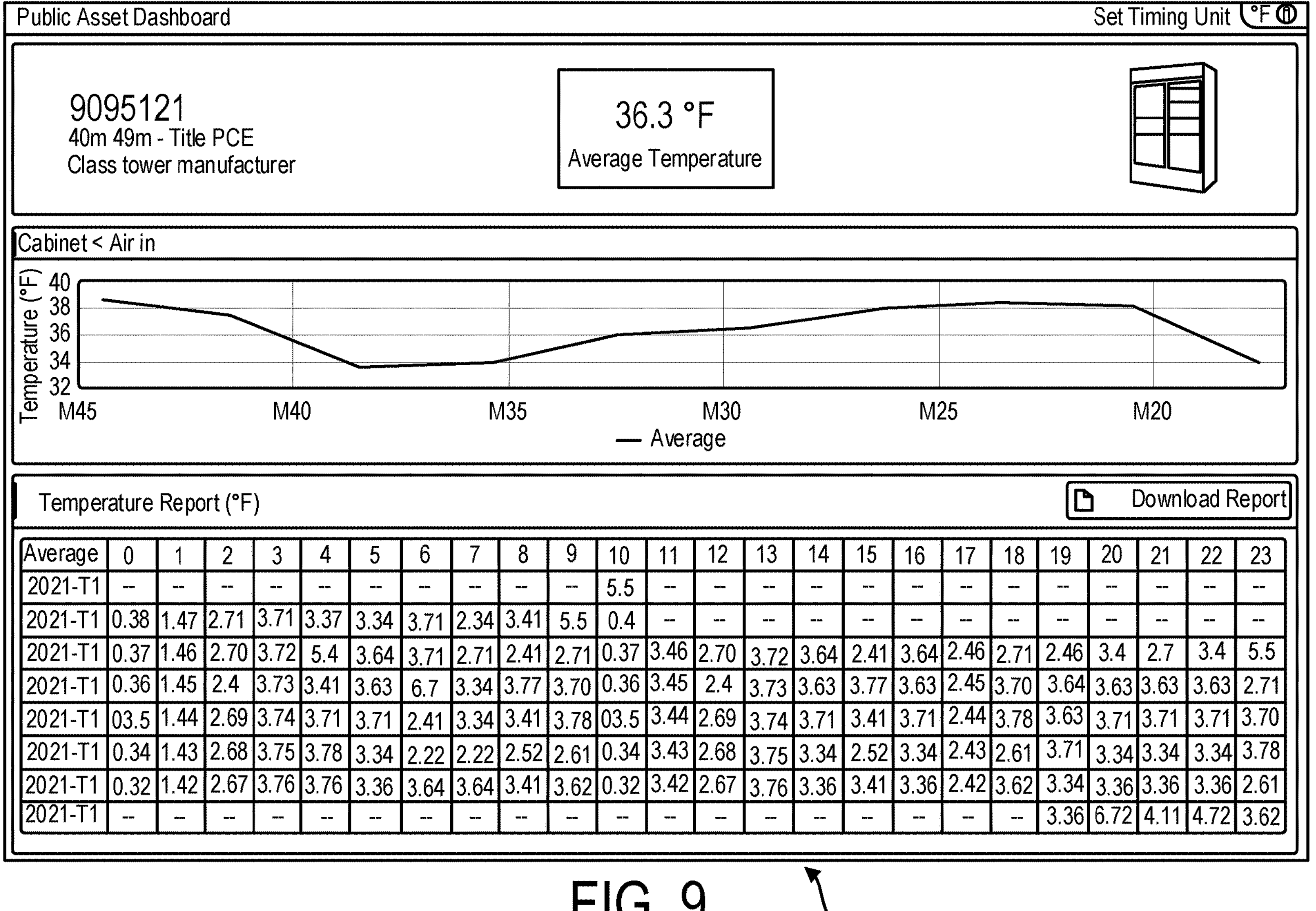
FIG. 9 is a screen shot of a public refrigeration appliance data page displayable on a client device after the refrigeration appliance is bound to an IOT device.

Referring to FIGS. 7 and 9, after the IOT device 12 is bound to the refrigeration appliance 11*n*, if a user of a client device scans the QR code 250 to enter the web address including the device ID (steps 402, 303), and the data broker receives the request (step 406) and determines that the IOT device has already been bound to the refrigeration appliance 11*n*, at step 424, the data broker redirects the client device to a web address for the public web page 600 (FIG. 9) for the refrigeration appliance. As shown, the public web page 600 displays operating data (specifically, air temperature data) for the refrigeration appliance 11*n*. The inventor envisions that the same QR code sticker that is placed at 250 on the IOT device 12 could also be placed on a customer-accessible location on the refrigeration appliance so that a customer could use the QR code to obtain the public web page 600 in order to verify that the product being purchased out of the refrigeration appliance has been held at the proper temperature.

Figure 10:
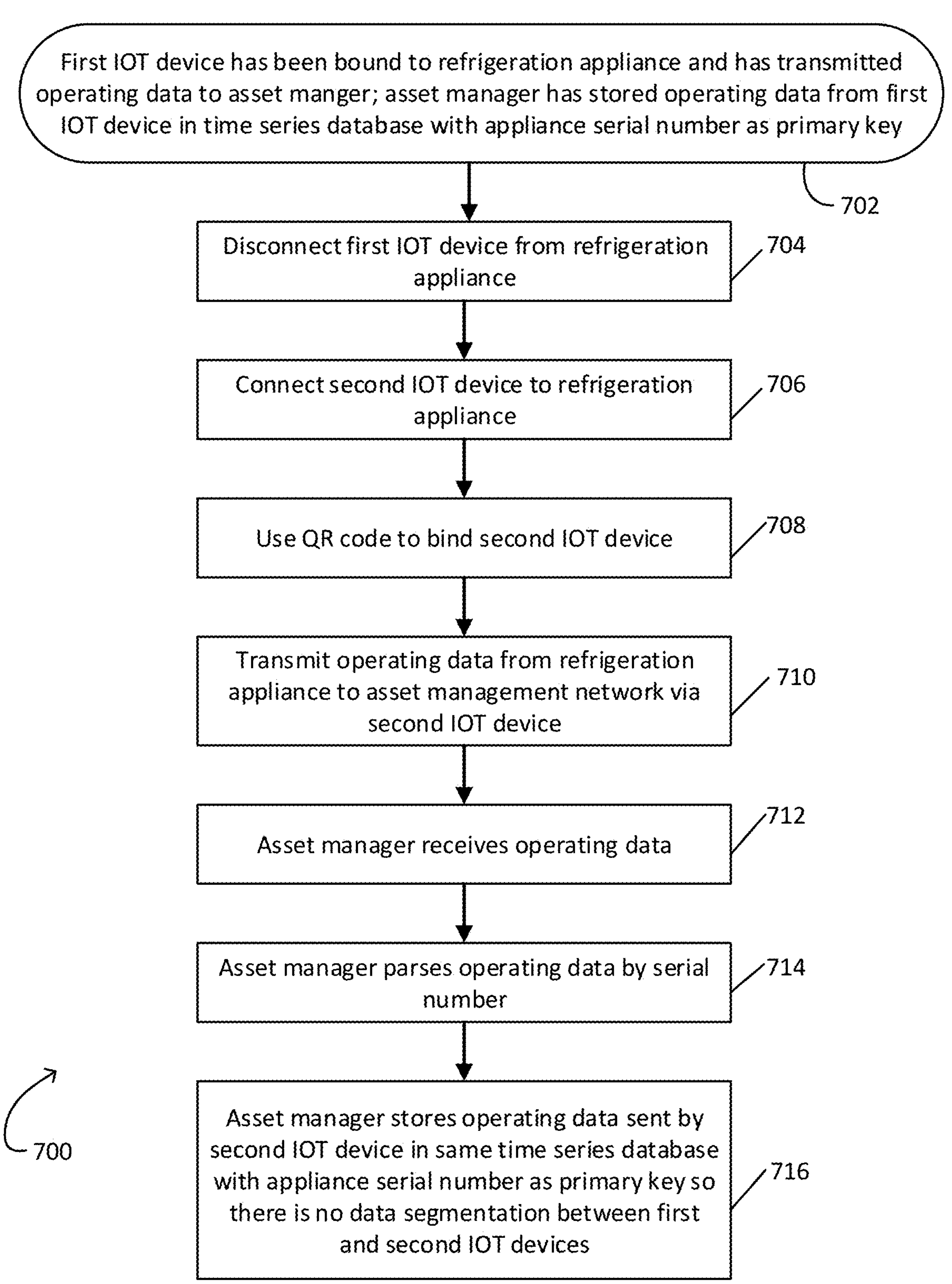
FIG. 10 is a flow chart illustrating steps of a process for seamless replacement of an IOT device in accordance with the present disclosure.

Referring to FIG. 10, the asset management system 10 in accordance with the present disclosure can be configured to facilitate a process 700 for seamless replacement of IOT devices 12 without data segmentation. The situation addressed here is one in which a first IOT device for a given refrigeration appliance 11*n* must be replaced with a second IOT device. This situation can arise for any number of reasons, e.g., a malfunction of the first IOT device, exceeding prepackaged data limits of the first IOT device, exceeding a lifetime rating of the first IOT device, or any other reason.

As shown at 702, the starting point for process 700 is a condition in which a first IOT device 12 has been bound to the refrigeration appliance 11*n* and has transmitted operating data to the asset manager 14 for a first period of time. The first IOT device 12 has a first device ID, and the operating data from the appliance 11*n* sent via the first IOT device was tagged with a serial number for the refrigeration appliance. Since the asset manager 14 is agnostic to the device ID of the first IOT device 12, the asset manager 14 has stored operating data from the first IOT device 12 in the time series database 204 using the appliance serial number as the primary key.

From this starting point, the first IOT device 12 is disconnected from the refrigeration appliance 11*n* at step 704, and the second IOT device 12 is connected to the refrigeration appliance at step 706. This means that cable connectors are removed from the I/O ports 104-104F, 106 of the first IOT device 12 and plugged into the same ports of the second IOT device 12. Subsequently, at step 708, the QR code 250 on the second IOT device 12 is used to bind the second IOT device to the refrigeration appliance using the above-described binding process 400.

At this stage, the second IOT device 12 has been connected and bound to the refrigeration appliance 11*n*, yet the asset manager 14 has a time series database 204 populated with operating data for the refrigeration appliance from the first IOT device 12. At step 710 the second IOT device 12 transmits additional operating data for the refrigeration appliance 12 to the asset management network 20. In this case, the data broker 16 tags the operating data from second IOT device 12 with the serial number for the refrigeration appliance 11*n*.

At step 712, the asset manager 14 receives tagged operating data and parses the operating data by serial number (714). At the parsing step 714, the asset manager 14 parses the operating data from the second IOT device 12 in the same way that the asset manager 14 parsed the operating data from the first IOT device 12. At step 716, the asset manager 14 stores the tagged operating data from the second IOT device 12 in the same record of the time series database 20 that was used to store the operating data sent by the first IOT device 12 and has a primary key equal to the serial number of the appliance. Again, the asset manager 14 stores the operating data from the second IOT device 12 in the same format that the IOT device stored the operating data from the first IOT device. Hence, the asset manager maintains a seamless time series database for the refrigeration appliance 11*n* encompassing both the first operating data transmitted by the first IOT device 12 and the second operating data transmitted by the second IOT device 12. The structure of the time series database is unchanged by binding the second IOT device 12 to the refrigeration appliance 11*n*.

Accordingly, it can be seen that, in one or more implementations of the asset management system 10, binding an IOT device 12 to a refrigeration appliance 11*n* configures the asset manager 14 to store the operating data in a preexisting time series database record with the serial number of the refrigeration appliance as primary key and prepopulated with operating data for the refrigeration appliance transmitted by another IOT device previously bound to the refrigeration appliance.

Referring to FIG. 11, an edge processing routine that can be conducted by any edge computing device 130 in the asset management system 10 is shown schematically at reference number 800. As shown, the starting point 802 for the process 800 is when the IOT device 12 is bound to a particular refrigeration appliance 12. When binding occurs, the appliance control profile and firmware or other preloaded instructions stored in the memory of the edge computing device 130 configure the processor of the edge computing device to perform a sampling subroutine 810, an optional edge compute subroutine 820, an operating data transmission subroutine 830, and an alarm subroutine 840.

The sampling subroutine 810 configures the edge computing device 130 for sampling operating data from the respective appliance 11*n* at a sampling frequency. In the illustrated embodiment, the sampling subroutine 810 is continuous loop of three steps, completed at the sampling frequency. Every sampling interval, the edge computing device 130 wakes up (step 812), samples the operating data (step 814), and goes to sleep (step 816).

In certain embodiments, the edge computing device 830 is configured to perform one or more edge compute functions 820 on the sampled data on a sample-by-sample basis.

One example of such an edge compute function 802 will be described in reference to FIG. 12 below.

The transmission subroutine 830 configures the edge computing device 130 for transmitting the operating data to the asset management network 20 via the modem 140 at a transmission frequency less than the sampling frequency. Typically, the sampling subroutine 810 will collect numerous (e.g., more than 20, more than 50, more than 100, more than 200) samples between each transmission. In the illustrated example, the transmission subroutine comprises a batch aggregation step 832 and a data transmission step 834. In the batch aggregation step 832, the edge computing device 130 performs predefined batch aggregation functions on the sampled data, and optionally on the edge-analyzed data from 820. That is, the edge computing device 130 determines batch values for the samples collected during the transmission interval. For example, for each parameter, the edge computing device determines the minimum parameter value during the transmission interval, maximum value, average value, etc. At step 834 the edge computing device 130 transmits the aggregated data to the asset management network 20 as a data packet.

The alarm subroutine 840 configures the edge computing device 130 to analyze the sampled operating data on the edge of the asset management network 20 for detecting an alarm condition in the operating data. As can be seen, the alarm subroutine 840 is carried out while the edge computing device 130 is simultaneously conducting the sampling and transmission subroutines 810, 830. Moreover, the transmission subroutine 830 and the alarm subroutine 840 are taking in and analyzing the sampled data in parallel. Alarm subroutine 840 comprises a decision point 842 in which the edge computing device 130 determines whether the sampled data (or analyzed sampled data from 820) has crossed or otherwise violates an alarm threshold. If so, at step 844 the edge computing device 130 is configured to immediately transmit an alarm indication to the asset management network 20 via the modem 140. This transmission of the alarm indication is independent of the transmission step 834 in the regular operating data transmission subroutine 830. Moreover, the alarm indication transmission 844 is asynchronous with respect to the transmission frequency of the transmission subroutine 830. Because alarm indications are not sent with the regular data packets containing operating data at the transmission frequency, the IOT device 12 employing its edge compute capability is able to notify the asset manager 14 of all alarms in an actionable timeframe.

Figure 12:
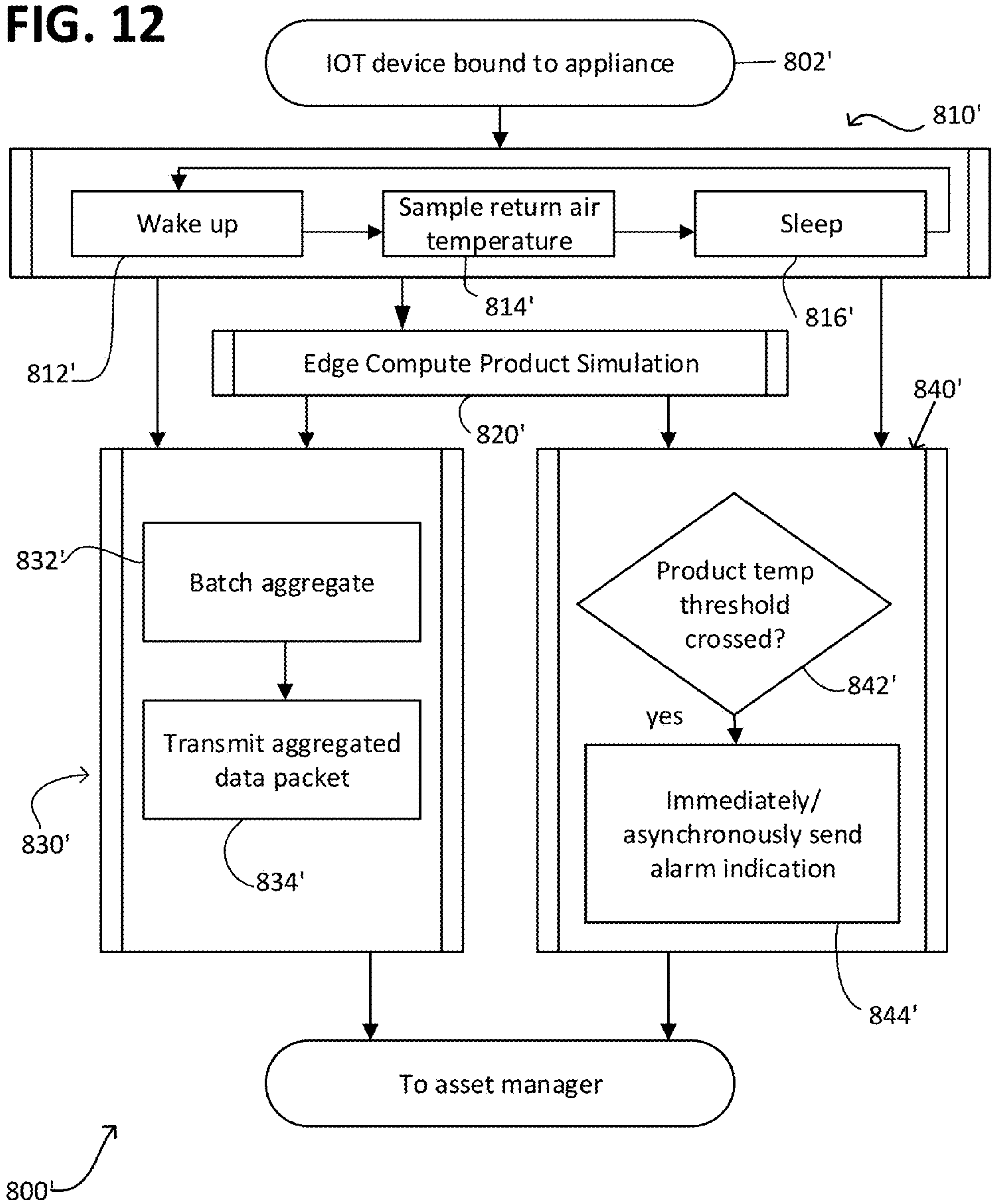
FIG. 12 is a schematic illustration similar to FIG. 11 but showing a particular implementation of the edge procession routine used for product temperature simulation.

Referring to FIG. 12, a particular implementation of the edge processing routine is shown at 800'. The edge processing routine 800' is essentially the same as edge processing routine 800, except that an edge computing product simulation subroutine 820' and product temperature alarm subroutine 840' are shown in place of the generic edge function 820 and alarm subroutine 840. Subroutines and steps of the edge processing routine 800' that correspond with subroutines and steps of the edge processing routine 800 are given the same reference number, followed by a prime symbol.

In edge processing routine 800', the IOT device 12 analyzes the return air temperature measured by a return air temperature sensor of the refrigeration appliance **11*n* to simulate a product temperature inside the refrigeration appliance. Those skilled in the art of refrigeration appliances 11*n* understand that the air temperature inside the refrigeration appliance and the temperature of product inside the refrigeration appliance will differ, sometimes substantially. But in some refrigeration appliance applications, product temperature is critical, e.g., scientific coolers/freezers, medical coolers/freezers. The conventional approach to tracking product temperature is to use a product simulator probe, like the one used in the regulatory testing example above. However, the inventor recognizes that the temperature of a product simulator probe will vary widely depending on location of the probe in the refrigeration appliance. The inventor believes that in some instances it would be more effective to make a holistic, location-agnostic estimate by simulating the product temperature as a function of return air temperature. Moreover, the inventor believes that the edge computing capabilities of the IOT device 12** provide the unique capability to not only accurately simulate product temperature but to provide actionable alarms when the simulated product temperature crosses an alarm threshold.

Accordingly, the process 800' is conducted by an IOT device 12 connected to a return air temperature sensor of a refrigeration appliance **11*n*. The edge computing function 820' and the edge computing device of the at least one IOT device is configured to simulate a product temperature based on sampled return air temperature from the return air temperature sensor. Moreover, the edge computing device 130 is configured to update the simulation of the product temperature at a simulation frequency that is much greater than the transmission frequency of transmission process 830'. This is a significant advantage of performing the simulation on the edge of the asset management network 20, rather than on the more powerful service side of the network, e.g., at the asset manager 14. In one or more embodiments, the simulation frequency is the same as the sampling frequency. In other words, the edge computing device 130 simulates the product temperature on a sample-by-sample basis. As shown, the alarm subroutine 804' is configured to detect an alarm condition when the simulated product temperature crosses a product temperature threshold (842'). Subsequently the edge computing device 130 is configured to immediately and asynchronously send an alarm indication to the asset manager 14**.

In an exemplary embodiment, the edge computing device 130 is configured to simulate the product temperature based on an exponential decay filter that is a function of the sampled return air temperature. Equation (1) provides an exemplary exponential decay filter algorithm that defines the relationship between product temperature and time dT/dt as a function of the air temperature $T_s$ of the environment in which the product is located:

$$\frac{dT}{dt} = k(T_t - T_S) \tag{1}$$

wherein:

$T_t$ is product temperature;

$T_s$ is the return air temperature read by the edge computing device;

k is an experimentally derived heat transfer coefficient for the product.

The exponential decay filter algorithm in Equation (1) can be rewritten to solve for the product temperature over time T(t), as shown in Equation (2) below:

$$T(t) = T_S + (T_0 - T_S)e^{-kt}; \tag{2}$$

wherein:

$T(t)$ is the simulated product temperature;

$T_s$ is the return air temperature read by the edge computing device;

$T_0$ is an initial product temperature when the product was loaded into the refrigeration appliance; and k is an experimentally derived heat transfer coefficient for the product.

In an exemplary embodiment, the edge computing device 130 is configured to solve for $T(t)$ on a sample-by-sample base (i.e., at the sampling frequency) or other suitable simulation frequency. In certain embodiments, the initial product temperature $T_0$ is set to an ambient air temperature reading from an I/O port when the product was loaded into the refrigeration appliance. In other embodiments, the initial product temperature $T_0$ is input by a user via a front end application 22, 24. Upon receipt of the input of the initial product temperature $T_0$ to a front end application 22, 24, the asset manager 14 can load the initial product temperature into memory of the edge computing device 130. Similarly, the user may use a front end application 22, 24 to select a product type. Upon receipt of the product type input, the asset manager 14 can look up the heat transfer coefficient k for the product type in a look up table and load the heat transfer coefficient into memory of the edge computing device 130.

Suitably, the simulation frequency is substantially greater than the transmission frequency. This is important because the accuracy and responsiveness of Equation (2) depends on frequent updating. It can be seen that, by using the exponential decay filter algorithm to calculate the simulated product temperature at the IOT device 12 on the edge of the IOT network the asset management system 10 is able to obtain a responsive and accurate simulation of product temperature. Moreover, a holistic, location-agnostic estimate of product temperature is provided.

As shown in FIG. 12, the alarm subroutine 804' is configured to detect an alarm condition when the simulated product temperature crosses a product temperature threshold (842') and immediately and asynchronously send an alarm indication to the asset manager 14. The asset manager 14 is configured to take immediate action in response to the alarm indication (as described below in reference to FIG. 13) to push a notification to a user about the alarming product temperature. Accordingly, the asset management system is able to provide push notification alarming (within 60 seconds of the alarm condition occurring) based on holistic, location-agnostic simulation of product temperature.

Referring to FIG. 13, a backend process conducted by the asset manager backend 200 is generally indicated at reference number 900. At starting point 902, the asset manager backend 200 is in communication with a plurality of IOT devices 12 (e.g., more than 10,000 IOT devices) via the asset management network 20. The asset manager 14 configured to stream the data from all of the IOT devices 12 in the asset management network 20. The streamed data includes operating data sent by each IOT device at the respective transmission frequency and the asynchronous alarm indications.

The ETL system 202 receives the stream of data from the IOT devices 12 and parses the data objects (both operating data objects and alarm indications) by serial number of the source refrigeration appliance (step 904). Additionally, the ETL system parses the data objects by data object type (step 906). This step leads to decision point 908, wherein the ETL system 202 determines whether each data object is an alarm indication. If not, the ETL system 202 performs required data transformations and loads the operating data into the time series database 204 (step 910). The operating data from each such data object is loaded into a record of the time series database 204 having the serial number of the refrigeration appliance as primary key.

If at decision point 908 the ETL system 202 determines that a data object is an alarm indication, it recognizes the alarm indication as an event requiring event driven processing and immediately sends the alarm indication to the alarm service module 214 (step 912). At step 914 and decision point 916, the alarm service module 214 applies rules-based logic to assess whether a push notification is required. The rules-based logic may require consulting the alarm information previously stored in cache 217. For example, the rules-based logic can define a time interval that the alarm condition must be maintained before push notification about the alarm indication is required, and the assessment can be made by referencing cached information about how long the alarm condition has been maintained. If push notification is not immediately required according to the rules-based logic, the alarm service module 214 makes a further determination at decision point 918 of whether the alarm indication should be stored in temporary cache 217 for subsequent application of the rules-based logic. If yes, the alarm service module 214 stores the alarm indication in cache 217 at step 920; and if no, the alarm service module 214 simply ignores the alarm at step 922.

When the alarm service module 214 determines at step 916 that a push notification is required, at step 924 the alarm service module sends the alarm indication to the push notification service module 216. At step 926, the push notification service module applies push notification rules to determine push notification address(s) to receive alarms. For example, the push notification service module 216 can reference meta information stored in the meta information database 230 to apply rules that define, for example, which type of user (e.g., maintenance person, store employee, store manager, appliance owner, etc.) receives a push notification alarm for a given alarm condition type (e.g., door open alarm sent to store employee user type, over-temperature alarm sent to store manager user type, compressor failure alarm sent to maintenance person user type, etc.), how many push notification alarms of a given alarm condition type (e.g., main power failure alarms) should be sent to a user from multiple refrigeration appliances at a given store or location, etc. After applying the rules-based logic, the push notification service module 216 sends push notifications via SMS text message and/or email to designated users.

Referring to FIGS. 11 and 13, it can be seen that the IOT device edge computing process 800 and the asset manager backend process 900 cooperate to provide a push notification alarm system that is fundamentally different than conventional push notification alarm systems proposed for refrigeration appliances. In conventional systems, the remote asset manager receives operating data from the appliances at the normal transmission frequency and parses the data at the transmission frequency to determine whether push notification is required. That is, the server side is responsible for executing the entire action sequence in response to an alarm condition. However, the inventor recognizes that data limitations require transmission frequency to be relatively slow. For example, it is common in the industry to transmit operating data every minutes, every hour, every 4 hours, every 8 hours, or every 24 hours. So if an alarm condition (e.g., door open) occurs at the beginning of a transmission interval it can have severe adverse consequences on the refrigeration appliance or product contained therein before the asset manager ever even receives operating data indicating the alarm condition has occurred. But by bifurcating the alarm response functions between the edge computing devices 130 and the asset manager backend 202, the illustrated asset manager is able to remedy this issue. Because each IOT device is configured to recognize alarms on the edge of the IOT network 20 and send the alarms asynchronously of the normal transmission frequency in a parallel alarm routine 840, the asset manager backend process 900 is able to act on the alarm in a timely fashion. Every alarm condition for which push notification is required is pushed to the designated users within 60 seconds of the alarm condition occurring. This makes the push notification alarms truly actionable, yielding greater appliance up-time and less loss of product.

Referring to FIG. 14, additional aspects of the present disclosure relate to applications that employ the assent-centric architecture described above to enrich the operating data obtained from the refrigeration appliances 11A-11*n*. In general, these aspects leverage how the above-described asset management system 10 associates operating data directly with the serial number for the source refrigeration appliance. This enables an asset manager 14 to utilize the rich proprietary data stored in the OEM database 28 (and organized by refrigeration appliance type) to (i) determine the type of refrigeration appliance based the serial number and (ii) combine the operating data for the refrigeration appliance with the rich proprietary data set for the respective refrigeration appliance type to yield better assessments of the asset operating data. For example, a manufacturer of assets might have extensive simulation, empirical testing, or modeled data about the many types of assets it produces. Because the serial number for each asset is provided along with the asset operating data, a manufacturer can easily determine which proprietary data applies to the asset and then combine the relevant proprietary data with the operating data to yield improved predictive analytic outputs, improved simulation outputs, etc.

This concept is schematically illustrated in FIG. 14, where reference number 1010 represents the asset manager 14 receiving appliance operating data and storing it in the time series database 204 using appliance serial number as primary key. Receipt of proprietary data stored in the OEM database 28 is indicated at reference number 1020. The two data sets received in steps 1010, 1020 are combined at reference number 1030 to yield enriched analysis of the appliance operating data at 1040. Accordingly, in one or more embodiments, the asset manager 14 is configured to read the proprietary OEM data 1020 from the OEM database 28 and to act on the operating data for at least one refrigeration appliance of a specified refrigeration appliance type by combining (1030) the operating data for the appliance of the specified type with the proprietary OEM data for the specified appliance type to obtain a predictive analytic or simulation output 104 for the refrigeration appliance.

Referring to FIG. 15, in one particular implementation, the data enrichment process is used in a compressor life prediction process 1100. In this embodiment, at step 1110 the asset manager 14 receives from the refrigeration appliance operating data including liquid line temperature and air temperature (e.g., return air temperature), wherein the operating data is tagged by the appliance serial number. At step 1120, the asset manager 14 reads proprietary data from the OEM database 28 for the refrigeration appliance type determined based on serial number. In particular, the proprietary data includes a model that correlates liquid line temperature and air temperature to degradation of compressor operating efficiency. As explained above, such a model can be obtained through experimental testing of refrigeration appliances of the specified type and or through long term observational studies of how refrigeration appliances of the specified type perform in the field (e.g., observation of the refrigeration appliances can be carried out by the asset manager 14 as discussed below). At step 1130, the asset manager 14 combines the operating data from step 1110 with the data model from step 1120 to predict the remaining compressor life (step 1140). Based on the compressor life prediction determined in step 1140, the asset manager can take additional action, such as pushing an alarm notification to a user, notifying a maintenance person that compressor maintenance is required, etc.

Referring to FIG. 16, in another implementation, the data enrichment process comprises a location-specific temperature simulation process 1200. In this embodiment, at step 1210 the asset manager 14 receives operating data tagged by serial number. The operating data includes at least a return air temperature. In some cases, the operating data further includes compressor cycle data, refrigerant temperature data, or other temperature data. In an exemplary embodiment, at step 1210, the asset manager 12 further receives information from the user about the type of product contained in the refrigeration appliance. As explained above, the front end applications 22, 24 may facilitate user input of this information.

As explained above, the OEM database 28 can store a three-dimensional temperature model for temperature inside the refrigeration appliance. In this embodiment, the asset manager 14 receives the location-specific temperature simulation model at step 1220. By combing (step 1230) the location-specific temperature simulation model 1220 with the operating data and product information obtained in step 1210, the asset manager 14 is configured to act on the operating data by simulating air or product temperatures at one or more locations in the refrigeration appliance. For example, the asset manager 14 can input the operating data into the three-dimensional air temperature model to track air temperature as a function of location inside the refrigeration appliance over time. This information, in turn, could be used in combination with the exponential decay filter algorithm described above to simulate product temperature at particular locations of interest within the refrigeration appliance. Alternatively, the location-specific temperature model may directly model product temperature in relation to three-dimensional locations inside the refrigeration appliance. In this case, the exponential decay filter algorithm would not be required to provide an estimate of product temperature.

Figures 17, 18:
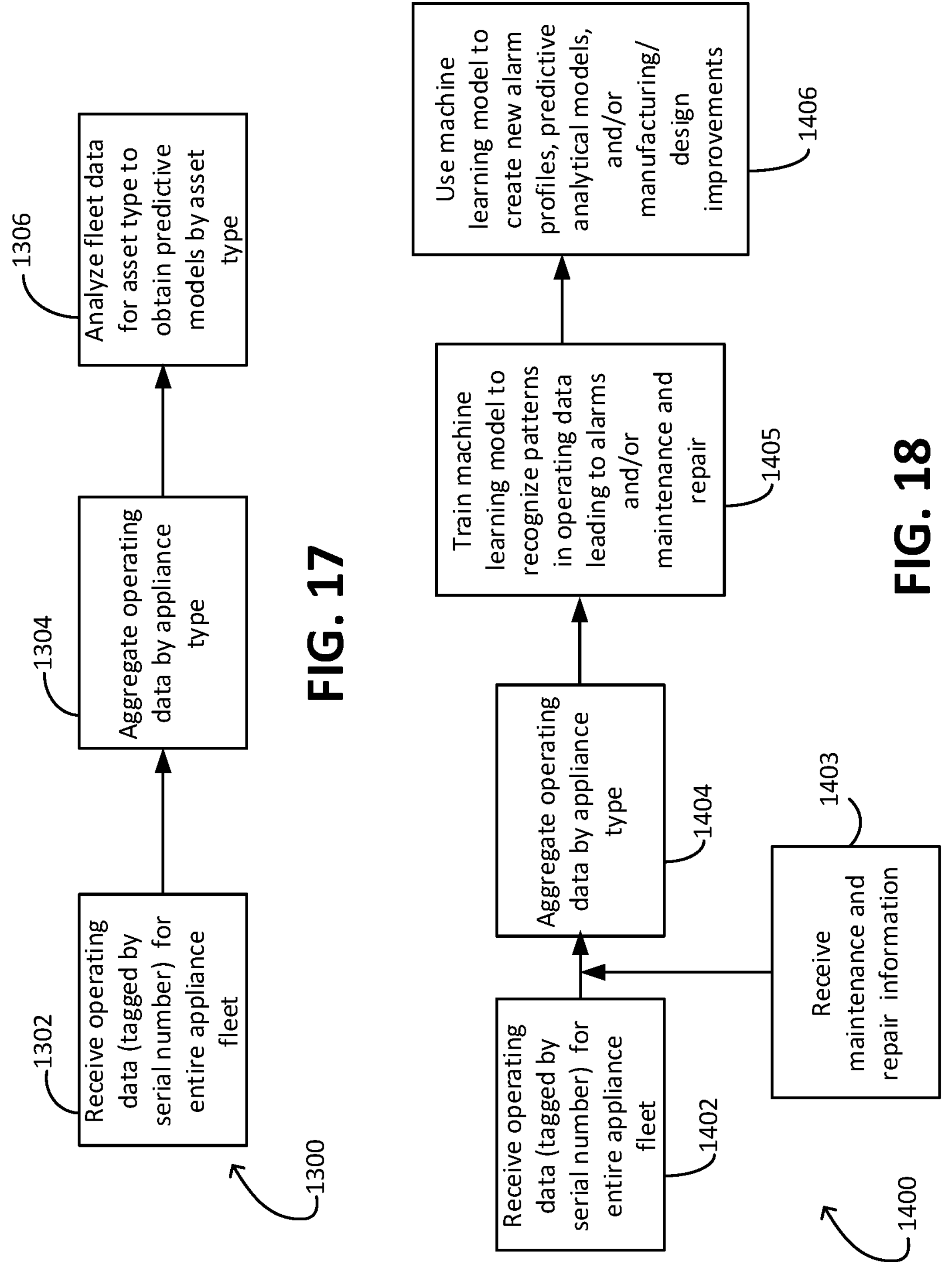
FIG. 17 is a schematic illustration of a process for obtaining predictive models based on operating data stored in the asset manager backend.
FIG. 18 is a schematic illustration of a machine learning process for recognizing and acting on patterns in refrigeration appliance operating data stored in the asset manager backend.

Referring to FIG. 17, the present disclosure also contemplates leveraging the asset-centric system architecture to enrich the data set of the asset manager 14 or OEM database 28. In particular, because the operating data for all the refrigeration appliances reporting to the asset manager are tagged by the appliance serial number and stored in a time series database 204 using the serial number as primary key, the asset manager 14 can group the data by refrigeration appliance type and thereby generate a deep and rich data set for each type of refrigeration appliance under management. Using various big data techniques, the asset manager 14 can employ the enriched data set to iteratively improve any analysis of the operating data on a refrigeration appliance type basis.

An exemplary process for improving appliance fleet analytics is shown at reference number 1300 in FIG. 17. At step 1302, the asset manager 14 receives operating data (tagged by serial number) for the entire fleet of appliances 11A-11*n*. In step 1304, the asset manager then aggregates this (massive) data set. The aggregation step 1304 can comprise determining subsets of the refrigeration appliances that are the same type and grouping the operating data by refrigeration appliance type. Once the operating data is aggregated by appliance type, in step 1306 the asset manager 14 is configured to analyze the aggregated data to obtain new data models and/or simulations that relate appliance operating data to expected outcomes.

Referring to FIG. 18, in one particular embodiment, the asset manager 14 is configured to conduct a process 1400 for generating a predictive maintenance or predictive failure model using machine learning trained on the operating data obtained from the refrigeration appliance fleet. Initially at step 1402 the asset manager 14 receives operating data (tagged by serial number) for the entire fleet of appliances 11A-11*n* over a period of time (e.g., 1 month, three months, 6 months, 1 year, 2 years, etc.). In step 1402, the asset manager 14 can also record the alarm indications received over the same period of time and organize the alarm indications in a database by serial number. In step 1403, the asset manager 14 further receives maintenance and repair information about the appliance fleet over the same period of time. This maintenance and repair information can be obtained by service technicians inputting information to a front end application 22, 24 about each maintenance and repair they performed on an appliance, identifying the appliance serial number. Additionally, the data in step 1403 can be obtained by the OEM from warranty claims. At step 1404, the asset manager aggregates the operating data, alarm data, and maintenance and repair information by appliance type. Again, this step 1404 comprises determining subsets of the refrigeration appliances that are the same type and grouping the various data by refrigeration appliance type.

Subsequently, in step 1405, the asset manager 14 or another software service module trains a machine learning model to recognize patterns in the aggregated operating data for refrigeration appliance types that are predictive of subsequent alarm indications and/or unscheduled maintenance or repair events. Then, based on this machine learning model, the asset manager 14 or another software service module can create new alarm profiles that provide indication when operating data is predictive of an imminent maintenance or repair event. Additionally, the OEM can use the machine learning model to implement manufacturing or design improvements to its refrigeration appliances to improve the reliability of subsequently manufactured and/or designed appliances.

In view of the foregoing, it can be seen that the present disclosure provides asset management systems, IOT devices, and related processes that facilitate effective remote monitoring of refrigeration appliances. The inventor believes that the technology described herein improves on prior art asset management systems and IOT devices by employing an appliance-focused communication scheme and network architecture. Additionally, the IOT devices disclosed herein are thought to improve on prior art IOT gateway devices by being capable of direct integration with virtually any refrigeration appliance. The IOT devices and server applications cooperate to facilitate simple binding to refrigeration appliance assets and to provide truly actionable edge alarm capabilities. Furthermore, the novel data structures described herein, which put the appliance at the center of the data organization scheme, enable enriched analysis of refrigeration appliance operating data for improved reliability and performance over the life of the appliance. Additionally, the novel data structures organized by appliance serial number allow for big data techniques to be employed on massive amounts of operating data taken from numerous appliances to improve the analytical models used for various refrigeration appliance types, and to improve the design and manufacture of future refrigeration appliances. Still furthermore, aspects of the present disclosure have been shown to provide effective means for handling refrigeration appliance operating data in the event of power outage, as well as to provide a holistic, location-agnostic simulation of product temperature when refrigeration appliances are used to keep sensitive products at temperature.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, cloud computing services, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A processor-executable method of connecting a subject refrigeration appliance to an asset manager in an asset management system for a plurality of refrigeration appliances, the method comprising:

receiving a web page request including a device identifier ("ID") for an internet of things ("IOT") device;

determining based on the device ID that the IOT device has not been bound to any refrigeration appliance;

in response to receiving the web page request for the IOT device and determining that the IOT device has not been bound to any refrigeration appliance, returning a web form including a field for input of a serial number of the subject refrigeration appliance;

after returning the web form, receiving input of the serial number of the subject refrigeration appliance to the web form; and in response to receiving input of the serial number of the subject refrigeration appliance to the web form, binding the IOT device to the subject refrigeration appliance in the asset management system.

2. The method of claim 1, wherein binding the IOT device to the subject refrigeration appliance comprises configuring the asset manager to parse operating data transmitted by the IOT device based on the serial number of the subject refrigeration appliance.

3. The method of claim 2, wherein binding the IOT device to the subject refrigeration appliance comprises configuring the asset manager to store the operating data in a time series database with the serial number as primary key for the operating data.

4. The method of claim 1, wherein the subject refrigeration appliance is of a refrigeration appliance type and wherein binding the IOT device to the subject refrigeration appliance comprises loading an appliance control profile for the subject refrigeration appliance type into memory of the IOT device.

5. The method of claim 4, wherein in response to receiving input of the serial number of the subject refrigeration appliance to the web form, the asset manager is configured to query an original equipment manufacturer ("OEM") database for the appliance control profile based on the serial number of the subject refrigeration appliance.

6. The method of claim 1, wherein the asset management system comprises a data broker between the plurality of refrigeration appliances and the asset manager.

7. The method of claim 6, wherein binding the IOT device to the subject refrigeration appliance comprises configuring the data broker to receive data packets from the IOT device containing operating data for the subject refrigeration appliance and tagged by a device ID for the IOT device and to transmit structured data objects to the asset manager containing the operating data for the subject refrigeration appliance and tagged by the serial number of the subject refrigeration appliance.

8. The method of claim 6, wherein said receiving the web page request comprises receiving the web page request at the data broker and said determining that the IOT device has not been bound to any refrigeration appliance comprises determining by the data broker that the device ID is not linked to any refrigeration appliance serial number.

9. The method of claim 8, wherein in response to said determining by the data broker that the device ID is not linked to any refrigeration appliance serial number, the data broker redirects the web page request to a web address SS for a front end asset management application, the web address for the front end asset management application including the device ID and a placeholder keyword indicating that the device ID is not linked to any refrigeration appliance.

10. The method of claim 9, further comprising, after binding the IOT device to the subject refrigeration appliance in the asset management system, receiving a subsequent web page request at the data broker containing a device ID for the IOT device, wherein in response to receiving the subsequent web page request, the data broker determines that the device ID is linked to the serial number of the subject refrigeration appliance, and wherein in response to the data broker determining that the device ID is linked to the serial number of the subject refrigeration appliance, the data broker redirects the web page request to another web address for the front end asset management application, said another web address for the front end asset management application including the device ID and the serial number of the subject refrigeration appliance.

11. The method of claim 10, wherein in response to the data broker redirecting the web page request to said another web address, the front end asset management application receives a corresponding web request and returns a public web page displaying operating data for the subject refrigeration appliance.

12. The method of claim 11, wherein the IOT device is emblazoned with a machine readable code encoding a web address containing the device ID for the IOT device for making the web page request to the data broker containing the device ID for the IOT device.

13. An asset management system for a plurality of refrigeration appliances, each refrigeration appliance having a serial number, the asset management system comprising:

a plurality of internet of things ("IOT") devices, each IOT device comprising a modem having a device identifier ("ID") and being emblazoned with a machine readable code encoding a web address including the respective device ID, each IOT device configured to be bound to a respective one of the refrigeration appliances and configured to use the modem to transmit operating data from the respective refrigeration appliance;

a data broker configured to receive the operating data from the plurality of IOT devices and transmit structured data objects containing the operating data, each structured data object being tagged by the serial number of a source refrigeration appliance, the data broker being further configured to receive web page requests from one or more client devices entering said web addresses including the respective device IDs into web browsers, wherein in response to each web page request, the data broker is configured to determine based on the included device ID whether the IOT device has been bound to any refrigeration appliance, wherein in response to receiving a web page request and determining based on the included device ID that the IOT device has not been bound to any refrigeration appliance, the data broker is further configured to redirect the web page request to another web address for a web form including a field for inputting a serial number of a subject refrigeration appliance to bind the IOT device to the subject refrigeration appliance with the serial number input into said field, and wherein in response to receiving a web page request and determining based on the included device ID that the IOT device has been bound to any refrigeration appliance, the data broker is further configured to redirect the web page request to another web address for a public web page for displaying operating data for the respective refrigeration appliance to which the IOT has already been bound; and an asset manager configured to stream the structured data objects from the data broker, parse the streamed structured data objects by serial number of the source refrigeration appliance, and store the operating data contained in the structured data objects in a time series database using the serial numbers of the source refrigeration appliances as primary keys.

14. The asset management system as set forth in claim 13, wherein each structured data object contains a key-value pair for the serial number of the source refrigeration appliance.

15. The asset management system as set forth in claim 14, wherein the asset manager is configured to stream the structured data objects from an asset management network connected to the asset manager and parse the structured data objects in real-time to determine, for each structured data object, the key-value pair for the serial number of the source refrigeration appliance.

16. The asset management system as set forth in claim 13, wherein the time series database is agnostic to the modem device IDs of the IOT devices.

17. The asset management system as set forth in claim 15, wherein the asset manager is configured to parse the structured data objects according to parsing logic agnostic to modem device ID.

18. The asset management system as set forth in claim 13, further comprising an original equipment manufacturer ("OEM") database containing appliance control profiles containing data corresponding to refrigeration appliance types.

19. The asset management system as set forth in claim 18, wherein the asset manager is configured to query the OEM database for the appliance control profile based on the serial number of the refrigeration appliance.

* * * * *